United States Patent [19]
Brown, III et al.

[11] Patent Number: 5,450,555
[45] Date of Patent: Sep. 12, 1995

[54] REGISTER LOGGING IN PIPELINED COMPUTER USING REGISTER LOG QUEUE OF REGISTER CONTENT CHANGES AND BASE QUEUE OF REGISTER LOG QUEUE POINTERS FOR RESPECTIVE INSTRUCTIONS

[75] Inventors: John F. Brown, III, Northborough; Mary K. Gowan, Framingham, both of Mass.

[73] Assignee: Digital Equipment Corporation, Maynard, Mass.

[21] Appl. No.: 126,094

[22] Filed: Sep. 23, 1993

Related U.S. Application Data

[63] Continuation of Ser. No. 934,207, Aug. 21, 1992, abandoned, which is a continuation-in-part of Ser. No. 547,804, Sep. 29, 1990, abandoned.

[51] Int. Cl.$^6$ .................................................. G06F 9/34
[52] U.S. Cl. .................................... 395/375; 364/254.5; 364/255.2; 364/261.9; 364/DIG. 1
[58] Field of Search ......................... 395/250, 375, 800

[56] References Cited

U.S. PATENT DOCUMENTS

| | | | |
|---|---|---|---|
| Re. 32,493 | 9/1987 | Matsumoto et al. | 364/200 |
| 4,054,945 | 10/1977 | Ichiko | 395/425 |
| 4,789,925 | 12/1988 | Lahti | 364/200 |
| 4,807,111 | 2/1989 | Cohen | 395/250 |
| 4,875,160 | 10/1989 | Brown, III | 364/200 |
| 4,891,753 | 1/1990 | Budde et al. | 364/200 |
| 5,101,341 | 3/1992 | Circello | 395/375 |
| 5,109,495 | 4/1992 | Fite | 395/375 |
| 5,155,843 | 11/1992 | Stamm et al. | 395/575 |
| 5,167,026 | 11/1992 | Murry et al. | 395/375 |

FOREIGN PATENT DOCUMENTS

| | | | |
|---|---|---|---|
| 0243892 | 11/1987 | European Pat. Off. | G06F 9/38 |
| 0269980 | 6/1988 | European Pat. Off. | G06F 9/38 |
| 0380850 | 8/1990 | European Pat. Off. | G06F 9/38 |
| 0381469 | 8/1990 | European Pat. Off. | G06F 9/38 |
| 0463965 | 1/1992 | European Pat. Off. | G06F 9/38 |
| 2016753 | 9/1979 | United Kingdom | G06F 9/10 |

OTHER PUBLICATIONS

Acosta et al., "An Instruction Issuing Approach to Enhancing Performance in Multiple Functional Unit Processors," IEEE Transactions in Computers C-35 (Sep. 1986) No. 9, New York, N.Y., pp. 815-828.

Matsumoto et al., "A High-Performance Architecture for Variable Length Instructions", Systems & Computers in Japan, No. 3 (May 1985), Washington D.C., pp. 19-28.

Fossum et al., "New VAX Squeezes Mainframe Power Into Mini Package", Computer Design, vol. 24, No. 3 (Mar. 1985), Littleton, Mass., pp. 173-181.

*Primary Examiner*—Eric Coleman
*Attorney, Agent, or Firm*—Arthur W. Fisher; Denis G. Maloney; Lindsay G. McGuinness

[57] ABSTRACT

A pipelined processor has an instruction unit for decoding instructions and pre-processing operands prior to instruction execution, and an execution unit for executing the decoded instructions. The pre-processing of operands includes changes to general purpose registers, and the changes are recorded in an RLOG queue having read and write pointers. Instruction context for the RLOG queue entries is maintained in a separate RLOG base queue. When decoding begins for a new instruction, the RLOG base queue is loaded with the RLOG write pointer to the first RLOG queue entry that would record a register change for that next instruction. Each time an operand is processed that changes a general purpose register, the value of the change is recorded in the entry pointed to by the RLOG queue write pointer, and the RLOG queue write pointer is advanced. When the execution unit retires an instruction, its entries in the RLOG queue are discarded by advancing the RLOG queue read pointer to the pointer read from the RLOG base queue, and the pointer read from the RLOG base queue is removed from the RLOG base queue. During an unwind process in response to an exception, a microcontrol unit successively reads a register change from the RLOG queue, checks whether the RLOG queue is empty, restores the register, and advances the RLOG queue read pointer until the RLOG queue becomes empty, and then resets the RLOG queue and the RLOG base queue.

15 Claims, 26 Drawing Sheets

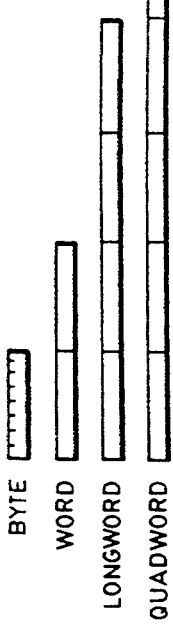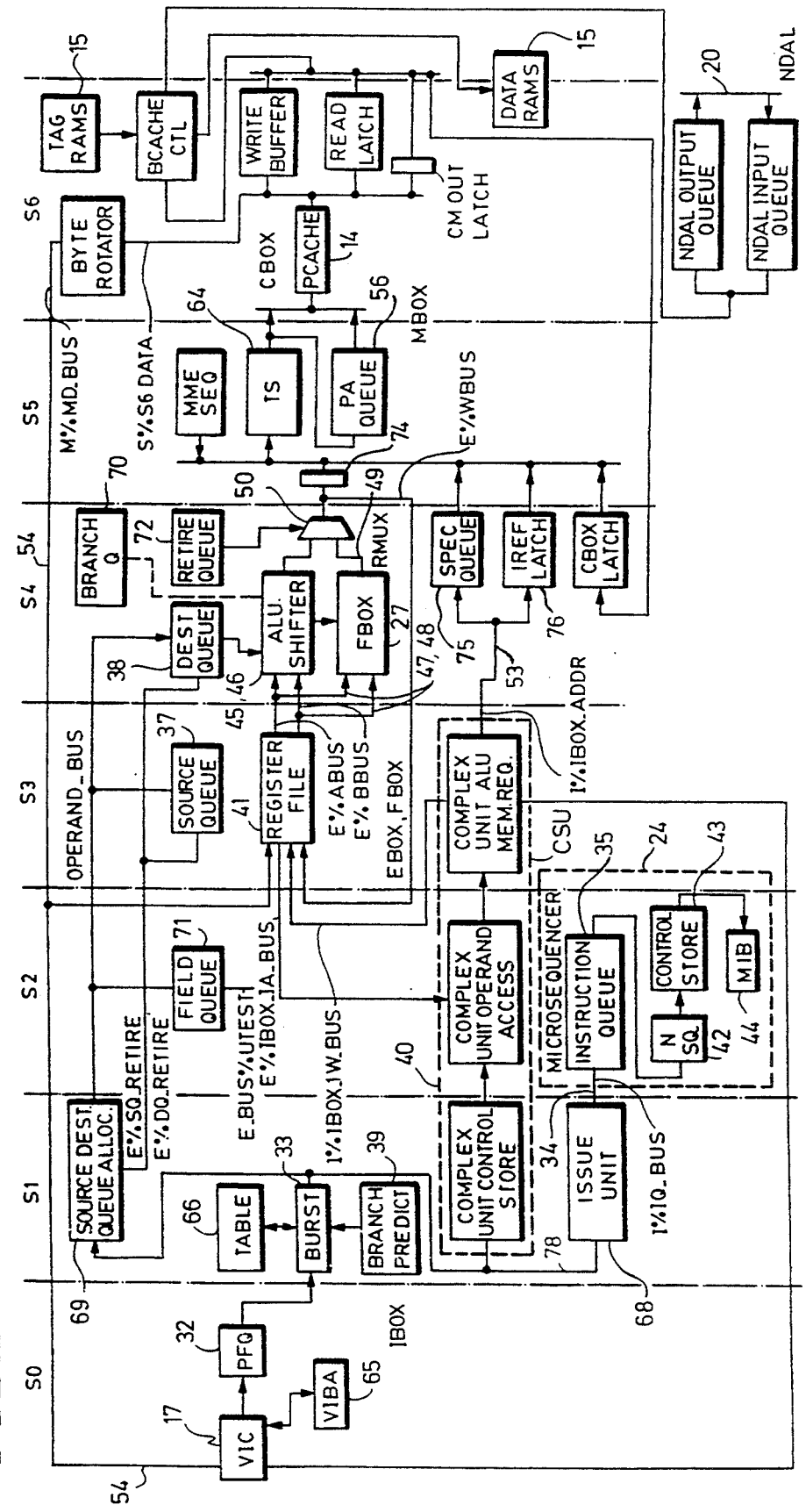

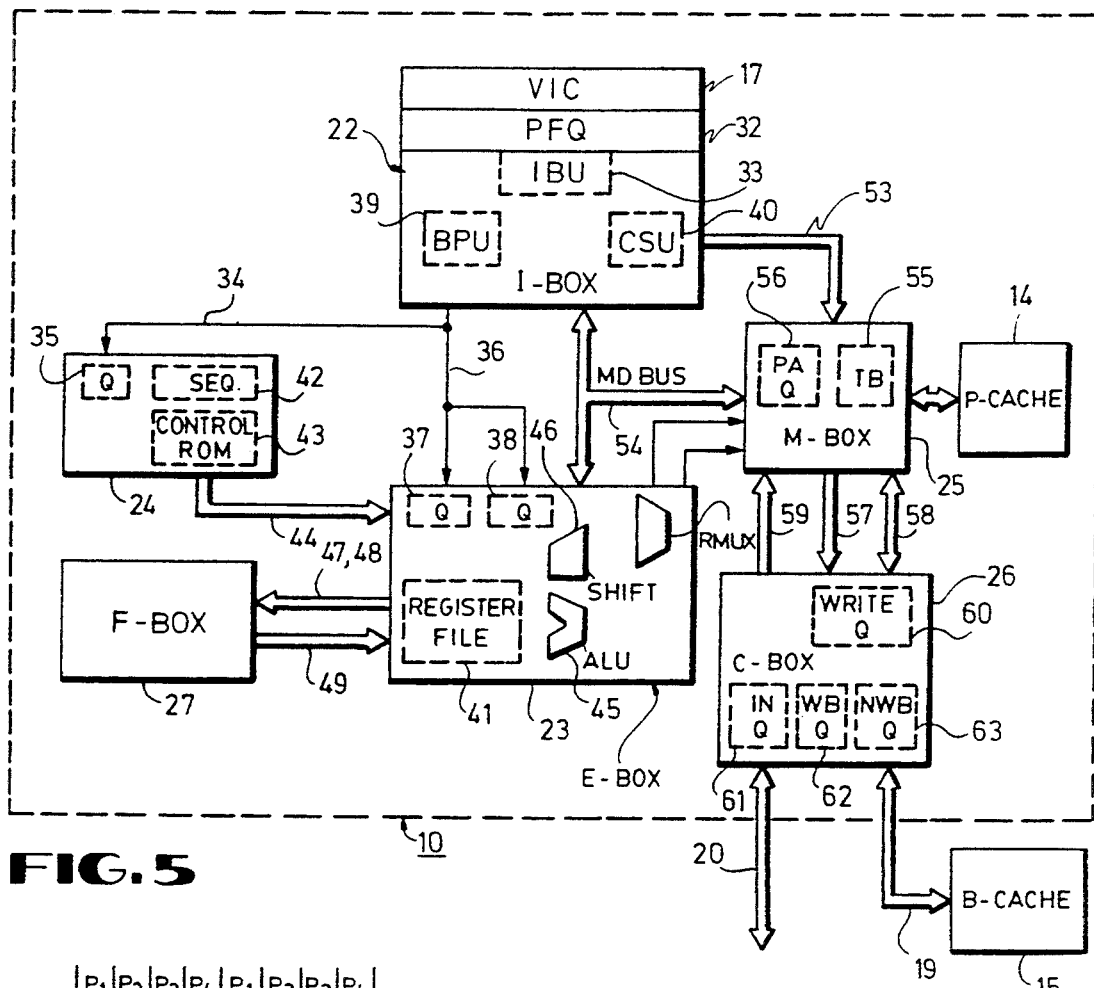
FIG. 5
FIG. 4
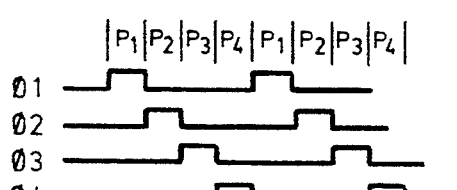
FIG. 6

FIG. 15

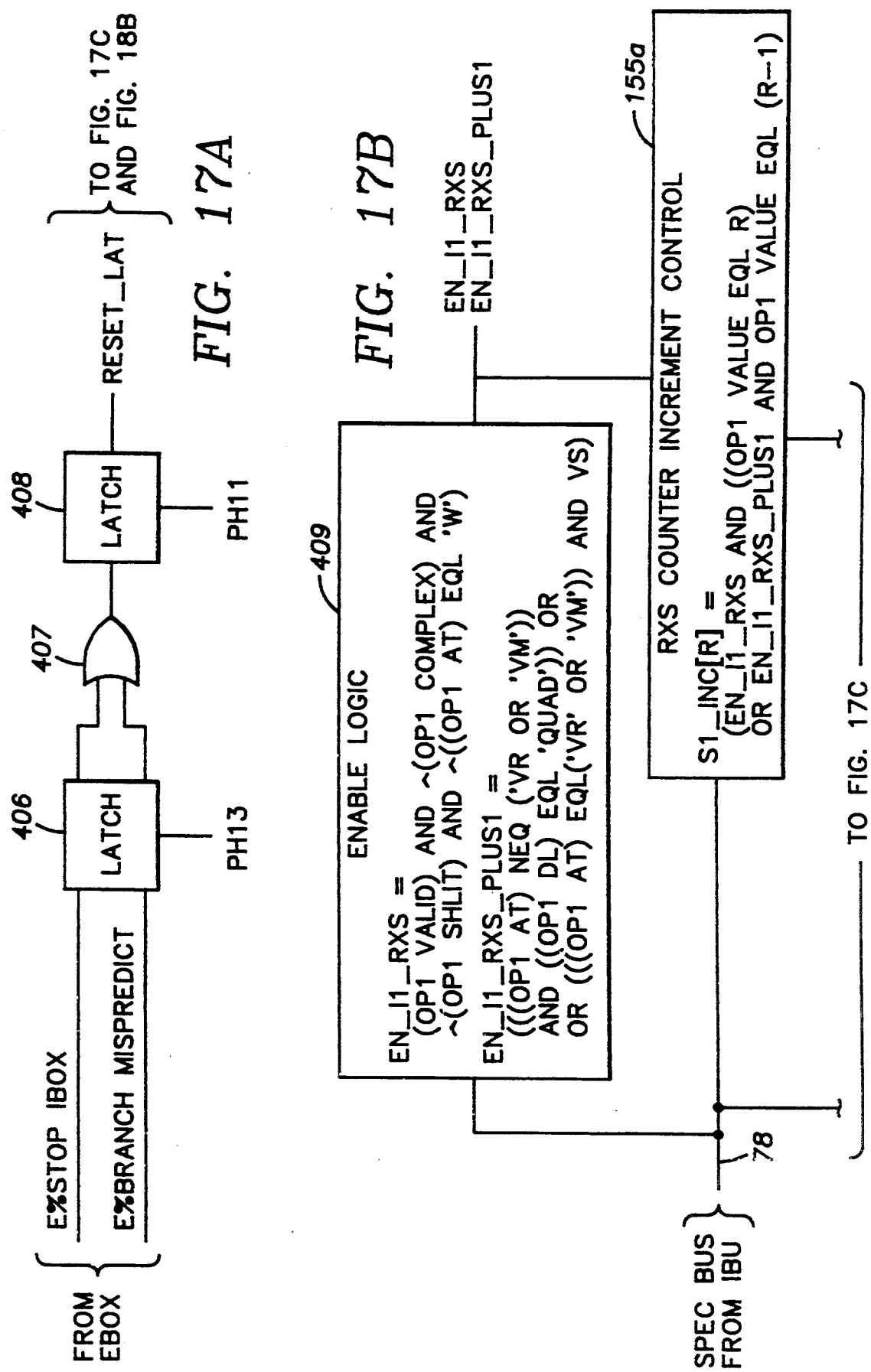

REGISTER LOGGING IN PIPELINED COMPUTER USING REGISTER LOG QUEUE OF REGISTER CONTENT CHANGES AND BASE QUEUE OF REGISTER LOG QUEUE POINTERS FOR RESPECTIVE INSTRUCTIONS

RELATED APPLICATIONS

This application is a continuation of application Ser. No. 07/934,207 filed Aug. 21, 1992, now abandoned, which is a continuation-in-part of Ser. No. 07/547,804, filed Jun. 29, 1990, entitled BRANCH PREDICTION UNIT FOR HIGH-PERFORMANCE PROCESSOR, by John F. Brown, III, et al.

This application discloses subject matter also disclosed in Ser. No. 07/934,351 filed Aug. 21, 1992 coincident with the present application, and entitled REGISTER CONFLICT SCOREBOARD IN PIPELINED COMPUTER USING PIPELINED REFERENCE COUNTS, by John F. Brown, III, and Mary K. Gowan.

BACKGROUND OF THE INVENTION

1. Field of the Invention

This invention is directed to pipelined digital computers, and more particularly to the pipelining of register information between instruction decoding and instruction execution. The invention specifically relates to the logging of information about changes made to the contents of general purpose registers by decoded but not yet executed instructions, so that the contents of the registers can be restored when an exception occurs.

2. Description of the Background Art

A large part of the existing software base, representing a vast investment in writing code, database structures and personnel training, is for complex instruction set or CISC type processors. These types of processors are characterized by having a large number of instructions in their instruction set, often including memory-to-memory instructions with complex memory accessing modes. The instructions are usually of variable length, with simple instructions being only perhaps one byte in length, but the length ranging up to dozens of bytes. The VAX (Trademark) instruction set by Digital Equipment Corporation is a primary example of CISC and employs instructions having one to two byte opcodes plus from zero to six operand specifiers, where each operand specifier is from one byte to many bytes in length. The size of the operand specifier depends upon the addressing mode, size of displacement (byte, word or longword), etc. The first byte of the operand specifier describes the addressing mode for that operand, while the opcode defines the number of operands: one, two or three. When the opcode itself is decoded, however, the total length of the instruction is not yet known to the processor because the operand specifiers have not yet been decoded. Another characteristic of VAX (Trademark) instructions is the use of byte or byte string memory references, in addition to quadword or longword references; that is, a memory reference may be of a length variable from one byte to multiple words, including unaligned byte references.

The variety of powerful instructions, memory accessing modes and data types available in a variable-length CISC instruction architecture should result in more work being done for each line of code (actually, compilers do not produce code taking full advantage of this). Whatever gain in compactness of source code is accomplished at the expense of execution time. Particularly as pipelining of instruction execution has become necessary to achieve performance levels demanded of systems presently, the data or state dependencies of successive instructions, and the vast differences in memory access time vs. machine cycle time, produce excessive stalls and exceptions, slowing execution.

When CPUs were much faster than memory, it was advantageous to do more work per instruction, because otherwise the CPU would always be waiting for the memory to deliver instructions—this factor lead to more complex instructions that encapsulated what would be otherwise implemented as subroutines. When CPU and memory speed became more balanced, the advantages of complex instructions is lessened, assuming the memory system is able to deliver one instruction and some data in each cycle. Hierarchical memory techniques, as well as faster access cycles, and greater memory access bandwidth, provide these faster memory speeds. Another factor that has influenced the choice of complex vs. simple instruction type is the change in relative cost of off-chip vs. on-chip interconnection resulting from VLSI construction of CPUs. Construction on chips instead of boards changes the economics—first it pays to make the architecture simple enough to be on one chip, then more on-chip memory is possible (and needed) to avoid going off-chip for memory references. A further factor in the comparison is that adding more complex instructions and addressing modes as in a CISC solution complicates (thus slows down) stages of the instruction execution process. The complex function might make the function execute faster than an equivalent sequence of simple instructions, but it can lengthen the instruction cycle time, making all instructions execute slower; thus an added function must increase the overall performance enough to compensate for the decrease in the instruction execution rate.

Despite the performance factors that detract from the theoretical advantages of CISC processors, the existing software base as discussed above provides a long-term demand for these types of processors, and of course the market requires ever increasing performance levels. Business enterprises have invested many years of operating background, including operator training as well as the cost of the code itself, in applications programs and data structures using the CISC type processors which were the most widely used in the past ten or fifteen years. The expense and disruption of operations to rewrite all of the code and data structures to accommodate a new processor architecture may not be justified, even though the performance advantages ultimately expected to be achieved would be substantial. Accordingly, the basic objective to provide high-level performance in a CPU which executes an instruction set of the type using variable length instructions and variable data widths in memory accessing.

The typical pipelined digital computer for executing variable-length CISC instructions has three main parts, the I-box or instruction unit which fetches and decodes instructions, the E-box or execution unit which performs the operations defined by the instructions, and the M-box or memory management unit which handles memory and I/O functions. An example of such a digital computer system is shown in U.S. Pat. No. 4,875,160, issued Oct. 17, 1989 to John F. Brown and assigned to Digital Equipment Corporation. Such a machine is constructed using a single-chip CPU device, clocked at very high rates, and is microcoded and pipelined.

Theoretically, if the pipeline can be kept full and an instruction issued every cycle, a processor can execute one instruction per cycle. To this goal, macroinstruction pipelining is employed (instead of microinstruction pipelining), so that a number of macroinstructions can be at various stages of the pipeline at a given time. Queuing is provided between units of the CPU so that there is some flexibility in instruction execution times; the execution of stages of one instruction need not always wait for the completion of these stages by a preceding instruction. Instead, the information produced by one stage can be queued until the next stage is ready. But data dependencies still create bubbles in the pipeline as results generated by one instruction but not yet available are needed by a subsequent instruction which is ready to execute. In addition, it is sometimes necessary to "flush" the pipeline to remove information about a macroinstruction when an exception occurs for that macroinstruction or when the macroinstruction is in a predicted branch path for a prediction which is found to be incorrect.

When coupled with software, precise exception reporting can provide a robust and reliable environment for the computer programmer. Higher-level features such as demand paging and arithmetic exception handlers can be built on top of the exception architecture. The overlapped execution of instructions in a pipelined processor, however, makes precise exception reporting difficult. Many implementations choose to define an architectural "commit point", generally the point at which architectural state actually is modified, and exception conditions are synchronized to that point. Architectural state can be modified before the commit point as long as the changes are archived so that they can be "backed out" in the event of an exception. Many instructions can be decoded ahead of instruction execution using a history table or register log (RLOG) to archive the architectural changes due to operand processing.

History tables are typically organized in a manner that maintains instruction independence so that data pertinent to a particular instruction can be removed when the instruction is retired. The table allocates storage space to record the maximum number of state changes per instruction. Such a scheme is used in the VAX 8700 (Trademark) digital computer manufactured by Digital Equipment Corporation of Maynard, Mass. This micropipelined design only allows one instruction of ahead of execution to make architectural changes to the GPRs during instruction decode. A state change is recorded for every operand, even if the change is zero. In the event of an exception, the GPRs are simply restored from the entire history table; entries that are zero have no net effect. This scheme, however, is inefficient when extended to macropipelined implementations that allow many instructions to be decoded ahead of execution. Space is wasted for recording state changes of operands having a state change of zero, and the process of backing out of the history table becomes time consuming because the recorded changes of zero take as much time to restore as real changes. Valid bits could be added to the history table to mark the real changes and save some backing-out time, but the valid bits would add complexity to the hardware and control.

A register log for a macropipelined VAX (Trademark) digital computer sold by Digital Equipment Corporation is disclosed in Murray et al. U.S. Pat. No. 5,167,026 filed Feb. 3, 1989, entitled "Simultaneously or Sequentially Decoding Multiple Specifiers of a Variable Length Pipeline Instruction Based on Detection of Modified Value of Specifier Registers," corresponding to European Patent Application Pub. No. 0381469 published Aug. 8, 1990. Register numbers and associated changes are logged in entries of an RLOG queue. To permit more than one entry in the RLOG queue to be associated with each instruction, a three-bit tag is incremented modulo-six when each instruction is decoded, and the tag is appended to the microcode "fork" address for the instruction and stored with the "fork" address in an instruction queue prior to instruction execution. The tag points to one of six RLOG counters. When an entry is added to the RLOG queue for an instruction, the corresponding RLOG counter is incremented. When an instruction is retired, the RLOG counter corresponding to the instruction is reset. The number of valid entries in the RLOG queue is obtained by summing all of the values of the RLOG counters. When an exception or interrupt occurs, the RLOG entries are unwound from the RLOG queue by accessing all of the valid entries in the RLOG queue. Moreover, for unwinding from a mispredicted branch, the instruction unit and the execution unit are flushed of only the valid entries corresponding to the instructions in the mispredicted path that were just decoded but not yet executed. This is done by using a flush counter which is set to the value of the execution unit tag plus a "number to keep" which specifies the number of instructions which have been correctly decoded and for which their results should be left in the queues 23. During the restoration process, the flush counter is used to select the RLOG counters corresponding to the instructions having information to be restored and accessed for flushing. Although this RLOG scheme is workable for multiple decoded but not yet executed instructions, it requires rather complex control logic.

SUMMARY OF THE INVENTION

Briefly, in accordance with the invention, a pipelined processor has an instruction unit for decoding instructions and pre-processing operands prior to instruction execution, and an execution unit for executing the decoded instructions. The pre-processing of operands includes changes to general purpose registers, and the changes are recorded in an RLOG queue having read and write pointers. Instruction context for the RLOG queue entries is maintained in a separate RLOG base queue. When decoding begins for a new instruction, the RLOG base queue is loaded with the RLOG write pointer to the first RLOG queue entry that would record a register change for that instruction. Each time an operand is processed that changes a general purpose register, the value of the change is recorded in the entry pointed to by the RLOG queue write pointer, and the RLOG queue write pointer is advanced. When the execution unit retires an instruction, its entries in the RLOG queue are discarded by advancing the RLOG queue read pointer to the pointer read from the RLOG base queue, and the pointer read from the RLOG base queue is removed from the RLOG base queue, for example, by advancing an RLOG base queue read pointer.

The RLOG queue and the RLOG base queue therefore contain minimal information. The RLOG queue contains the register changes, and the RLOG base queue contains an RLOG queue read pointer for each outstanding instruction. The RLOG queue can be sized anywhere between a minimum which would accommodate one instruction and one register state change per operand, and a maximum which would accommodate a state change for every possible operand of every possible outstanding instruction. If less than the maximum size is selected, then it is possible to fill the RLOG queue, and in this case the instruction unit must be stalled to prevent a register state change from being made that cannot be recorded in the RLOG queue. By keeping instruction context in an RLOG base queue separate from the RLOG queue, the control structure of the RLOG is minimized, and the size is flexible but minimized within that flexibility.

In a preferred construction, the RLOG queue and the RLOG base queue each include a set of registers, a read pointer, and a write pointer. For a set of N registers, the read and write pointers are provided by modulo-N counters, so that the set of registers functions as a "circular" queue. A queue empty signal is generated when the read pointer is equal to the write pointer. A queue (almost) full signal is generated when the write pointer is one location in front of the read pointer.

During an unwind process in response to an exception, a micro-control unit successively reads a register change from the RLOG queue, checks whether the RLOG queue is empty, restores the register, and advances the RLOG queue read pointer until the RLOG queue becomes empty, and then resets the RLOG queue and the RLOG base queue. In this way, all valid entries are used to restore the registers.

Although a specific pipelined computer may not require restoration of the registers for only some of the outstanding instructions, this feature is also supported by the RLOG queue and the RLOG base queue of the present invention. In this case, instead of checking whether the RLOG queue is empty, the micro-control unit would check whether the RLOG queue write pointer is equal to a pointer read from the RLOG base queue. For example, if the RLOG queue is to be partially unwound for just the changes from the last N outstanding instructions, the RLOG base queue read pointer would be advanced (N−1) times, and the pointer read from the RLOG base queue would be compared to the RLOG queue read pointer to provide a termination signal for the partial unwind process when the pointer read from the RLOG base queue is equal to the RLOG queue read pointer.

BRIEF DESCRIPTION OF THE DRAWINGS

The novel features believed characteristic of the invention are set forth in the appended claims. The invention itself, however, as well as other features and advantages thereof, will be best understood by reference to the detailed description of a specific embodiment, when read in conjunction with the accompanying drawings wherein:

FIG. 3 is a diagram of data types used in the system of FIG. 1;

FIG. 4 is a timing diagram of the four-phase clocks produced by a clock generator in the CPU of FIGS. 1 or 2 and used within the CPU, along with a timing diagram of the bus cycle and clocks used to define the bus cycle in the system of FIG. 1;

FIG. 5 is an electrical diagram in block form of the central processing unit (CPU) of the system of FIGS. 1 or 2, according to one embodiment of the invention;

FIG. 6 is a timing diagram showing events occurring in the pipelined CPU 10 of FIG. 1 in successive machine cycles;

FIG. 7 is an electrical diagram in block form of the CPU of FIG. 1, arranged in time-sequential format, showing the pipelining of the CPU according to FIG. 6;

FIG. 15 is a diagram of the formats of microinstruction words produced by the control store of FIG. 14;

DESCRIPTION OF THE PREFERRED EMBODIMENT

Figure 1:
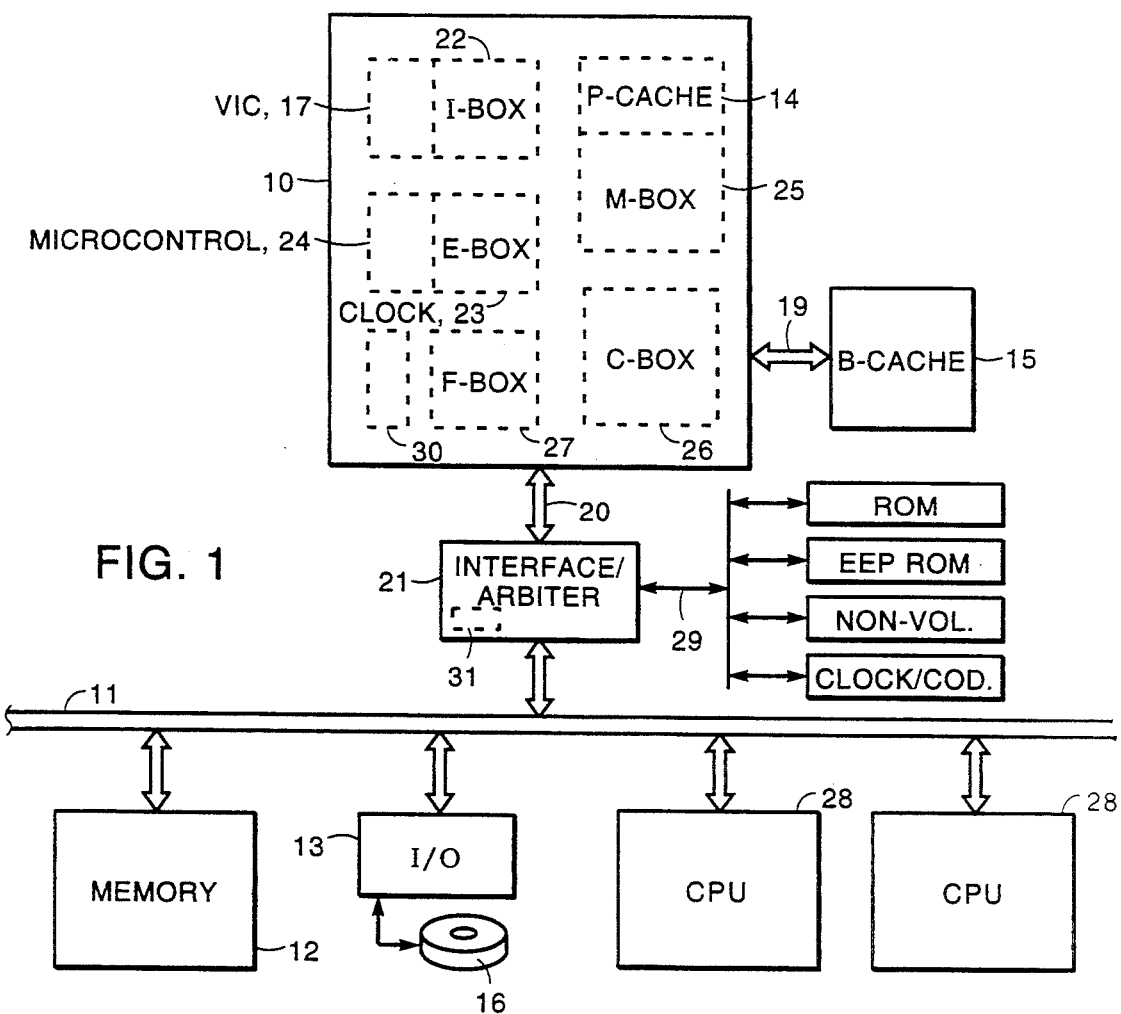
FIG. 1 is an electrical diagram in block form of a computer system including a central processing unit according to one embodiment of the invention.

Referring to FIG. 1, according to one embodiment, a computer system employing features of the invention includes a CPU chip or module 10 connected by a system bus 11 to a system memory 12 and to I/O elements 13. Although in a preferred embodiment the CPU 10 is formed on a single integrated circuit, some concepts as described below may be implemented as a chip set mounted on a single circuit board or multiple boards. When fetching instructions or data, the CPU 10 accesses an internal or primary cache 14, and then a larger external or backup cache 15. Thus, a hierarchical memory is employed, the fastest being the primary cache 14, then the backup cache 15, then the main system memory 12, usually followed by a disk memory 16 accessed through the I/O elements 13 by employing an operating system (i.e., software). A virtual memory organization is employed, with page swapping between disk 16 and the memory 12 used to keep the most-likely-to-be-used pages in the physical memory 12. An additional cache 17 in the CPU 10 stores instructions only, using the virtual addresses instead of physical addresses. Physical addresses are used for accessing the primary and backup caches 14 and 15, and used on the bus 11 and in the memory 12. When the CPU 10 fetches an instruction, first the virtual instruction cache 17 is checked, and if a cache miss occurs the address is translated to a physical address and the primary cache 14 is checked. If the instruction is not in the primary cache, the backup cache 15 is accessed, and upon a cache miss in the backup cache the memory 12 is accessed. The primary cache 14 is smaller but faster than the backup cache 15, and the content of the primary cache 14 is a subset of the content of the backup cache 15. The virtual instruction cache 17 differs from the operation of the other two caches 14 and 15 in that there are no writes to the cache 17 from the CPU 10 except when instructions are fetched, and also the content of this cache 17 need not be a subset of the content of the caches 14 or 15, although it may be.

The CPU 10 accesses the backup cache 15 through a bus 19, separate from a CPU bus 20 used to access the system bus 11; thus, a cache controller for the backup cache 15 is included within the CPU chip. Both the CPU bus 20 and the system bus 11 are 64-bit bidirectional multiplexed address/data buses, accompanied by control buses containing request, grant, command lines, etc. The bus 19, however, has a 64-bit data bus and separate address buses. The system bus 11 is interconnected with the CPU bus 20 by an interface unit 21 functioning to arbitrate access by the CPU 10 and the other components on the CPU bus 20.

The CPU 10 includes an instruction unit 22 (referred to as the I-box) functioning to fetch macroinstructions (machine-level instructions) and to decode the instructions, one per cycle, and parse the operand specifiers, then begin the operand fetch. The data or address manipulation commanded by the instructions is done by an execution unit or E-box 23 which includes a register file and an ALU. The CPU is controlled by microcode so a microinstruction control unit 24 including a microsequencer and a control store is used to generate the sequence of microinstructions needed to implement the macroinstructions. A memory management unit or M-box 25 receives instruction read and data read requests from the instruction unit 22, and data read or write requests from the execution unit 23, performs address translation for the virtual memory system to generate physical addresses, and issues requests to the P-cache 14, or in the case of a miss, forwards the requests to the backup cache 15 via a cache controller 26. This cache controller or C-box 26 handles access to the backup (second level) cache 15 in the case of a P-cache miss, or access to the main memory 12 for backup cache misses. An on-chip floating point processor 27 (referred to as the F-box) is an execution unit for floating point and integer multiply instructions, receiving operands and commands from the execution unit 23 and delivering results back to the execution unit.

Although features of the invention may be used with various types of CPUs, the disclosed embodiment was intended to execute the VAX instruction set, so the machine-level or macroinstructions referred to are of variable size. An instruction may be from a minimum of one byte, up to a maximum of dozens of bytes long; the average instruction is about five bytes. Thus, the instruction unit 22 must be able to handle variable-length instructions, and in addition the instructions are not necessarily aligned on word boundaries in memory. The instructions manipulate data also of variable width, with the integer data units being set forth in FIG. 3. The internal buses and registers of the CPU 10 are generally 32-bits wide, 32-bits being referred to as a longword. Transfers of data to and from the caches 14 and 15 and the memory 12 are usually 64-bits at a time, and the buses 11 and 20 are 64-bits wide, referred to as a quadword (four words or eight bytes). The instruction stream is prefetched as quadwords and stored in a queue, then the particular bytes of the next instruction are picked out by the instruction unit 22 for execution. The instructions make memory references of byte, word, longword or quadword width, and these need not be aligned on longword or quadword boundaries, i.e., the memory is byte addressable. Some of the instructions in the instruction set execute in one machine cycle, but most require several cycles, and some require dozens of cycles, so the CPU 10 must accommodate not only variable sized instructions and instructions which reference variable data widths (aligned or non-aligned), but also instructions of varying execution time.

Even though the example embodiment to be described herein is intended to execute the VAX (Trademark) instruction set, nevertheless there are features of the invention useful in processors constructed to execute other instruction sets, such as those for 80386 or 68030 types.

Additional CPUs 28 may access the system bus 11 in a multiprocessor system. Each additional CPU can include its own CPU chip 10, cache 15 and interface unit 21, if these CPUs 28 are of the same design as the CPU 10. Alternatively, these other CPUs 28 may be of different construction but executing a compatible bus protocol to access the main system bus 11. These other CPUs 28 can access the memory 12, and so the blocks of data in the caches 14 or 15 can become obsolete. If a CPU 28 writes to a location in the memory 12 that happens to be duplicated in the cache 15 (or in the primary cache 14), then the data at this location in the cache 15 is no longer valid. For this reason, blocks of data in the caches 14 and 15 are "invalidated" when there is a write to memory 12 from a source other than the CPU 10 (such as the other CPUs 28). The cache 14 operates on a "write-through" principle, whereas the cache 15 operates on a "writeback" principle. When the CPU 10 executes a write to a location which happens to be in the primary cache 14, the data is written to this cache 14 and also to the backup cache 15 (and sometimes also to the memory 12, depending upon conditions); this type of operation is "writethrough". When the CPU 10 executes a write to a location which is in the backup cache 15, however, the write is not necessarily forwarded to the memory 12, but instead is written back to memory 12 only if another element in the system (such as a CPU 28) needs the data (i.e., tries to access this location in memory), or if the block in the cache is displaced (deallocated) from the cache 15.

The interface unit 21 has three bus ports. In addition to the CPU address/data port via bus 20 and the main system bus 11, a ROM bus 29 is provided for accessing a boot ROM as well as EEPROM, non-volatile RAM (with battery back up) and a clock/calendar chip. The ROM bus 29 is only 8-bits wide, as the time demands on ROM bus accesses are less stringent. This ROM bus can also access a keyboard and/or LCD display controller as well as other input devices such as a mouse. A serial input/output port to a console is also included in the interface 21, but will not be treated here.

Figure 2:
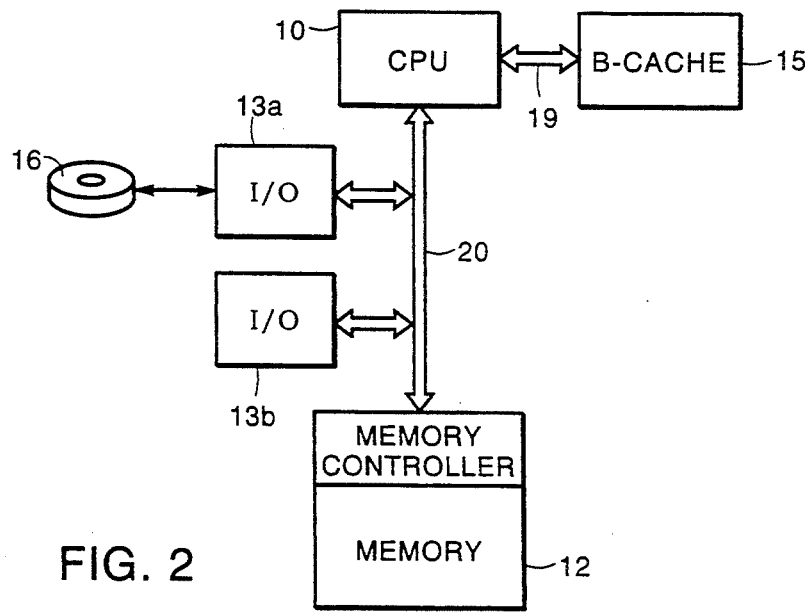
FIG. 2 is an electrical diagram in block form of a computer system as in FIG. 1, according to an alternative configuration.

The bus 20 may have other nodes connected to it; for example, as seen in FIG. 2, a low end configuration of a system using the CPU 10 may omit the interface/arbiter chip 21 and connect the memory 12 to the bus 20 (using a suitable memory interface). In this case the I/O must be connected to the bus 20 since there is no system bus 11. To this end, the disk 16 or other I/O is connected to one or two I/O nodes 13a and 13b, and each one of these can request and be granted ownership of the bus 20. All of the components on the bus 20 in the case of FIG. 2 are synchronous and operating under clock control from the CPU 10, whereas in the case of FIG. 1 the system bus 11 is asynchronous to the bus 20 and the CPU 10 and operates on its own clock.

Accordingly, the CPU 10 herein disclosed is useful in many different classes of computer systems, ranging from desktop style workstations or PCs for individual users, to full-scale configurations servicing large departments or entities. In one example, the system of FIG. 1 may have a backup cache 15 of 256K bytes, a main memory 20 of 128M bytes, and a disk 16 capacity of perhaps 1G byte or more. In this example, the access time of the backup cache 15 may be about 25 nsec (two CPU machine cycles), while the access time of the main memory 20 from the CPU 10 via bus 11 may be ten or twenty times that of the backup cache; the disk 16, of course, has an access time of more than ten times that of the main memory. In a typical system, therefore, the system performance depends upon executing as much as possible from the caches.

Although shown in FIG. 1 as employing a multiplexed 64-bit address/data bus 11 or 20, the invention may be implemented in a system using separate address and data busses as illustrated in U.S. Pat. No. 4,875,160, for example.

Referring to FIG. 3, the integer data types or memory references discussed herein include a byte (eight bits), a word (two bytes), a longword (four bytes), and a quadword (eight bytes or 64-bits). The data paths in the CPU 10 are generally quadword width, as are the data paths of the busses 11 and 20. Not shown in FIG. 3, but referred to herein, is a hexaword, which is sixteen words (32-bytes) or four quadwords.

Clocks and Timing

Referring to FIG. 4, a clock generator 30 in the CPU chip 10 of FIG. 1 generates four overlapping clocks Phi1, Phi2, Phi3, and Phi4 used to define four phases P1, P2, P3, and P4 of a machine cycle. In an example embodiment, the machine cycle is nominally 14 nsec, so the clocks Phi1, etc., are at about 71-MHz; alternatively, the machine cycle may be 10 nsec, in which case the clock frequency is 100 MHz. The bus 20 and system bus 11, however, operate on a bus cycle which is three times longer than the machine cycle of the CPU, so in this example the bus cycle, also shown in FIG. 4, is nominally 42 nsec (or, for 100 MHz clocking, the bus cycle would be 30 nsec). The bus cycle is likewise defined by four overlapping clocks Phi1, Phi2, Phi3, and Phi4 produced by the clock generator 30 serving to define four phases PB1, PB2, PB3 and PB4 of the bus cycle. The system bus 11, however, operates on a longer bus cycle of about twice as long as that of the bus 20, e.g., about 64 nsec, and this bus cycle is asynchronous to the CPU 10 and bus 20. The timing cycle of the system bus 11 is controlled by a clock generator 31 in the interface unit 21.

The CPU Chip

Referring to FIG. 5, the internal construction of the CPU chip 10 is illustrated in general form. The instruction unit 22 includes the virtual instruction cache 17 which is a dedicated instruction-stream-only cache of 2K byte size, in this example, storing the most recently used blocks of the instruction stream, using virtual addresses rather than physical addresses as are used for accessing the caches 14 and 15 and the main memory 12. That is, an address for accessing the virtual instruction cache 17 does not need address translation as is done in the memory management unit 25 for other memory references. Instructions are loaded from the instruction cache 17 to a prefetch queue 32 holding sixteen bytes. The instruction unit 22 has an instruction burst unit 33 which breaks an instruction into its component parts (opcode, operand specifiers, specifier extensions, etc.), decodes macroinstructions and parses operand specifiers, producing instruction control (such as dispatch addresses) which is sent by a bus 34 to an instruction queue 35 in the microinstruction controller 24. Information from the specifiers needed for accessing the operands is sent by a bus 36 to a source queue 37 and a destination queue 38 in the execution unit 23. The instruction unit 22 also includes a branch prediction unit 39 for predicting whether or not a conditional branch will be taken, and for directing the addressing sequence of the instruction stream accordingly. A complex specifier unit 40 in the instruction unit 22 is an auxiliary address processor (instead of using the ALU in the execution unit 23) for accessing the register file and otherwise producing the addresses for operands before an instruction is executed in the execution unit 23.

The execution unit 23 (under control of the microinstruction control unit 24) performs the actual "work" of the macroinstructions, implementing a four-stage micropipelined unit having the ability to stall and to trap. These elements dequeue the instruction and operand information provided by the instruction unit 22 via the queues 35, 37 and 38. For literal types of operands, the source queue 37 contains the actual operand value from the instruction, while for register or memory type operands the source queue 37 holds a pointer to the data in a register file 41 in the execution unit 23.

The microinstruction control unit 24 contains a microsequencer 42 functioning to determine the next microword to be fetched from a control store 43. The control store is a ROM or other memory of about 1600-word size producing a microcode word of, for example, 61-bits width, one each machine cycle, in response to an 11-bit address generated by the microsequencer 42. The microsequencer receives an 11-bit entry point address from the instruction unit 22 via the instruction queue 35 to begin a microroutine dictated by the macroinstruction. The microinstructions produced in each cycle by from the control store 43 are coupled to the execution unit 23 by a microinstruction bus 44.

The register file 41 contained in the execution unit 23 includes fifteen general purpose registers, a PC (program counter), six memory data registers, six temporary or working registers and ten state registers. The execution unit 23 also contains a 32-bit ALU 45 and a 64-bit shifter 46 to perform the operation commanded by the macroinstruction, as defined by the microinstructions received on the bus 44.

The floating point unit 27 receives 32- or 64-bit operands on two 32-bit buses 47 and 48 from the A and B inputs of the ALU 45 in the execution unit 23, and produces a result on a result bus 49 going back to the execution unit 23. The floating point unit 27 receives a command for the operation to be performed, but then executes this operation independently of the execution unit 23, signalling and delivering the operand when it is finished. As is true generally in the system of FIG. 1, the floating point unit 27 queues the result to be accepted by the execution unit 23 when ready. The floating point unit 27 executes floating point adds in two cycles, multiplies in two cycles and divides in seventeen to thirty machine cycles, depending upon the type of divide.

The output of the floating point unit 27 on bus 49 and the outputs of the ALU 45 and shifter 46 are merged (one is selected in each cycle) by a result multiplexer or Rmux 50 in the execution unit 23. The selected output from the Rmux is either written back to the register file 45, or is coupled to the memory management unit 25 by a write bus 51, and memory requests are applied to the memory management unit 25 from the execution unit 23 by a virtual address bus 52.

The memory management unit 25 receives read requests from the instruction unit 22 (both instruction stream and data stream) by a bus 53 and from the execution unit 23 (data stream only) via address bus 52. A memory data bus 54 delivers memory read data from the memory management unit 25 to either the instruction unit 22 (64-bits wide) or the execution unit 23 (32-bits wide). The memory management unit 25 also receives write/store requests from the execution unit 23 via write data bus 51, as well as invalidates, primary cache 14 fills and return data from the cache controller unit 26. The memory management unit 25 arbitrates between these requesters, and queues requests which cannot currently be handled. Once a request is started, the memory management unit 25 performs address translation, mapping virtual to physical addresses, using a translation buffer or address cache 55. This lookup in the address cache 55 takes one machine cycle if there are no misses. In the case of a miss in the TB 55, the memory management circuitry causes a page table entry to be read from page tables in memory and a TB fill performed to insert the address which missed. This memory management circuitry also performs all access checks to implement the page protection function, etc. The P-cache 14 referenced by the memory management unit 25 is a two-way set associative write-through cache with a block and fill size of 32-bytes. The P-cache state is maintained as a subset of the backup cache 15. The memory management unit 25 circuitry also ensures that specifier reads initiated by the instruction unit 22 are ordered correctly when the execution unit 23 stores this data in the register file 41; this ordering, referred to as "scoreboarding" is accomplished by a physical address queue 56 which is a small list of physical addresses having a pending execution unit 23 store. Memory requests received by the memory management unit 25 but for which a miss occurs in the primary cache 14 are sent to the cache controller unit 26 for execution by a physical address bus 57, and (for writes) a data bus 58. Invalidates are received by the memory management unit 25 from the cache controller unit 26 by an address bus 59, and fill data by the data bus 58.

The cache controller unit 26 is the controller for the backup cache 15, and interfaces to the external CPU bus 20. The cache controller unit 26 receives read requests and writes from the memory management unit 25 via physical address bus 57 and data bus 58, and sends primary cache 14 fills and invalidates to the memory management unit 25 via address bus 59 and data bus 58. The cache controller unit 26 ensures that the primary cache 14 is maintained as a subset of the backup cache 15 by the invalidates. The cache controller unit 26 receives cache coherency transactions from the bus 20, to which it responds with invalidates and writebacks, as appropriate. Cache coherence in the system of FIGS. 1 and 5 is based upon the concept of ownership; a hexaword (16-word) block of memory may be owned either by the memory 12 or by a backup cache 15 in a CPU on the bus 11—in a multiprocessor system, only one of the caches, or memory 12, may own the hexaword block at a given time, and this ownership is indicated by an ownership bit for each hexaword in both memory 12 and the backup cache 15 (1 for own, 0 for not-own). Both the tags and data for the backup cache 15 are stored in off-chip RAMs, with the size and access time selected as needed for the system requirements. The backup cache 15 may be of a size of from 128K to 2M bytes, for example. With access time of 28 nsec, the cache can be referenced in two machine cycles, assuming 14 nsec machine cycle for the CPU 10. The cache controller unit 26 packs sequential writes to the same quadword in order to minimize write accesses to the backup cache. Multiple write commands from the memory management unit 25 are held in an eight-word write queue 60. The cache controller unit 26 is also the interface to the multiplexed address/data bus 20, and an input data queue 61 loads fill data and writeback requests from the bus 20 to the CPU 10. A non-writeback queue 62 and a writeback queue 63 in the cache controller unit 26 hold read requests and writeback data, respectively, to be sent to the main memory 12 over the bus 20.

Pipelining in the CPU

The CPU 10 is pipelined on a macroinstruction level. An instruction requires seven pipeline segments to finish execution, these being generally an instruction fetch segment S0, an instruction decode segment S1, an operand definition segment S2, a register file access segment S3, an ALU segment S4, an address translation segment S5, and a store segment S6, as seen in FIG. 6. In an ideal condition where there are no stalls, the overlap of sequential instructions #1 to #7 of FIG. 6 is complete, so during segment S6 of instruction #1 the S0 segment of instruction #7 executes, and the instructions #2 to #6 are in intermediate segments. When the instructions are in sequential locations (no jumps or branches), and the operands are either contained within the instruction stream or are in the register file 41 or in the primary cache 14, the CPU 10 can execute for periods of time in the ideal instruction-overlap situation as depicted in FIG. 6. However, when an operand is not in a register 43 or primary cache 14, and must be fetched from backup cache 15 or memory 12, or various other conditions exist, stalls are introduced and execution departs from the ideal condition of FIG. 6.

Referring to FIG. 7, the hardware components of each pipeline segment S0-S6 are shown for the CPU 10 in general form. It is understood that only macroinstruction pipeline segments are being referred to here; there is also micropipelining of operations in most of the segments, i.e., if more than one operation is required to process a macroinstruction, the multiple operations are also pipelined within a section.

If an instruction uses only operands already contained within the register file 41, or literals contained within the instruction stream itself, then it is seen from FIG. 7 that the instruction can execute in seven successive cycles, with no stalls. First, the flow of normal macroinstruction execution in the CPU 10 as represented in FIG. 7 will be described, then the conditions which will cause stalls and exceptions will be described.

Execution of macroinstructions in the pipeline of the CPU 10 is decomposed into many smaller steps which are implemented in various distributed sections of the chip. Because the CPU 10 implements a macroinstruction pipeline, each section is relatively autonomous, with queues inserted between the sections to normalize the processing rates of each section.

The instruction unit 22 fetches instruction stream data for the next instruction, decomposing the data into opcode and specifiers, and evaluating the specifiers with the goal of prefetching operands to support execution unit 23 execution of the instruction. These functions of the instruction unit 22 are distributed across segments S0 through S3 of the pipeline, with most of the work being done in S1. In S0, instruction stream data is fetched from the virtual instruction cache 17 using the address contained in the virtual instruction buffer address (VIBA) register 65. The data is written into the prefetch queue 32 and VIBA 65 is incremented to the next location. In segment S1, the prefetch queue 32 is read and the burst unit 33 uses internal state and the contents of a table 66 (a ROM and/or PLA to look up the instruction formats) to select from the bytes in queue 32 the next instruction stream component—either an opcode or specifier. Some instruction components take multiple cycles to burst; for example, a two-byte opcode, always starting with FDhex in the VAX instruction set, requires two burst cycles: one for the FD byte, and one for the second opcode byte. Similarly, indexed specifiers require at least two burst cycles: one for the index byte, and one or more for the base specifier.

When an opcode is decoded by the burst unit 33, the information is passed via bus 78 to an issue unit 68 which consults the table 66 for the initial address (entry point) in the control store 43 of the routine which will process the instruction. The issue unit 68 sends the address and other instruction-related information to the instruction queue 35 where it is held until the execution unit 23 reaches this instruction.

When a specifier is decoded, the information is passed via the bus 78 to the operand queue unit 69 for allocation to the source and destination queues 37 and 38 and, potentially, to the pipelined complex specifier unit 40. The operand queue unit 69 allocates the appropriate number of entries for the specifier in the source and destination queues 37 and 38 in the execution unit 23. These queues 37 and 38 contain pointers to operands and results. If the specifier is not a short literal or register specifier, these being referred to as simple specifiers, it is thus considered to be a complex specifier and is processed by the microcode-controlled complex specifier unit 40, which is distributed in segments S1 (control store access), S2 (operand access, including register file 41 read), and S3 (ALU 45 operation, memory management unit 25 request, GPR write) of the pipeline. The pipeline of the complex specifier unit 40 computes all specifier memory addresses, and makes the appropriate request to the memory management unit 25 for the specifier type. To avoid reading or writing a GPR which is interlocked by a pending execution unit 23 reference, the complex specifier unit 40 pipe includes a register scoreboard (SBU 81 in FIG. 8) which detects data dependencies. The pipeline of the complex specifier unit 40 also supplies to the execution unit 23 operand information that is not an explicit part of the instruction stream; for example, the PC is supplied as an implicit operand for instructions that require it.

During S1, the branch prediction unit 39 watches each opcode that is decoded looking for conditional and unconditional branches. For unconditional branches, the branch prediction unit 39 calculates the target PC and redirects PC and VIBA to the new path. For conditional branches, the branch prediction unit 39 predicts whether the instruction will branch or not based on previous history. If the prediction indicates that the branch will be taken, PC and VIBA are redirected to the new path. The branch prediction unit 39 writes the conditional branch prediction flag into a branch queue 70 in the execution unit 23, to be used by the execution unit 23 in the execution of the instruction. The branch prediction unit 39 maintains enough state to restore the correct instruction PC if the prediction turns out to be incorrect.

The microinstruction control unit 24 operates in segment S2 of the pipeline and functions to supply to the execution unit 23 the next microinstruction to execute. If a macroinstruction requires the execution of more than one microinstruction, the microinstruction control unit 24 supplies each microinstruction in sequence based on directive included in the previous microinstruction. At macroinstruction boundaries, the microinstruction control unit 24 removes the next entry from the instruction queue 35, which includes the initial microinstruction address for the macroinstruction. If the instruction queue 35 is empty, the microinstruction control unit 24 supplies the address of the no-op microinstruction. The microinstruction control unit 24 also evaluates all exception requests, and provides a pipeline flush control signal to the execution unit 23. For certain exceptions and interrupts, the microinstruction control unit 24 injects the address of an appropriate microinstruction handler that is used to respond to the event.

The execution unit 23 executes all of the non-floating point instructions, delivers operands to and receives results from the floating point unit 27 via buses 47, 48 and 49, and handles non-instruction events such as interrupts and exceptions. The execution unit 23 is distributed through segments S3, S4 and S5 of the pipeline; S3 includes operand access, including read of the register file 41; S4 includes ALU 45 and shifter 46 operation, RMUX 50 request; and S5 includes RMUX 50 completion, write to register file 41, completion of memory management unit 25 request. For the most part, instruction operands are prefetched by the instruction unit 22, and addressed indirectly through the source queue 37. The source queue 37 contains the operand itself for short literal specifiers, and a pointer to an entry in the register file 41 for other operand types.

An entry in a field queue 71 is made when a field-type specifier entry is made into the source queue 37. The field queue 71 provides microbranch conditions that allow the microinstruction control unit 42 to determine if a field-type specifier addresses either a GPR or memory. A microbranch on a valid field queue entry retires the entry from the queue.

The register file 41 is divided into four parts: the general processor registers (GPRs), memory data (MD) registers, working registers, and CPU state registers. For a register-mode specifier, the source queue 37 points to the appropriate GPR in the register file 41, or for short literal mode the queue contains the operand itself; for the other specifier modes, the source queue 37 points to an MD register containing the address of the specifier (or address of the address of the operand, etc.). The MD Register is either written directly by the instruction unit 22, or by the memory management unit 25 as the result of a memory read generated by the instruction unit 22.

In the S3 segment of the execution unit 23 pipeline, the appropriate operands for the execution unit 23 and floating point unit 27 execution of instructions are selected. Operands are selected onto ABUS and BBUS for use in both the execution unit 23 and floating point unit 27. In most instances, these operands come from the register file 41, although there are other data path sources of non-instruction operands (such as the program status long-word PSL).

The execution unit 23 computation is done by the ALU 45 and the shifter 46 in the S4 segment of the pipeline on operands supplied by the S3 segment. Control of these units is supplied by the microinstruction which was originally supplied to the S3 segment by the control store 43, and then subsequently moved forward in the microinstruction pipeline.

The S4 segment also contains the Rmux 50 which selects results from either the execution unit 23 or floating point unit 27 and performs the appropriate register or memory operation. The Rmux inputs come from the ALU 45, shifter 46, and floating point unit 27 result bus 49 at the end of the cycle. The Rmux 50 actually spans the S4/S5 boundary such that its outputs are valid at the beginning of the S5 segment. The Rmux 50 is controlled by the retire queue 72, which specifies the source (either execution unit 23 or floating point unit 27) of the result to be processed (or retired) next. Non-selected Rmux sources are delayed until the retire queue 72 indicates that they should be processed. The retire queue 72 is updated from the order of operations in the instructions of the instruction stream.

As the source queue 37 points to instruction operands, so the destination queue 38 points to the destination for instruction results. If the result is to be stored in a GPR, the destination queue 38 contains a pointer to the appropriate GPR. If the result is to be stored in memory, the destination queue 38 indicates that a request is to be made to the memory management unit 25, which contains the physical address of the result in the PA queue 56. This information is supplied as a control input to the Rmux 50 logic.

Once the Rmux 50 selects the appropriate source of result information, it either requests memory management unit 25 service, or sends the result onto the write bus 73 to be written back the register file 41 or to other data path registers in the S5 segment of the pipeline. The interface between the execution unit 23 and memory management unit 25 for all memory requests is the EM-latch 74, which contains control information and may contain an address, data, or both, depending on the type of request. In addition to operands and results that are prefetched by the instruction unit 22, the execution unit 23 can also make explicit memory requests to the memory management unit 25 to read or write data.

The floating point unit 27 executes all of the floating point instructions in the instruction set, as well as the long-word-length integer multiply instructions. For each instruction that the floating point unit 27 is to execute, it receives from the microinstruction control unit 24 the opcode and other instruction-related information. The floating point unit 27 receives operand data from the execution unit 23 on buses 47 and 48. Execution of instructions is performed in a dedicated floating point unit 27 pipeline that appears in segment S4 of FIG. 7, but is actually a minimum of three cycles in length. Certain instructions, such as integer multiply, may require multiple passes through some segments of the floating point unit 27 pipeline. Other instructions, such as divided, are not pipelined at all. The floating point unit 27 results and status are returned in S4 via result bus 49 to the Rmux 50 in the execution unit 23 for retirement. When an Fbox instruction is next to retire as defined by the retire queue 72, the Rmux 50, as directed by the destination queue 38, sends the results to either the GPRs for register destinations, or to the memory management unit 25 for memory destinations.

The memory management unit 25 operates in the S5 and S6 segments of the pipeline, and handles all memory references initiated by the other sections of the chip. Requests to the memory management unit 25 can come from the instruction unit 22 (for virtual instruction cache 17 fills and for specifier references), from the execution unit 23 or floating point unit 27 via the Rmux 50 and the EM-latch 74 (for instruction result stores and for explicit execution unit 23 memory request), from the memory management unit 25 itself (for translation buffer fills and PTE reads), or from the cache controller unit 26 (for invalidates and cache fills). All virtual references are translated to a physical address by the TB or translation buffer 64, which operates in the S5 segment of the pipeline. For instruction result references generated by the instruction unit 22, the translated address is stored in the physical address queue 56 (PA queue). These addresses are later matched with data from the execution unit 23 or floating point unit 27, when the result is calculated.

The cache controller unit 26 maintains and accesses the backup cache 15, and controls the off-chip bus (the CPU bus 20). The cache controller unit 26 receives input (memory requests) from the memory management unit 25 in the S6 segment of the pipeline, and usually takes multiple cycles to complete a request. For this reason, the cache controller unit 26 is not shown in specific pipeline segments. If the memory read misses in the Primary cache 14, the request is sent to the cache controller unit 26 for processing. The cache controller unit 26 first looks for the data in the Backup cache 15 and fills the block in the Primary cache 14 from the Backup cache 15 if the data is present. If the data is not present in the Backup cache 15, the cache controller unit 26 requests a cache fill on the CPU bus 20 from memory 12. When memory 12 returns the data, it is written to both the Backup cache 15 and to the Primary cache 14 (and potentially to the virtual instruction cache 17). Although Primary cache 14 fills are done by making a request to the memory management unit 25 pipeline, data is returned to the original requester as quickly as possible by driving data directly onto the data bus 75 and from there onto the memory data bus 54 as soon as the bus is free.

Despite the attempts at keeping the pipeline of FIG. 6 flowing smoothly, there are conditions which cause segments of the pipeline to stall. Conceptually, each segment of the pipeline can be considered as a black box which performs three steps every cycle:

(1) The task appropriate to the pipeline segment is performed, using control and inputs from the previous pipeline segment. The segment then updates local state (within the segment), but not global state (outside of the segment).

(2) Just before the end of the cycle, all segments send stall conditions to the appropriate state sequencer for that segment, which evaluates the conditions and determines which, if any, pipeline segments must stall.

(3) If no stall conditions exist for a pipeline segment, the state sequencer allows it to pass results to the next segment and accept results from the previous segment. This is accomplished by updating global state.

The sequence of steps maximizes throughout by allowing each pipeline segment to assume that a stall will not occur (which should be the common case). If a stall does occur at the end of the cycle, global state updates are blocked, and the stalled segment repeats the same task (with potentially different inputs) in the next cycle (and the next, and the next) until the stall condition is removed. This description is over-simplified in some cases because some global state must be updated by a segment before the stall condition is known. Also, some tasks must be performed by a segment once and only once. These are treated specially on a case-by-case basis in each segment.

Within a particular section of the chip, a stall in one pipeline segment also causes stalls in all upstream segments (those that occur earlier in the pipeline) of the pipeline. Unlike the system of U.S. Pat. No. 4,875,160, stalls in one segment of the pipeline do not cause stalls in downstream segments of the pipeline. For example, a memory data stall in that system also caused a stall of the downstream ALU segment. In the CPU 10, a memory data stall does not stall the ALU segment (a no-op is inserted into the S5 segment when S4 advances to S5).

There are a number of stall conditions in the chip which result in a pipeline stall. Each is discussed briefly below.

In the S0 and S1 segments of the pipeline, stalls can occur only in the instruction unit 22. In S0, there is only one stall that can occur:

(1) Prefetch queue 32 full: In normal operation, the virtual instruction cache 17 is accessed every cycle using the address in VIBA 65, the data is sent to the prefetch queue 32, and VIBA 65 is incremented. If the prefetch queue 32 is full, the increment of VIBA is blocked, and the data is re-referenced in the virtual instruction cache 17 each cycle until there is room for it in the prefetch queue 32. At that point, prefetch resumes.

In the S1 segment of the pipeline there are seven stalls that can occur in the instruction unit 22:

(1) Insufficient data in the prefetch queue 32: The burst unit 33 attempts to decode the next instruction component each cycle. If there are insufficient prefetch queue 32 bytes valid to decode the entire component, the burst unit 33 stalls until the required bytes are delivered from the virtual instruction cache 17.

(2) Source queue 37 or destination queue 38 full: During specifier decoding, the source and destination queue allocation logic must allocate enough entries in each queue to satisfy the requirements of the specifier being parsed. To guarantee that there will be sufficient resources available, there must be at least two free source queue entries and two free destination queue entries to complete the burst of the specifier. If there are insufficient free entries in either queue, the burst unit 33 stalls until free entries become available.

(3) MD file full: When a complex specifier is decoded, the source queue 37 allocation logic must allocate enough memory data registers in the register file 41 to satisfy the requirements of the specifier being parsed. To guarantee that there will be sufficient resources available, there must be at least two free memory data registers available in the register file 41 to complete the burst of the specifier. If there are insufficient free registers, the burst unit 33 stalls until enough memory data registers become available.

(4) Second conditional branch decoded: The branch prediction unit 39 predicts the path that each conditional branch will take and redirects the instruction stream based on that prediction. It retains sufficient state to restore the alternate path if the prediction was wrong. If a second conditional branch is decoded before the first is resolved by the execution unit 23, the branch prediction unit 39 has nowhere to store the state, so the burst unit 33 stalls until the execution unit 23 resolves the actual direction of the first branch.

(5) Instruction queue full: When a new opcode is decoded by the burst unit 33, the issue unit 68 attempts to add an entry for the instruction to the instruction queue 35. If there are no free entries to the instruction queue 35, the burst unit 33 stalls until a free entry becomes available, which occurs when an instruction is retired through the Rmux 50.

(6) Complex specifier unit busy: If the burst unit 33 decodes an instruction component that must be processed by the pipeline of the complex specifier unit 40, it makes a request for service by the complex specifier unit 40 through an S1 request latch. If this latch is still valid from a previous request for service (either due to a multi-cycle flow or a complex specifier unit 40 stall), the burst unit 33 stalls until the valid bit in the request latch is cleared.

(7) Immediate data length not available: The length of the specifier extension for immediate specifiers is dependent on the data length of the specifier for that specific instruction. The data length information comes from the instruction ROM/PLA table 66 which is accessed based on the opcode of the instruction. If the table 66 access is not complete before an immediate specifier is decoded (which would have to be the first specifier of the instruction), the burst unit 33 stalls for one cycle.

In the S2 segment of the pipeline, stalls can occur in the instruction unit 22 or microcode controller 24. In the instruction unit 22 two stalls can occur:

(1) Outstanding execution unit 23 or floating point unit 27 GPR write: In order to calculate certain specifier memory addresses, the complex specifier unit 40 must read the contents of a GPR from the register file 41. If there is a pending execution unit 23 or floating point unit 27 write to the register, the instruction unit 22 GPR scoreboard (81 in FIG. 8) prevents the GPR read by stalling the S2 segment of the pipeline of the complex specifier unit 40. The stall continues until the GPR write completes.

(2) Memory data not valid: For certain operations, the instruction unit 22 makes a memory management unit 25 request to return data which is used to complete the operation (e.g., the read done for the indirect address of a displacement deferred specifier). The instruction unit 22 MD register contains a valid bit which is cleared when a request is made, and set when data returns in response to the request. If the instruction unit 22 references the instruction unit 22 MD register when the valid bit is off, the S2 segment of the pipeline of the complex specifier unit 40 stalls until the data is returned by the memory management unit 25.

In the microcode controller 24, one stall can occur during the S2 segment:

(1) Instruction queue empty: The final microinstruction of an execution flow of a macroinstruction is indicated in the execution unit 23 when a last-cycle microinstruction is decoded by the microinstruction control unit 24. In response to this event, the execution unit 23 expects to receive the first microinstruction of the next macroinstruction flow based on the initial address in the instruction queue 35. If the instruction queue 35 is empty, the microinstruction control unit 24 supplies the instruction queue stall microinstruction in place of the next macroinstruction flow. In effect, this stalls the microinstruction control unit 24 for one cycle.

In the S3 segment of the pipeline, stalls can occur in the instruction unit 22, in the execution unit 23 or in either execution unit 23 or instruction unit 22. In the instruction unit 22, there are three possible S3 stalls:

(1) Outstanding execution unit 23 GPR read: In order to complete the processing for auto-increment, auto-decrement, and auto-increment deferred specifiers, the complex specifier unit 40 must update the GPR with the new value. If there is a pending execution unit 23 read to the register through the source queue 37, the instruction unit 22 scoreboard prevents the GPR write by stalling the S3 segment of the pipeline of the complex specifier unit 40. The stall continues until the execution unit 23 reads the GPR.

(2) Specifier queue full: For most complex specifiers, the complex specifier unit 40 makes a request for memory management unit 25 service for the memory request required by the specifier. If there are no free entries in a specifier queue 75, the S3 segment of the pipeline of the complex specifier unit 40 stalls until a free entry becomes available.

(3) RLOG full: Auto-increment, auto-decrement, and auto-increment deferred specifiers require a free register log (RLOG 94 in FIG. 8) entry in which to log the change to the GPR. If there are no free RLOG entries when such a specifier is decoded, the S3 segment of the pipeline of the complex specifier unit 40 stalls until a free entry becomes available.

In the execution unit 23, four stalls can occur in the S3 segment:

(1) Memory read data not valid: In some instances, the execution unit 23 may make an explicit read request to the memory management unit 25 to return data in one of the six execution unit 23 working registers in the register file 41. When the request is made, the valid bit on the register is cleared. When the data is written to the register, the valid bit is set. If the execution unit 23 references the working register in the register file 41 when the valid bit is clear, the S3 segment of the execution unit 23 pipeline stalls until the entry becomes valid.

(2) Field queue not valid: For each macroinstruction that includes a field-type specifier, the microcode microbranches on the first entry in the field queue 71 to determine whether the field specifier addresses a GPR or memory. If the execution unit 23 references the working register when the valid bit is clear, the S3 segment of the execution unit 23 pipeline stalls until the entry becomes valid.

(3) Outstanding Fbox GPR write: Because the floating point unit 27 computation pipeline is multiple cycles long, the execution unit 23 may start to process subsequent instructions before the floating point unit 27 completes the first. If the floating point unit 27 instruction result is destined for a GPR in the register file 41 that is referenced by a subsequent execution unit 23 microword, the S3 segment of the execution unit 23 pipeline stalls until the floating point unit 27 write to the GPR occurs.

(4) Fbox instruction queue full: When an instruction is issued to the floating point unit 27, an entry is added to the floating point unit 27 instruction queue. If there are no free entries in the queue, the S3 segment of the execution unit 23 pipeline stalls until a free entry becomes available.

Two stalls can occur in either execution unit 23 or floating point unit 27 in S3:

(1) Source queue empty: Most instruction operands are prefetched by the instruction unit 22, which writes a pointer to the operand value into the source queue 37. The execution unit 23 then references up to two operands per cycle indirectly through the source queue 37 for delivery to the execution unit 23 or floating point unit 27. If either of the source queue entries referenced is not valid, the S3 segment of the execution unit 23 pipeline stalls until the entry becomes valid.

(2) Memory operand not valid: Memory operands are prefetched by the instruction unit 22, and the data is written by the either the memory management unit 25 or instruction unit 22 into the memory data registers in the register file 41. If a referenced source queue 37 entry points to a memory data register which is not valid, the S3 segment of the execution unit 23 pipeline stalls until the entry becomes valid.

In segment S4 of the pipeline, two stalls can occur in the execution unit 23, one in the floating point unit 27, and four in either execution unit 23 or floating point unit 27. In the execution unit 23:

(1) Branch queue empty: When a conditional or unconditional branch is decoded by the instruction unit 22, an entry is added to the branch queue 70. For conditional branch instructions, the entry indicates the instruction unit 22 prediction of the branch direction. The branch queue is referenced by the execution unit 23 to verify that the branch displacement was valid, and to compare the actual branch direction with the prediction. If the branch queue entry has not yet been made by the instruction unit 22, the S4 segment of the execution unit 23 pipeline stalls until the entry is made.

(2) Fbox GPR operand scoreboard full: The execution unit 23 implements a register scoreboard to prevent the execution unit 23 from reading a GPR to which there is an outstanding write by the floating point unit 27. For each floating point unit 27 instruction which will write a GPR result, the execution unit 23 adds an entry to the floating point unit 27 GPR scoreboard. If the scoreboard is full when the execution unit 23 attempts to add an entry, the S4 segment of the execution unit 23 pipeline stalls until a free entry becomes available.

In the floating point unit 27, one stall can occur in S4:

(1) Fbox operand not valid: Instructions are issued to the floating point unit 27 when the opcode is removed from the instruction 35 queue by the microinstruction control unit 24. Operands for the instruction may not arrive via busses 47, 48 until some time later. If the floating point unit 27 attempts to start the instruction execution when the operands are not yet valid, the floating point unit 27 pipeline stalls until the operands become valid.

In either the execution unit 23 or floating point unit 27, these four stalls can occur in pipeline segment S4:

(1) Destination queue empty: Destination specifiers for instructions are processed by the instruction unit 22, which writes a pointer to the destination (either GPR or memory) into the destination queue 38. The destination queue 38 is referenced in two cases: When the execution unit 23 or floating point unit 27 store instruction results via the Rmux 50, and when the execution unit 23 tries to add the destination of floating point unit 27 instructions to the execution unit 23 GPR scoreboard. If the destination queue entry is not valid (as would be the case if the instruction unit 22 has not completed processing the destination specifier), a stall occurs until the entry becomes valid.

(2) PA queue empty: For memory destination specifiers, the instruction unit 22 sends the virtual address of the destination to the memory management unit 25, which translates it and adds the physical address to the PA queue 56. If the destination queue 38 indicates that an instruction result is to be written to memory, a store request is made to the memory management unit 25 which supplies the data for the result. The memory management unit 25 matches the data with the first address in the PA queue 56 and performs the write. If the PA queue is not valid when the execution unit 23 or floating point unit 27 has a memory result ready, the Rmux 50 stalls until the entry becomes valid. As a result, the source of the Rmux input (execution unit 23 or floating point unit 27) also stalls.

(3) EM-latch full: All implicit and explicit memory requests made by the execution unit 23 or floating point unit 27 pass through the EM-latch 74 to the memory management unit 25. If the memory management unit 25 is still processing the previous request when a new request is made, the Rmux 30 stalls until the previous request is completed. As a result, the source of the Rmux 50 input (execution unit 23 or floating point unit 27) also stalls.

(4) Rmux selected to other source: Macroinstructions must be completed in the order in which they appear in the instruction stream. The execution unit 23 retire queue 72 determines whether the next instruction to complete comes from the execution unit 23 or the floating point unit 27. If the next instruction should come from one source and the other makes a Rmux 50 request, the other source stalls until the retire queue indicates that the next instruction should come from that source.

In addition to stalls, pipeline flow can depart from the ideal by "exceptions". A pipeline exception occurs when a segment of the pipeline detects an event which requires that the normal flow of the pipeline be stopped in favor of another flow. There are two fundamental types of pipeline exceptions: those that resume the original pipeline flow once the exception is corrected, and those that require the intervention of the operating system. A miss in the translation buffer 55 on a memory reference is an example of the first type, and an access control (memory protection) violation is an example of the second type.

Restartable exceptions are handled entirely within the confines of the section that detected the event. Other exceptions must be reported to the execution unit 23 for processing. Because the CPU 10 is macropipelined, exceptions can be detected by sections of the pipeline long before the instruction which caused the exception is actually executed by the execution unit 23 or floating point unit 27. However, the reporting of the exception is deferred until the instruction is executed by the execution unit 23 or floating point unit 27. At that point, an execution unit 23 handler is invoked to process the event.

Because the execution unit 23 and floating point unit 27 are micropipelined, the point at which an exception handler is invoked must be carefully controlled. For example, three macroinstructions may be in execution in segments S3, S4 and S5 of the execution unit 23 pipeline. If an exception is reported for the macroinstruction in the S3 segment, the two macroinstructions that are in the S4 and S5 segments must be allowed to complete before the exception handler is invoked.

Figure 8:
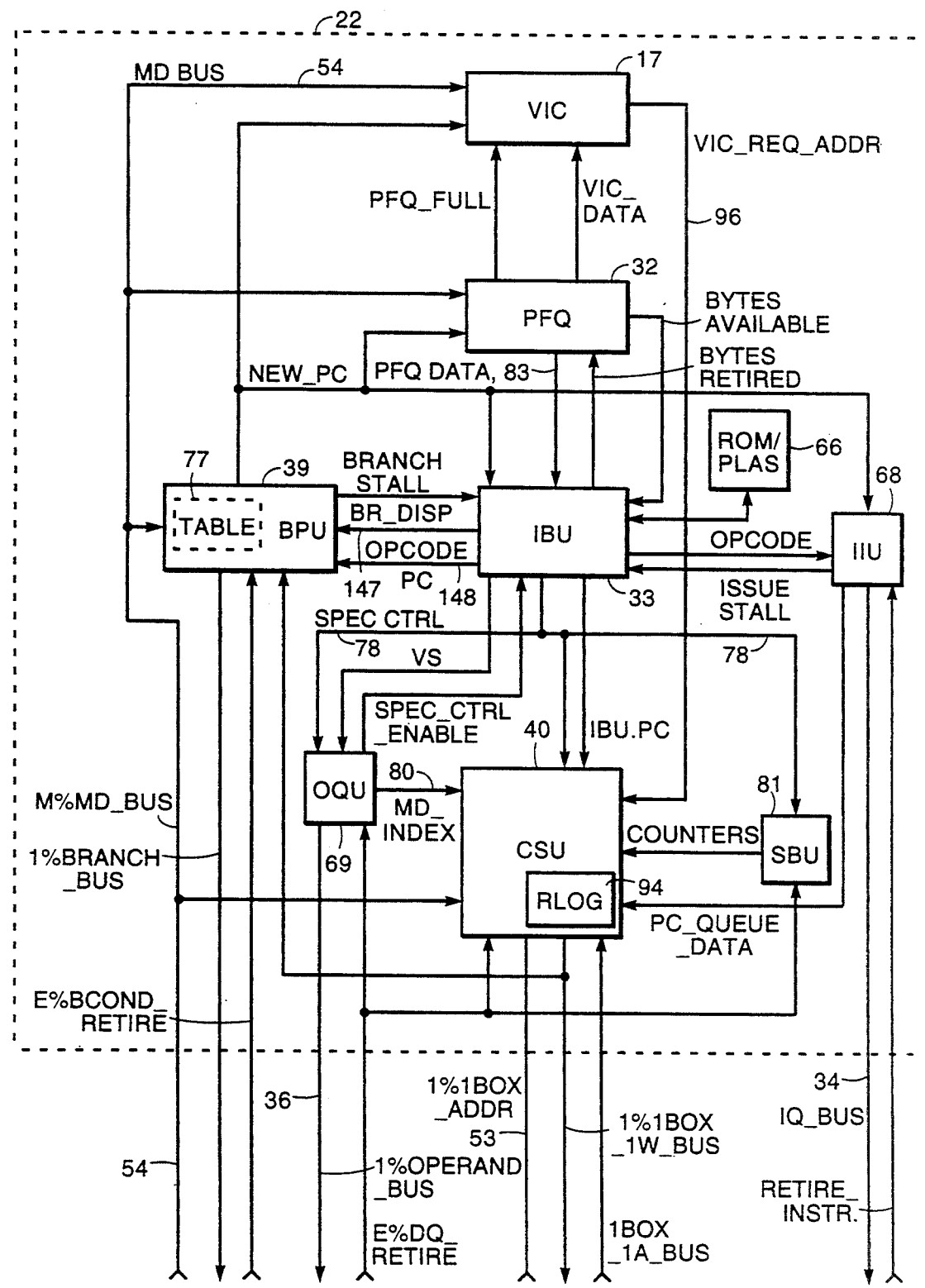
FIG. 8 is an electrical diagram in block form of the instruction unit of the CPU of FIG. 1.

To accomplish this, the S4/S5 boundary in the execution unit 23 is defined to be the commit point for a microinstruction. Architectural state is not modified before the beginning of the S5 segment of the pipeline, unless there is some mechanism for restoring the original state if an exception is detected (the instruction unit 22 RLOG 94 shown in FIG. 8 is an example of such a mechanism.) Exception reporting is deferred until the microinstruction to which the event belongs attempts to cross the S4/S5 boundary. At that point, the exception is reported and an exception handler is invoked. By deferring exception reporting to this point, the previous microinstruction (which may belong to the previous macroinstruction) is allowed to complete.

Most exceptions are reported by requesting a microtrap from the microinstruction control unit 24. When the microinstruction control unit 24 receives a microtrap request, it causes the execution unit 23 to break all its stalls, aborts the execution unit 23 pipeline, and injects the address of a handler for the event into an address latch for the control store 43. This starts an execution unit 23 microcode routine which will process the exception as appropriate. Certain other kinds of exceptions are reported by simply injecting the appropriate handler address into the control store 43 at the appropriate point.

In the CPU 10 exceptions are of two types: faults and traps. For both types, the microcode handler for the exception causes the instruction unit 22 to back out all GPR modifications that are in the RLOG (94 in FIG. 8), and retrieves the PC from the PC queue. For faults, the PC returned is the PC of the opcode of the instruction which caused the exception. For traps, the PC returned is the PC of the opcode of the next instruction to execute. The microcode then constructs the appropriate exception frame on the stack, and dispatches to the operating system through an appropriate vector.

The Instruction Unit (I-box)

The instruction unit 22 functions to fetch, parse and process the instruction stream, attempting to maintain a constant supply of parsed macroinstructions available to the execution unit 23 for execution. The pipelined construction of the CPU 10 allows multiple macroinstructions to reside within the CPU at various stages of execution, as illustrated in FIG. 6. The instruction unit 22, running semi-autonomously to the execution unit 23, parses the macroinstructions following the instruction that is currently executing in the execution unit 23. Improved performance is obtained when the time for parsing in the instruction unit 22 is hidden during the execution time in the execution unit 23 of an earlier instruction. The instruction unit 22 places into the queues 35, 37 and 38 the information generated while parsing ahead in the instruction stream. The instruction queue 35 contains instruction-specific information including the opcode (one or two bytes), a flag indicating floating point instruction, and an entry point for the microinstruction sequencer 42. The source queue 37 contains information about each one of the source operands for the instructions in the instruction queue 35, including either the actual operand (as in a short literal contained in the instruction stream itself) or a pointer to the location of the operand. The destination queue 38 contains information required for the execution unit 23 to select the location for storage of the results of execution. These three queues allow the instruction unit 22 to work in parallel with the execution unit 23; as the execution unit 23 consumes the entries in the queues, the instruction unit 22 parses ahead adding more—in the ideal case, the instruction unit 22 would stay far enough ahead of the execution unit 23 such that the execution unit 23 would never have to stall because of an empty queue.

Referring to FIG. 8, the instruction unit 22 is shown in more detail. The instruction unit 22 needs access to memory for instruction and operand data; requests for this data are made by the instruction unit 22 through a common port, read-request bus 53, sending addresses to the memory management unit 25. All data for both the instruction unit 22 and execution unit 23 is returned on the shared memory data bus 54. The memory management unit 25 contains queues to smooth the memory request traffic over time. A specifier request latch or spec-queue (75 in FIG. 7) holds requests from the instruction unit 22 for operand data, and the instruction request latch or I-ref latch (76 in FIG. 7) holds requests from the instruction unit 22 for instruction stream data; these two latches allow the instruction unit 22 to issue memory requests via bus 53 for both instruction and operand data even though the memory management unit 25 may be processing other requests.

The instruction unit 22 supports four main functions: instruction stream prefetching, instruction parsing, operand specifier processing and branch prediction. Instruction stream prefetching operates to provide a steady source of instruction stream data for instruction parsing. While the instruction parsing circuitry works on one instruction, the instruction prefetching circuitry fetches several instructions ahead. The instruction parsing function parses the incoming instruction stream, identifying and beginning the processing of each of the instruction's components—opcode, specifiers, etc. Opcodes and associated information are passed directly into the instruction queue (35 in FIG. 7) via bus 36. Operand specifier information is passed on to the circuitry which locates the operands in register file 41, in memory (cache or memory 12), or in the instruction stream (literals), and places the information in the source and destination queues (37 and 38 in FIG. 7) and makes the needed memory requests via bus 53 and spec-queue (75 in FIG. 7). When a conditional branch instruction is encountered, the condition is not known until the instruction reaches the execution unit 23 and all of the condition codes are available, so when in the instruction unit 22 it is not known whether the branch will be taken or not taken. For this reason, branch prediction circuitry 39 is employed to select the instruction stream path to follow when each conditional branch is encountered. A branch history table 77 is maintained for every conditional branch instruction of the instruction set, with entries for the last four occurrences of each conditional branch indicating whether the branch was taken or not taken. Based upon this history table 77, a prediction circuit 78 generates a "take" or "not take" decision when a conditional branch instruction is reached, and begins a fetch of the new address, flushing the instructions already being fetched or in the instruction cache if the branch is to be taken. Then, after the instruction is executed in the execution unit 23, the actual take or not take decision is updated in the history table 77.

The spec-control bus 78 is applied to a complex specifier unit 40, which is itself a processor containing a microsequencer and an ALU and functioning to manipulate the contents of registers in the register file 45 and access memory via the memory data bus 54 to produce the operands subsequently needed by the execution unit to carry out the macroinstruction. The complex specifier unit 40 includes the RLOG 94 into which the complex specifier unit records the changes it makes to the contents of the registers in the register file 45. When a macroinstruction is flushed from the pipeline due to an exception or an incorrect branch prediction, the changes contained in the RLOG 94 are used to restore the contents of the registers in the register file 45 to their initial values existing before the preprocessing of the macroinstruction by the complex specifier unit 40.

The spec-control bus 78 is also applied to an operand queue unit 69 which handles "simple" operand specifiers by passing the specifiers to the source and destination queues 37 and 38 via bus 36; these simple operands include literals (the operand is present in the instruction itself) or register mode specifiers which contain a pointer to one of the registers of the register file 41. For complex specifiers the operand queue unit 69 sends an index on a bus 80 to the complex specifier unit 40 to define the first one of the memory data registers of the register file 41 to be used as a destination by the complex specifier unit 40 in calculating the specifier value. The operand queue unit 69 can send up to two source queue 37 entries and two destination queue entries by the bus 36 in a single cycle. The spec-control bus 78 is further coupled to a scoreboard unit 81 which keeps track of the number of outstanding references to general purpose registers in the register file 41 contained in the source and destination queues 37 and 38; the purpose is to prevent writing to a register to which there is an outstanding read, or reading from a register for which there is an outstanding write. When a specifier is retired, the execution unit 23 sends information on which register to retire by bus 82 going to the complex specifier unit 40, the operand queue unit 79 and the scoreboard unit 81. The content of the spec-control bus 78 for each specifier includes the following: identification of the type of specifier; data if the specifier is a short literal; the access type and data length of the specifier; indication if it is a complex specifier; a dispatch address for the control ROM in the complex specifier unit 40. The instruction burst unit 33 derives this information from a new opcode accepted from the prefetch queue 32 via lines 83, which produces the following information: the number of specifiers for this instruction; identification of a branch displacement and its size, access type and data length for each one of up to six specifiers, indication if this is a floating point unit 27 instruction, and dispatch address for the microsequencer control ROM (43 in FIG. 7), etc. Each cycle, the instruction burst unit 33 evaluates the following information to determine if an operand specifier is available and how many prefetch queue 32 bytes should be retired to get to the next opcode or specifier: (1) the number of prefetch queue 32 bytes available, as indicated by a value of 1-to-6 provided by the prefetch queue 32; (2) the number of specifiers left to be parsed in the instruction stream for this instruction, based on a running count kept by the instruction burst unit 33 for the current instruction; (3) the data length of the next specifier; (4) whether the complex specifier unit 40 (if being used for this instruction) is busy; (5) whether data length information is available yet from the table 66; etc.

Some instructions have one- or two-byte branch displacements, indicated from opcode-derived outputs from the table 66. The branch displacement is always the last piece of data for an instruction and is used by the branch prediction unit 39 to compute the branch destination, being sent to the unit 39 via busses 22bs and 22bq. A branch displacement is processed if the following conditions are met: (1) there are no specifiers left to be processed; (2) the required number of bytes (one or two) is available in the prefetch queue 32, (3) branch-stall is not asserted, which occurs when a second conditional branch is received before the first one is cleared.

Figure 9:
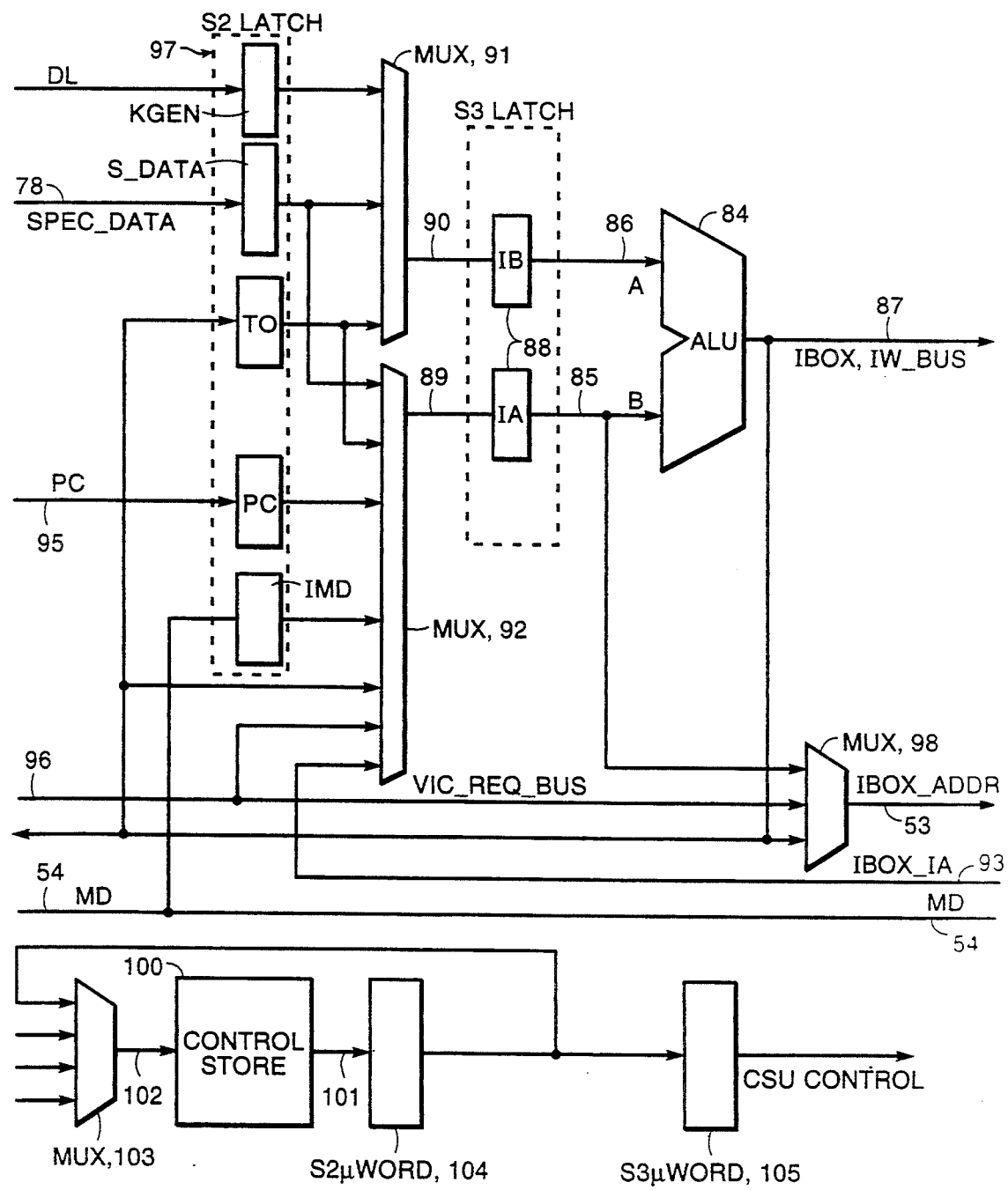
FIG. 9 is an electrical diagram in block form of the complex specifier unit used in the CPU of FIG. 1.

Referring to FIG. 9, the complex specifier unit 40 is shown in more detail. The complex specifier unit 40 is a three-stage (S1, S2, S3) microcoded pipeline dedicated to handling operand specifiers which require complex processing and/or access to memory. It has read and write access to the register file 41 and a port to the memory management unit 25. Memory requests are received by the complex specifier unit 40 and forwarded to the memory management unit 25 when there is a cycle free of specifier memory requests; i.e., operand requests for the current instructions are attempted to be completed before new instructions are fetched. The complex specifier unit 40 contains an ALU 84 which has A and B input busses 85 and 86, and has an output bus 87 writing to the register file 41 in the execution unit 23; all of these data paths are 32-bit. The A and B inputs are latched in S3 latches 88, which are driven during S2 by outputs 89 and 90 from selectors 91 and 92. These selectors receive data from the spec-data bus 78, from the memory data bus 54, from the register file 41 via bus 93, the output bus 87 of the ALU 84, the PC via line 95, the virtual instruction cache 17 request bus 96, etc. Some of these are latched in S2 latches 97. The instruction unit 22 address output 53 is produced by a selector 98 receiving the ALU output 87, the virtual instruction cache 17 request 96 and the A bus 85. The operations performed in the ALU 84 and the selections made by the selectors 91, 92 and 98 are controlled by a microsequencer including a control store 100 which produces a 29-bit wide microword on bus 101 in response to a microinstruction address on input 102. The control store contains 128 words, in one example. The microword is generated in S1 based upon an address on input 102 from selector 103, and latched into pipeline latches 104 and 105 during S2 and S3 to control the operation of the ALU 84, etc.

The instruction unit 22 performs its operations in the first four segments of the pipeline, S0–S4. In S0, the virtual instruction cache 17 is accessed and loaded to the prefetch queue 32; the virtual instruction cache 17 attempt to fill the prefetch queue 32 with up to eight bytes of instruction stream data. It is assumed that the virtual instruction cache 17 has been previously loaded with instruction stream blocks which include the sequential instructions needed to fill the prefetch queue 32. In S1, the instruction burst unit 33 parses, i.e., breaks up the incoming instruction data into opcodes, operand specifiers, specifier extensions, and branch displacements and passes the results to the other parts of the instruction unit 22 for further processing, then the instruction issue unit 68 takes the opcodes provided by the instruction burst unit 33 and generates microcode dispatch addresses and other information needed by the microinstruction unit 24 to begin instruction execution. Also in S1, the branch prediction unit 39 predicts whether or not branches will be taken and redirects instruction unit 22 instruction processing as necessary, the operand queue unit 79 produces output on bus 36 to the source and destination queues 37 and 38, and the scoreboard unit 81 keeps track of outstanding read and write references to the GPRs in the register file 41. In the complex specifier unit 40, the microsequencer accesses the control store 100 to produce a microword on lines 101 in S1. In the S2 pipe stage, the complex specifier unit 40 performs its read operation, accessing the necessary registers in register file 41, and provides the data to its ALU 84 in the next pipe stage. Then in the S3 stage, the ALU 84 performs its operation and writes the result either to a register in the register file 41 or to local temporary registers; this segment also contains the interface to the memory management unit 25—requests are sent to the memory management unit 25 for fetching operands as needed (likely resulting in stalls while waiting for the data to return).

The Virtual Instruction Cache (VIC)

Figure 10:
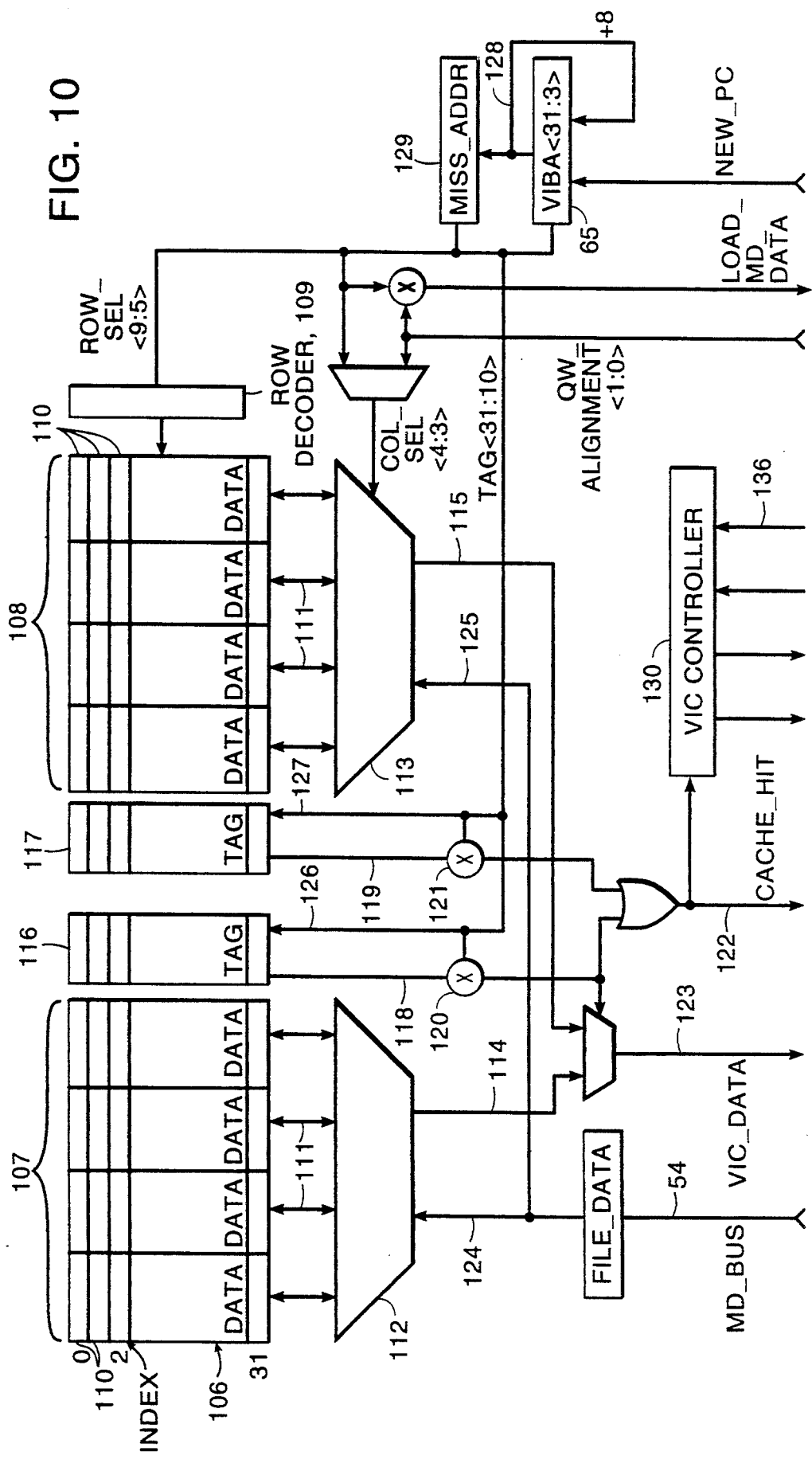
FIG. 10 is an electrical diagram in block form of the virtual instruction cache used in the CPU of FIG. 1.

Referring to FIG. 10, the virtual instruction cache 17 is shown in more detail. The virtual instruction cache 17 includes a 2K byte data memory 106 which also stores 64 tags. The data memory is configured as two blocks 107 and 108 of thirty-two rows. Each block 107, 108 is 256-bits wide so it contains one hexaword of instruction stream data (four quadwords). A row decoder 109 receives bits <9:5> of the virtual address from the VIBA register 65 and selects 1-of-32 indexes 110 (rows) to output two hexawords of instruction stream data on column lines 111 from the memory array. Column decoders 112 and 113 select 1-of-4 based on bits <4:3> of the virtual address. So, in each cycle, the virtual instruction cache 17 selects two hexaword locations to output on busses 114 and 115. The two 22-bit tags from tag stores 116 and 117 selected by the 1-of-32 row decoder 109 are output on lines 118 and 119 for the selected index and compared to bits <31:10> of the address in the VIBA register 65 by tag compare circuits 120 and 121. If either tag generates a match, a hit is signalled on line 122, and the quadword is output on bus 123 going to the prefetch queue 32. If a miss is signalled (cache-hit not asserted on 122) then a memory reference is generated by sending the VIBA address to the address bus 53 via bus 96 and the complex specifier unit 40 as seen in FIG. 8; the instruction stream data is thus fetched from cache, or if necessary, an exception is generated to fetch instruction stream data from memory 12. After a miss, the virtual instruction cache 17 is filled from the memory data bus 54 by inputs 124 and 125 to the data store blocks via the column decoders 112 and 113, and the tag stores are filled from the address input via lines 126 and 127. After each cache cycle, the VIBA 65 is incremented (by +8, quadword granularity) via path 128, but the VIBA address is also saved in register 129 so if a miss occurs the VIBA is reloaded and this address is used as the fill address for the incoming instruction stream data on the MD bus 54. The virtual instruction cache 17 controller 130 receives controls from the prefetch queue 32, the cache hit signal 122, etc., and defines the cycle of the virtual instruction cache 17.

The Prefetch Queue (PFQ)

Figure 11:
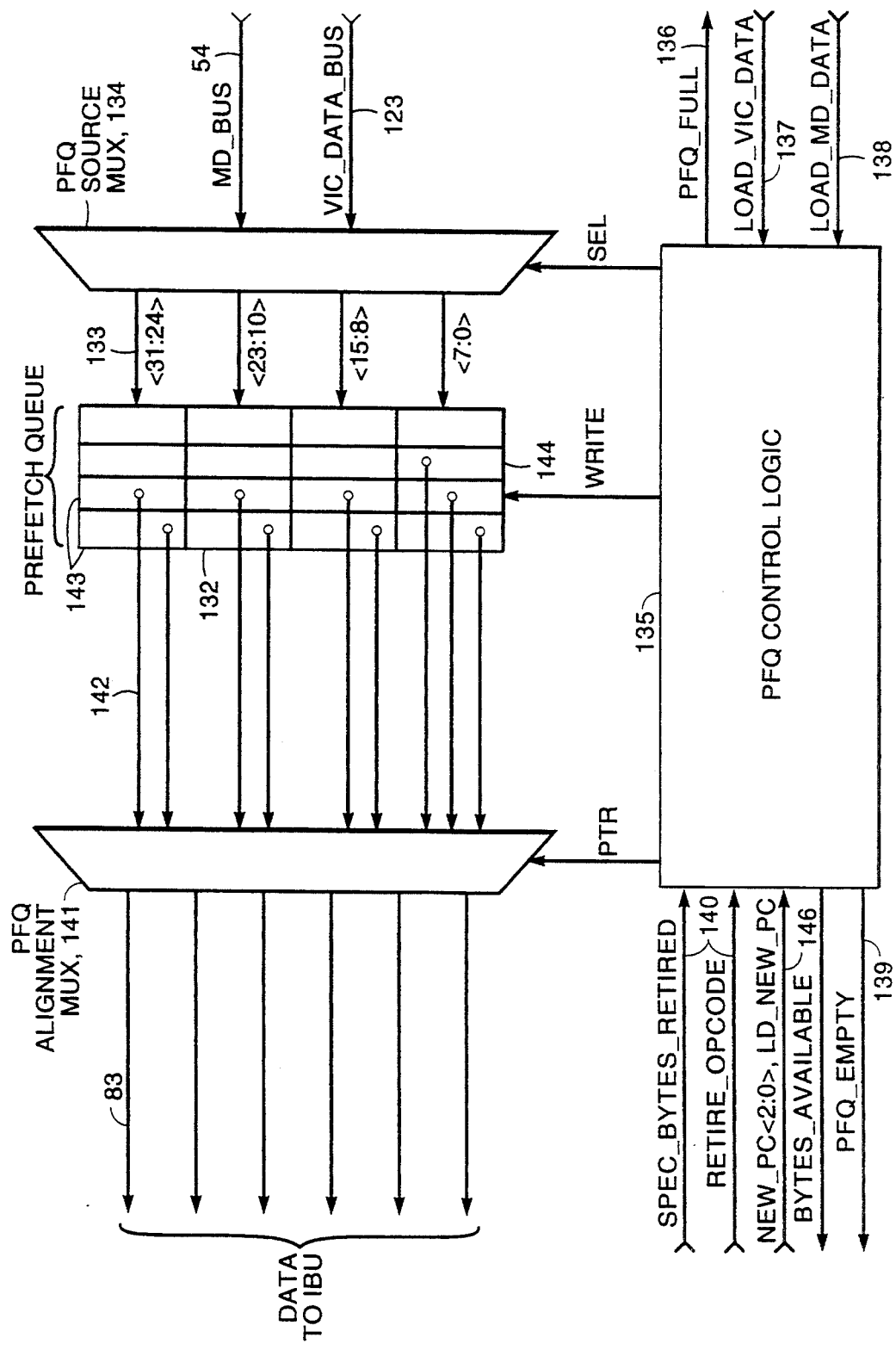
FIG. 11 is an electrical diagram in block form of the prefetch queue used in the CPU of FIG. 1.

Referring to FIG. 11, the prefetch queue 32 is shown in more detail. A memory array 132 holds four longwords, arranged four bytes by four bytes. The array 132 can accept four bytes of data in each cycle via lines 133 from a source multiplexer 134. The inputs to the multiplexer 134 are the memory data bus 54 and the virtual instruction cache 17 data bus 123. When the prefetch queue 32 contains insufficient available space to load another quadword of data from the virtual instruction cache 17 the prefetch queue 32 controller 135 asserts a pfq-full signal on the line 136 going to the virtual instruction cache 17. The virtual instruction cache 17 controls the supply of data to the prefetch queue 32, and loads a quadword each cycle unless the pfq-full line 136 is asserted. The controller 135 selects the virtual instruction cache 17 data bus 123 or the memory data bus 54 as the source, via multiplexer 134, in response to load-vie-data or load-md-data signals on lines 137 and 138 from the virtual instruction cache 17 controller 130. The prefetch queue 32 controller 135 determines the number of valid unused bytes of instruction stream data available for parsing and sends this information to the instruction burst unit 33 via lines 139. When the instruction burst unit 33 retires instruction stream data it signals the prefetch queue 32 controller 135 on lines 140 of the number of instruction stream opcode and specifier bytes retired. This information is used to update pointers to the array 132. The output of the array 132 is through a multiplexer 141 which aligns the data for use by the instruction burst unit 33; the alignment multiplexer 141 takes (on lines 142) the first and second longwords 143 and the first byte 144 from the third longword as inputs, and outputs on lines 83 six contiguous bytes starting from any byte in the first long-word, based upon the pointers maintained in the controller 135. The prefetch queue 32 is flushed when the branch prediction unit 39 broadcasts a load-new-PC signal on line 146 and when the execution unit 23 asserts load-PC.

The instruction burst unit 33 receives up to six bytes of data from the prefetch queue 32 via lines 83 in each cycle, and identifies the component parts, i.e., opcodes, operand specifiers and branch displacements by reference to the table 66. New data is available to the instruction burst unit 33 at the beginning of a cycle, and the number of specifier bytes being retired is sent back to the prefetch queue 32 via lines 140 so that the next set of new data is available for processing by the next cycle. The component parts extracted by the instruction burst unit 33 from the instruction stream data are sent to other units for further processing; the opcode is sent to the instruction issue unit 68 and the branch prediction unit 39 on bus 147, and the specifiers, except for branch displacements, are sent to the complex specifier unit 40, the scoreboard unit 81 and the operand queue unit 79 via a spec-control bus 78. The branch displacement is sent to the branch prediction unit 39 via bus 148, so the new address can be generated if the conditional branch is to be taken.

Scoreboard Unit

Figure 12:
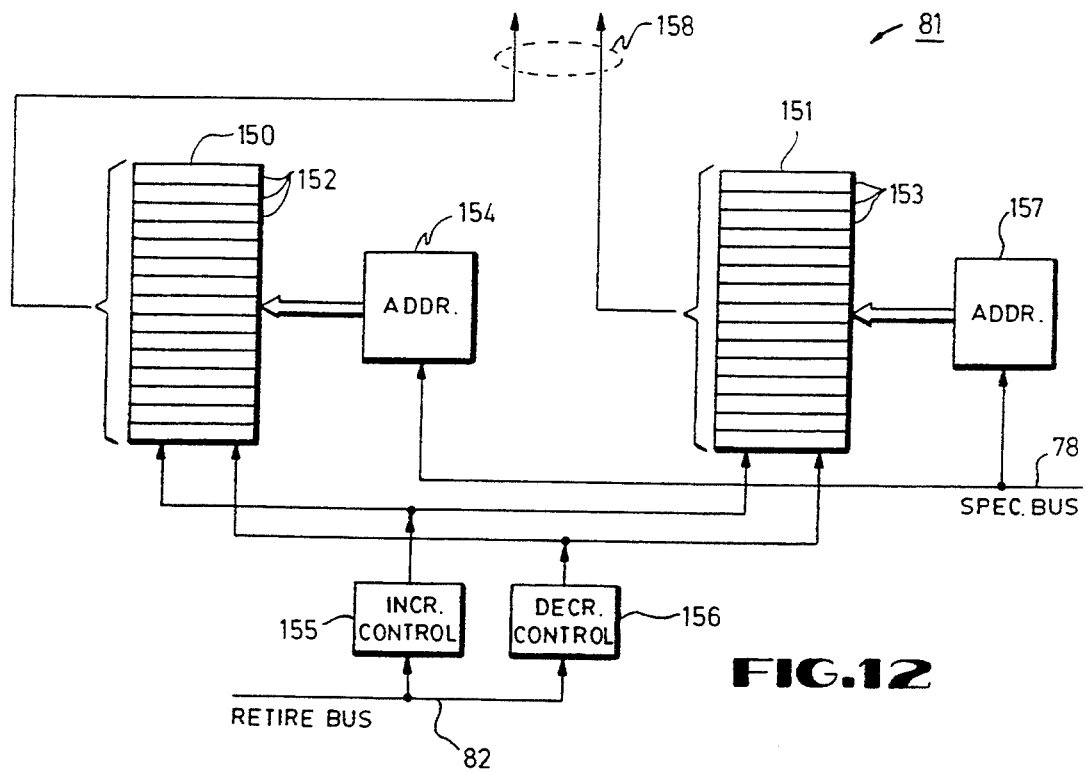
FIG. 12 is an electrical diagram in block form of the scoreboard unit used in the CPU of FIG. 1.

Referring to FIG. 12, the scoreboard unit 81 is shown in more detail. The scoreboard unit 81 keeps track of the number of outstanding references to GPRs in the source and destination queues (37 and 38 in FIG. 7). The scoreboard unit 81 contains two arrays of fifteen counters: the source array 150 for the source queue 37 and the destination array 151 for the destination queue 38. The counters 152 and 153 in the arrays 150 and 151 map one-to-one with the fifteen GPRs in the register file 41, except that there is no scoreboard counter corresponding to the PC. The maximum number of outstanding operand references determines the maximum count value for the counters 152, 153, and this value is based on the length of the source and destination queues. The source array counts up to twelve and the destination array counts up to six.

Each time valid register mode source specifiers appear on the spec-bus 78 the counters 152 in the source array 150 that correspond with those registers are incremented, as determined by selector 154 receiving the register numbers as part of the information on the bus 78. At the same time, the operand queue unit 79 inserts entries pointing to these registers in the source queue 37. In other words, for each register mode source queue entry, there is a corresponding increment of a counter 152 in the array 150, by the increment control 155. This implies a maximum of two counters incrementing each cycle when a quadword register mode source operand is parsed (each register in the register file 41 is 32-bits, and so a quadword must occupy two registers in the register file 41). Each counter 152 may only be incremented by one. When the execution unit 23 removes the source queue entries the counters 152 are decremented by decrement control 156. The execution unit 23 removes up to two register mode source queue entries per cycle as indicated on the retire bus 82. The GPR numbers for these registers are provided by the execution unit 23 on the retire bus 82 applied to the increment and decrement controllers 155 and 156. A maximum of two counters 152 may decrement each cycle, or any one counter may be decremented by up to two, if both register mode entries being retired point to the same base register.

In a similar fashion, when a new register mode destination specifier appears on spec-bus 78, the array 151 counter stage 153 that corresponds to that register of the register file 41, as determined by a selector 157, is incremented by the controller 155. A maximum of two counters 153 increment in one cycle for a quadword register mode destination operand. When the execution unit 23 removes a destination queue entry, the counter 153 is decremented by controller 156. The execution unit 23 indicates removal of a register mode destination queue entry, and the register number, on the retire bus 82.

Whenever a complex specifier is parsed, the GPR associated with that specifier is used as an index into the source and destination scoreboard arrays via selectors 154 and 157, and snapshots of both scoreboard counter values are passed to the Complex specifier unit 40 on bus 158. The Complex specifier unit 40 stalls if it needs to read a GPR for which the destination scoreboard counter value is nonzero. A non-zero destination counter 153 indicates that there is at least one pointer to that register in the destination queue 38. This means that there is a future execution unit 23 write to that register and that its current value is invalid. The Complex specifier unit 40 also stalls if it needs to write a GPR for which the source scoreboard counter value is non-zero. A non-zero source scoreboard value indicates that there is at least one pointer to that register in the source queue 37. This means that there is a future execution unit 23 read to that register and it contents must not be modified. For both scoreboards 150 and 151, the copies in the Complex specifier unit 40 pipe are decremented on assertion of the retire signals on bus 82 from the execution unit 23.

Branch Prediction

Figure 13:
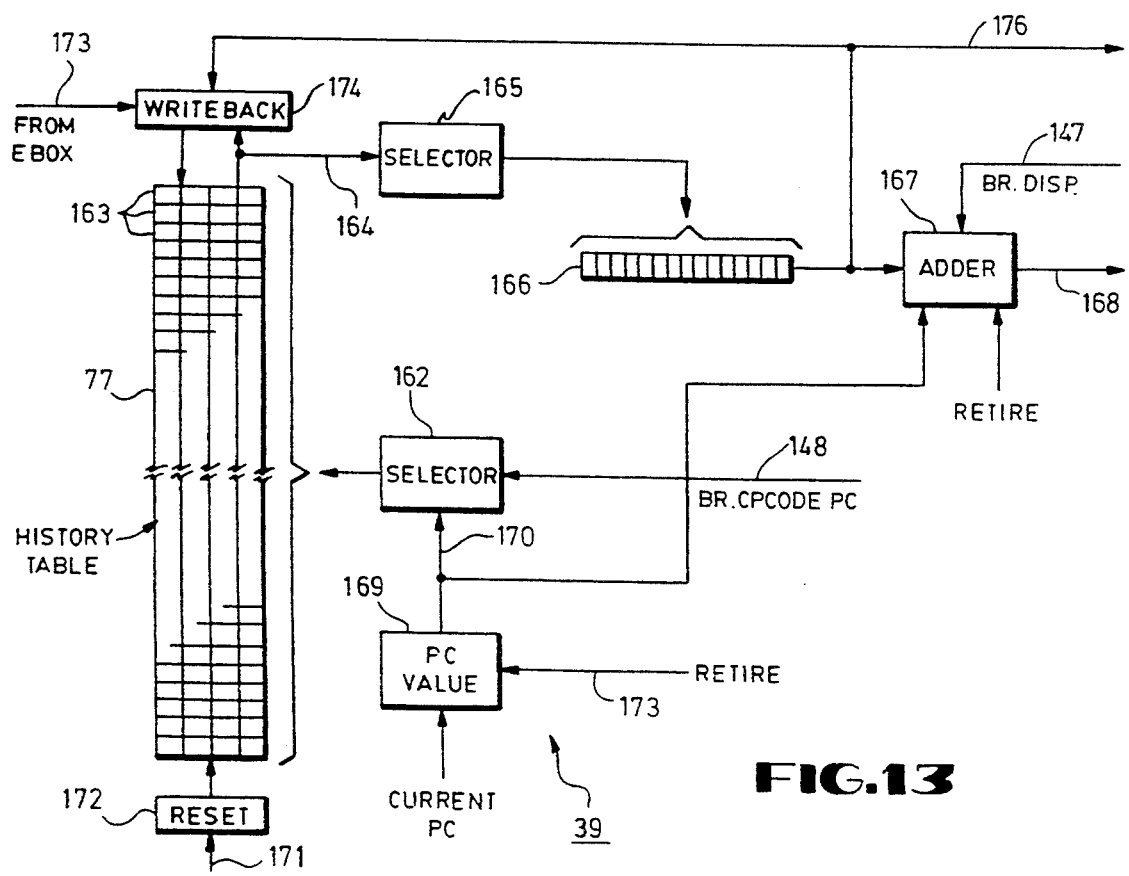
FIG. 13 is an electrical diagram in block form of the branch prediction unit used in the CPU of FIG. 1.

Referring to FIG. 13, the branch prediction unit 39 is shown in more detail. The instruction burst unit 33, using the tables of opcode values in ROM/PLA 66, monitors each instruction opcode as it is parsed, looking for a branch opcode. When a branch opcode is detected, the PC for this opcode is applied to the branch prediction unit 39 via bus 148. This PC value (actually a subset of the address) is used by a selector 162 to address the table 77. The branch history table 77 consists of an array of 512 four-bit registers 163, and the value in the one register 163 selected by 162 is applied by lines 164 to a selector 165 which addresses one of sixteen values in a register 166, producing a one-bit take or not-take output. The branch prediction unit 39 thus predicts whether or not the branch will be taken. If the branch prediction unit 39 predicts the branch will be taken (selected output of the register 166 a "1"), it adds the sign-extended branch displacement on bus 148 to the current PC value on bus 22 in the adder 167 and broadcasts the resulting new PC to the rest of the instruction unit 22 on the new-PC lines 168. The current PC value in register 169 is applied by lines 170 to the selector 162 and the adder 167.

The branch prediction unit 39 constructed in the manner of FIG. 13 uses a "branch history" algorithm for predicting branches. The basic premise behind this algorithm is that branch behavior tends to be patterned. Identifying in a program one particular branch instruction, and tracing over time that instruction's history of branch taken vs. branch not taken, in most cases a pattern develops. Branch instructions that have a past history of branching seem to maintain that history and are more likely to branch than not branch in the future. Branch instructions which follow a pattern such as branch, no branch, branch, no branch etc., are likely to maintain that pattern. Branch history algorithms for branch prediction attempt to take advantage of this "branch inertia".

The branch prediction unit 39 uses the table 77 of branch histories and a prediction algorithm (stored in register 166) based on the past history of the branch. When the branch prediction unit 39 receives the PC of a conditional branch opcode on bus 148, a subset of the opcode's PC bits is used by the selector 162 to access the branch history table 77. The output from the table 77 on lines 164 is a 4-bit field containing the branch history information for the branch. From these four history bits, a new prediction is calculated indicating the expected branch path.

Many different opcode PCs map to each entry of the branch table 77 because only a subset (9-bits) of the PC bits form the index used by the selector 162. When a branch opcode changes outside of the index region defined by this subset, the history table entry that is indexed may be based on a different branch opcode. The branch table 77 relies on the principle of temporal locality, and to a lesser extent spatial locality, and assumes that, having switched PCs, the current process operates within a small region for a period of time. This allows the branch history table 77 to generate a new pertinent history relating to the new PC within a few branches.

The branch history information in each 4-bit register 163 of the table 77 consists of a string of 1's and 0's indicating what that branch did the last four times it was seen. For example, 1100, read from right to left, indicates that the last time this branch was seen it did not branch. Neither did it branch the time before that. But then it branched the two previous times. The prediction bit is the result of passing the history bits that were stored through logic which predicts the direction a branch will go, given the history of its last four branches.

The prediction algorithm defined by the register 166 is accessible via the CPU datapaths as an internal processor register (IPR) for testing the contents or for updating the contents with a different algorithm. After powerup, the execution unit 23 microcode initializes the branch prediction algorithm register 166 with a value defining an algorithm which is the result of simulation and statistics gathering, which provides an optimal branch prediction across a given set of general instruction traces. This algorithm may be changed to tune the branch prediction for a specific instruction trace or mix; indeed, the algorithm may be dynamically changed during operation by writing to the register 166. This algorithm is shown in the following table, according to a preferred embodiment:

| Branch History | Prediction for Next Branch |
| --- | --- |
| 0000 | Not Taken |
| 0001 | Taken |
| 0010 | Not Taken |
| 0011 | Taken |
| 0100 | Not Taken |
| 0101 | Not Taken |
| 0110 | Taken |
| 0111 | Taken |
| 1000 | Not Taken |
| 1001 | Taken |

-continued

| Branch History | Prediction for Next Branch |
|---|---|
| 1010 | Taken |
| 1011 | Taken |
| 1100 | Taken |
| 1101 | Taken |
| 1110 | Taken |
| 1111 | Taken |

The 512 entries in the branch table 77 are indexed by the opcode's PC bits <8:0>. Each branch table entry 163 contains the previous four branch history bits for branch opcodes at this index. The execution unit 23 asserts a flush-branch-table command on line 171 under microcode control during process context switches. This signal received at a reset control 172 resets all 512 branch table entries to a neutral value: history=0100, which will result in a next prediction of 0 (i.e., not taken).

When a conditional branch opcode is encountered, the branch prediction unit 39 reads the branch table entry indexed by PC<8:0>, using the selector 162. If the prediction logic including the register 166 indicates the branch taken, then the adder 167 sign extends and adds the branch displacement supplied from the instruction burst unit 33 via bus 147 to the current PC, and broadcasts the result to the instruction unit 22 on the new-PC lines 168. If the prediction bit in the register 166 indicates not to expect a branch taken, then the current PC in the instruction unit 22 remains unaffected. The alternate PC in both cases (current PC in predicted taken case, and branch PC in predicted not taken case) is retained in the branch prediction unit 39 in the register 169 until the execution unit 23 retires the conditional branch. When the execution unit 23 retires a conditional branch, it indicates the actual direction of the branch via retire lines 173. The branch prediction unit 39 uses the alternate PC from the register 169 to redirect the instruction unit 22 via another new-PC on lines 168, in the case of an incorrect prediction.

The branch table 77 is written with new history each time a conditional branch is encountered. A writeback circuit 174 receives the four-bit table entry via lines 164, shifts it one place to the left, inserts the result from the prediction logic received on line 175, and writes the new four-bit value back into the same location pointed to by the selector 162. Thus, once a prediction is made, the oldest of the branch history bits is discarded, and the remaining three branch history bits and the new predicted history bit are written back to the table 77 at the same branch PC index. When the execution unit 23 retires a branch queue entry for a conditional branch, if there was not a mispredict, the new entry is unaffected and the branch prediction unit 39 is ready to process a new conditional branch. If a mispredict is signaled via lines 173, the same branch table entry is rewritten by the circuit 174, this time the least significant history bit receives the complement of the predicted direction, reflecting the true direction of the branch.

Each time the branch prediction unit 39 makes a prediction on a branch opcode, it sends information about that prediction to the execution unit 23 on the bus 176. The execution unit 23 maintains a branch queue (70 in FIG. 7) of branch data entries containing information about branches that have been processed by the branch prediction unit 39 but not by the execution unit 23. The bus 176 is 2-bits wide: one valid bit and one bit to indicate whether the instruction unit 22 prediction was to take the branch or not. Entries are made to the branch queue 70 for both conditional and unconditional branches. For unconditional branches, the value of bit-0 of bus 176 is ignored by the execution unit 23. The length of the branch queue 70 is selected such that it does not over flow, even if the entire instruction queue 35 is filled with branch instructions, and there are branch instructions currently in the execution unit 23 pipeline. At any one time there may be only one conditional branch in the queue 70. A queue entry is not made until a valid displacement has been processed. In the case of a second conditional branch encountered while a first is still outstanding, the entry may not be made until the first conditional branch has been retired.

When the execution unit 23 executes a branch instruction and it makes the final determination on whether the branch should or should not be taken, it removes the next element from the branch queue 70 and compares the direction taken by the instruction unit 22 with the direction that should be taken. If these differ, then the execution unit 23 sends a mispredict signal on the bus 173 to the branch prediction unit 39. A mispredict causes the instruction unit 22 to stop processing, undo any GPR modifications made while parsing down the wrong path, and restart processing at the correct alternate PC.

The branch prediction unit 39 back-pressures the BIU by asserting a branch-stall signal when it encounters a new conditional branch with a conditional branch already outstanding. If the branch prediction unit 39 has processed a conditional branch but the execution unit 23 has not yet executed it, then another conditional branch causes the branch prediction unit 39 to assert branch-stall. Unconditional branches that occur with conditional branches outstanding do not create a problem because the instruction stream merely requires redirection. The alternate PC in register 169 remains unchanged until resolution of the conditional branch. The execution unit 23 informs the branch prediction unit 39 via bus 173 each time a conditional branch is retired from the branch queue 70 in order for the branch prediction unit 39 to free up the alternate PC and other conditional branch circuitry. The branch-stall signal blocks the instruction unit 22 from processing further opcodes. When branch-stall is asserted, the instruction burst unit 33 finishes parsing the current conditional branch instruction, including the branch displacement and any assists, and then the instruction burst unit 33 stalls. The entry to the branch queue 70 in the execution unit 23 is made after the first conditional branch is retired. At this time, branch-stall is deasserted and the alternate PC for the first conditional branch is replaced with that for the second.

The branch prediction unit 39 distributes all PC loads to the rest of the instruction unit 22. PC loads to the instruction unit 22 from the complex specifier unit 40 microcode load a new PC in one of two ways. When the complex specifier unit 40 asserts PC-Load-Writebus, it drives a new PC value on the IW-Bus lines. PC-Load-MD indicates that the new PC is on the MD bus lines 54. The branch prediction unit 39 responds by forwarding the appropriate value onto the new-PC lines 168 and asserting load-new-PC. These instruction unit 22 PC loads do not change conditional branch state in the branch prediction unit 39.

The execution unit 23 signals its intent to load a new PC by asserting Load-New-PC. The assertion of this signal indicates that the next piece of IPR data to arrive on the MD bus 54 is the new PC. The next time the memory management unit 25 asserts a write command, the PC is taken from the MD bus 54 and forwarded onto the new-PC lines and a load-new-PC command is asserted.

The branch prediction unit 39 performs unconditional branches by adding the sign extended branch displacement on lines 147 to the current PC on lines 170 in the adder 167, driving the new PC onto the new-PC lines 168 and asserting a signal load-new-PC. Conditional branches load the PC in the same fashion if the logic predicts a branch taken. Upon a conditional branch mispredict or execution unit 23 PC load, any pending conditional branch is cleared, and pending unconditional branches are cleared.

The Microinstruction Control Unit

Figure 14:
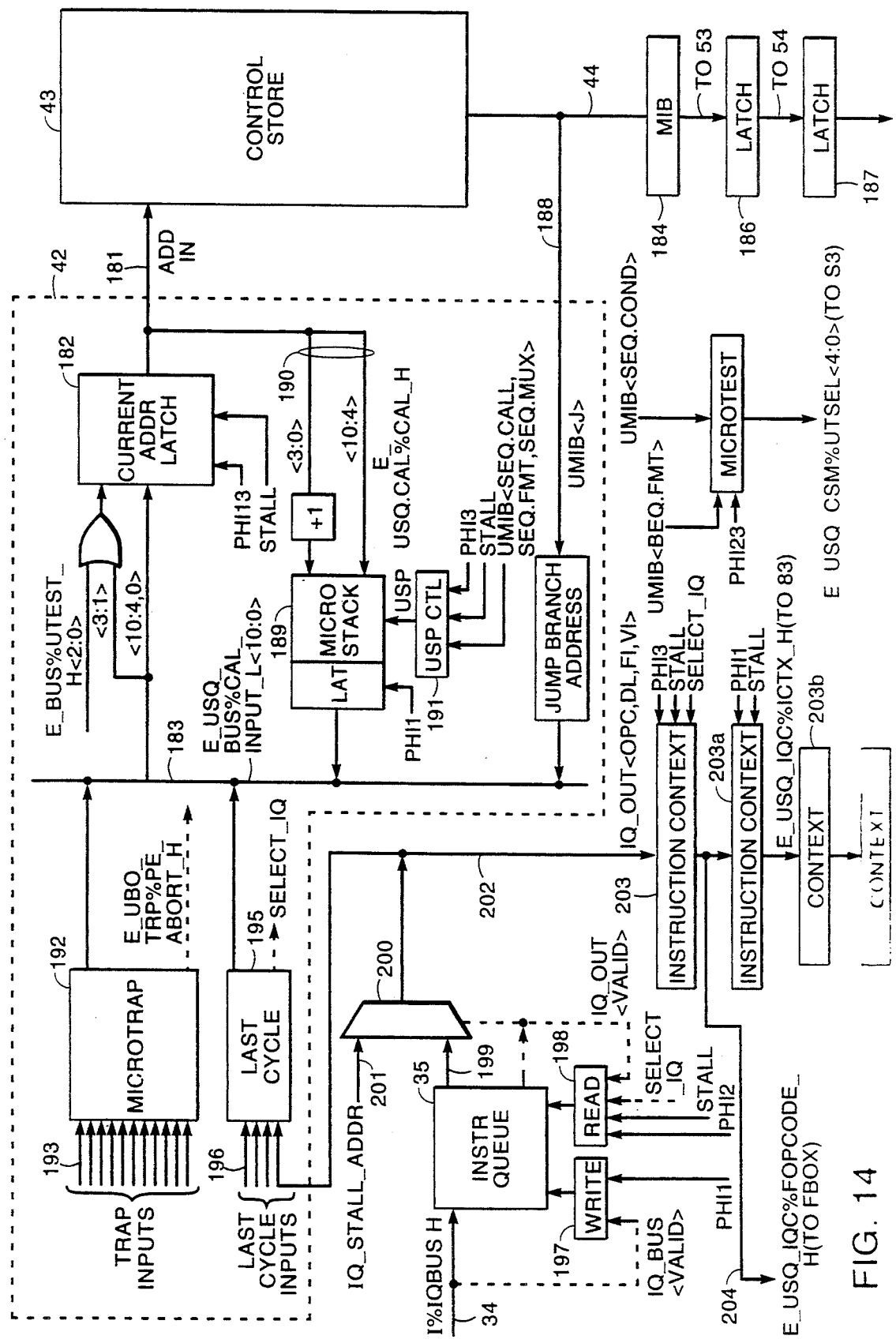
FIG. 14 is an electrical diagram in block form of the microinstruction control unit the CPU of FIG. 1, including the microsequencer and the control store.

Referring to FIG. 14, the microinstruction control unit 24 including the microsequencer 42 and microstore 43 defines a finite state machine that controls three execution unit 23 sections of the CPU 10 pipeline: S3, S4 and S5. The microinstruction control unit 24 itself resides in the S2 section of the pipeline, and accesses microcode contained in the on-chip control store 43. The control store 43 is addressed by an 11-bit bus 181 from the microsequencer 42. The current address for the control store is held in a latch 182, and this latch is loaded from a selector 183 which has several sources for the various addressing conditions, such as jump or branch, microstack, or microtrap. Each microword output on bus 44 from the control store 43 is made up of fields which control all three pipeline stages. A microword is issued at the end of S2 (one every machine cycle) and is stored in latch 184 for applying to microinstruction bus 185 and use in the execution unit 23 during S3, then is pipelined forward (stepped ahead) to sections S3 and S4 via latches 186 and 187 under control of the execution unit 23. Each microword contains a 15-bit field (including an 11-bit address) applied back to the microsequencer 42 on bus 188 for specifying the next microinstruction in the microflow. This field may specify an explicit address contained in the microword from the control store 43, or it may direct the microsequencer 42 to accept an address from another source, e.g., allowing the microcode to conditionally branch on various states in the CPU 10.

Frequently used microcode is usually defined as microsubroutines stored at selected addresses in the control store, and when one of these subroutines is called, the return address is pushed onto a microstack 189 for use upon executing a return. To this end, the current address on the address input bus 181 is applied back to the microstack input 190 after being incremented, since the return will be to the current address plus one. The microstack may contain, for example, six entries, to allow six levels of subroutine nesting. The output of the microstack 189 is applied back to the current address latch 182 via the selector 183 if the commands in the field on the bus 188 direct this as the next address source.

Stalls, which are transparent to the person writing the microcode, occur when a CPU resource is not available, such as when the ALU 50 requires an operand that has not yet been provided by the memory management unit 25. The microsequencer 42 stalls when pipeline segment S3 of the execution unit 23 is stalled. A stall input to the latch 182, the latch 184 or the microstack control 191 causes the control store 43 to not issue a new microinstruction to the bus 44 at the beginning of S3.

Microtraps allow the microcoder to deal with abnormal events that require immediate service. For example, a microtrap is requested on a branch mispredict, when the branch calculation in the execution unit 23 is different from that predicted by the instruction unit 22 for a conditional branch instruction. A microtrap selector 192 has a number of inputs 193 for various conditions, and applies an address to the selector 183 under the specified conditions. When a microtrap occurs, the microcode control is transferred to the service microroutine beginning at this microtrap address.

The control field (bits <14:0>) of the microword output from the control store 43 on bus 44 via bus 188 is used to define the next address to be applied to the address input 181. The next address is explicitly coded in the current microword; there is no concept of sequential next address (i.e., the output of the latch 182 is not merely incremented). Bit-14 of the control field selects between jump and branch formats. The jump format includes bits <10:0> as a jump address, bits <12:11> to select the source of the next address (via selector 183) and bit-13 to control whether a return address is pushed to the microstack 189 via bus 190. The branch format includes bits <7:0> as a branch offset, bits <12:8> to define the source of the microtest input, and again bit-13 to control whether a return address is pushed to the microstack 189 via bus 190. These conditional branch microinstructions are responsive to various states within the CPU 10 such as ALU overflow, branch mispredict, memory management exceptions, reserved addressing modes or faults in the floating point unit 27.

The last microword of a microroutine contains a field identifying it as the last cycle, and this field activates a selector 195 which determines what new microflow is to be started. The alternatives (in order of priority) are an interrupt, a fault handler, a first-part-done handler, or the entry point for a new macroinstruction indicated by the top entry in the instruction queue 35. All of these four alternatives are represented by inputs 196 to the selector 195. If last cycle is indicated, and there is no microtrap from selector 192, the next address is applied from the selector 195 to the selector 183 for entering into the latch 182.

The instruction queue 35 is a FIFO, six entries deep, filled by the instruction unit 22 via bus 34, permitting the instruction unit 22 to fetch and decode macroinstructions ahead of the execution unit 23 execution. Each entry is 22-bits long, with bits <9:1> being the dispatch address used for the control store address via selector 183 (all the entry points are mapped to these address bits), and bits <21:13> being the opcode itself (the extra bit designating a two-byte opcode). Bit-0 is a valid bit, set if the entry is valid, bit-10 indicates an floating point unit 27 instruction, and bits <12:11> define the initial data length of instruction operands (byte, word, longword, etc.). A write pointer 197 defines the location where a new entry is written from the bus 34 during phi1, and this write pointer 197 is advanced in phi3 of each cycle if the valid bit is set in this new entry. A read pointer 198 defines the location in the instruction queue 35 where the next instruction is to be read during phi2 onto output lines 199 to selector 200. If the valid bit is not set in the instruction queue 35 entry being read out, the selector 200 uses a stall address input 201 for forwarding via selector 195 and selector 183 to the latch 182; the stall microword is thus fetched from the control store 43, and a stall command is sent to the execution unit 23. If the valid bit is set in the entry being read from the instruction queue 35, a first-cycle command is sent to the execution unit 23, and if the floating point unit 27 bit is also set an floating point unit 27 command is sent to the floating point unit 27. The read pointer 198 is advanced in phi4 if the last cycle selector 195 is activated by the microword output in this cycle and the selector 195 selects the output 202 (and the valid bit is set in the entry). When the read pointer 198 is advanced, the valid bit for the entry just read out is cleared, so this entry will not be reused. Or, the read pointer 198 is stalled (no action during phi4) if a stall condition exists.

The bus 202 containing the entry read from the instruction queue 35 includes the opcode field, as well as the microcode address field (sent to selector 195). This opcode field along with the data length field and the floating point unit 27 field is entered in an instruction context latch 203 on phi3 of S2, if the instruction queue 35 is selected as the next address source for the control store 43. When the entry read out has its valid bit cleared, the stall instruction context, forced out of the selector 200 with the stall address, is latched into the context latch 203. The output on lines 204 from the latch 203 is sent to the floating point unit 27 to define the floating point unit 27 instruction to be executed if the floating point unit 27 bit is set. On phi1 of the S3 segment the contents of the latch 203 are driven to slave context latch 205, and the contents of this slave latch are used during S3 by the execution unit 23.

Figure 15:
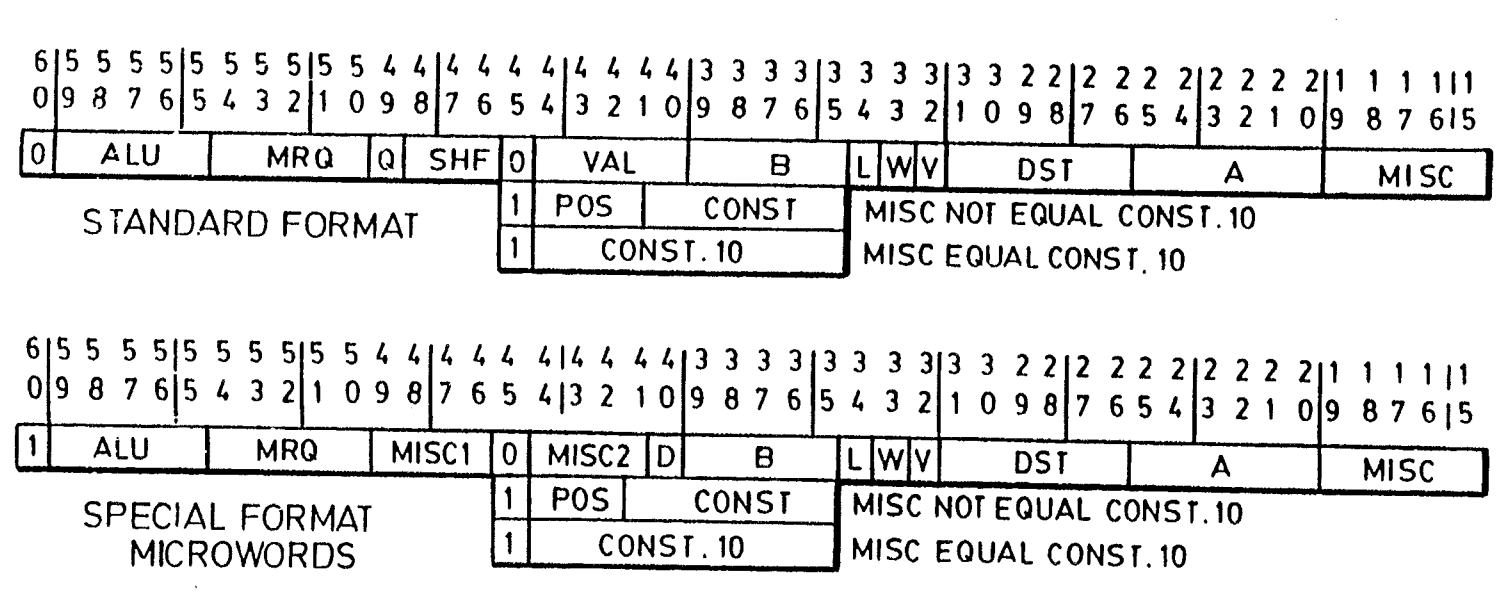

Referring to FIG. 15, the microword at the control store output is 61-bits wide, and of this a 14-bit field (bits <14:0> is used in the microsequencer 42 via bus 24e, so the input to the microinstruction latch 24d is 47-bits wide, bits <60:15>. The microinstructions are of two general types, referred to as "standard" and "special", depending upon whether bit-60 is a one or a zero. In both cases, the microinstruction has a field, bits <59:56>, defining the ALU function (add, subtract, pass, compare, etc.) to be implemented for this cycle, and a MRQ field, bits <54:50> defining any memory requests that are to be made to the memory management unit 25. The A and B fields (bits <25:20> and <39:36>) of the microword define the A and B inputs to the ALU, and the DST field, bits <31:26>, defines the write destination for the ALU output, along with the MISC field containing other needed control bits. The L, W and V fields, bits <34:32>, define the data length, whether to drive the write bus, and the virtual address write enable. For shifter operations, the microword contains an SHF field <48:46> to define the shifter function and a VAL field, bits <44:40> to define the shift amount. Also, if bit-45 is a one, the microword contains a constant value in bits <44:35> for driving onto the B input of the ALU; the constant can be 8-bit or 10-bit, as defined in the MISC field, and if 8-bit a POS field defines the position of the constant. If of the special format, no shifter operation is possible, and two other MISC control fields are available.

The Execution Unit

Figure 16:
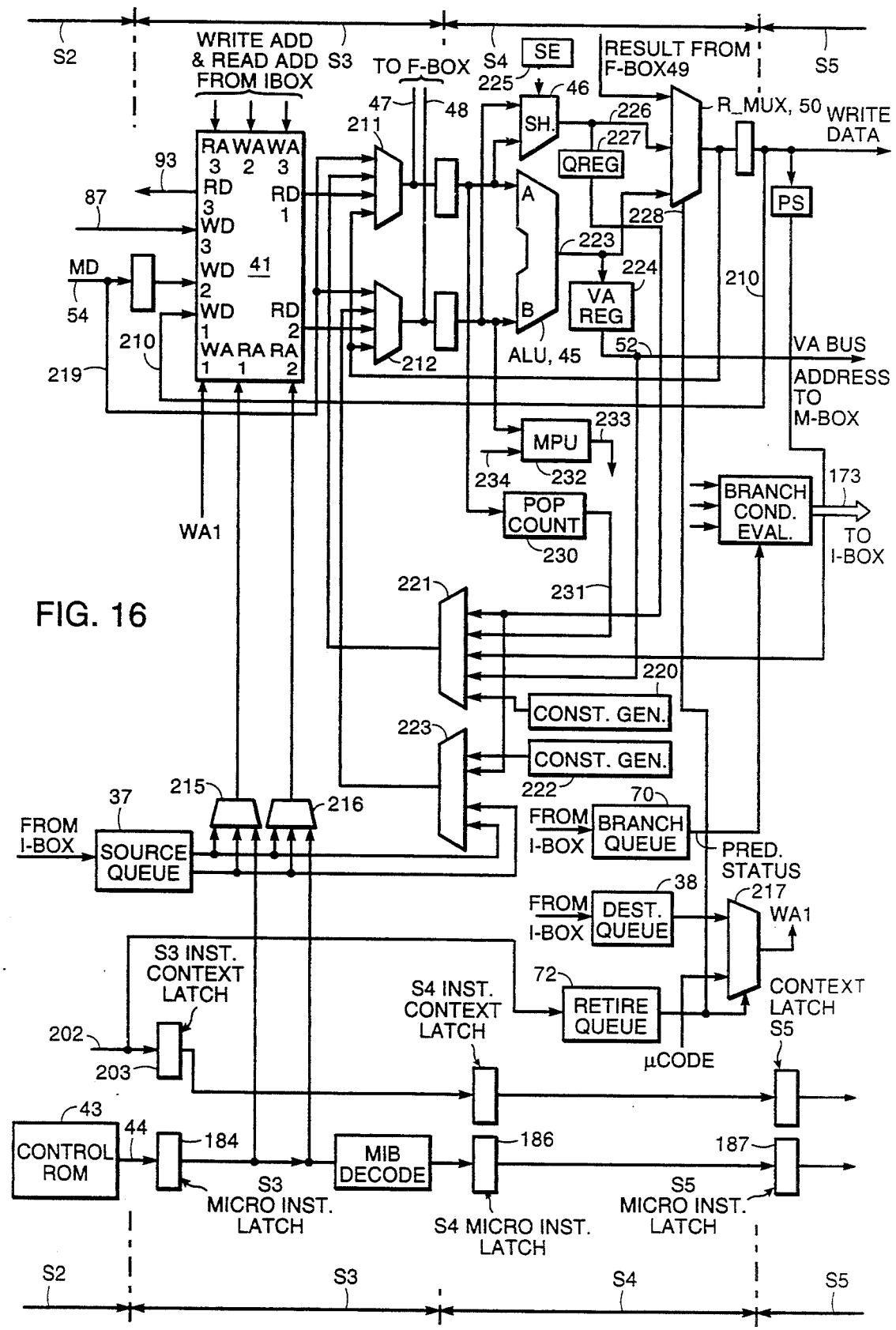
FIG. 16 is an electrical diagram in block form of the execution unit of the CPU of FIG. 1.

Referring to FIG. 16, the E-box or execution unit 23 includes the register file 41 which has thirty-seven 32-bit registers, consisting of six memory data registers MD0–MD5, fifteen general purpose registers (GPRs) R0–R14, six working registers W, and CPU state registers. The MD registers receive data from memory reads initiated by the instruction unit 22, and from direct writes from the instruction unit 22. The working registers W hold temporary data under control of the microinstructions (not available to the macroinstruction set); these registers can receive data from memory reads initiated by the execution unit 23 and receive result data from the ALU 45, shifter 46, or floating point unit 27 operations. The GPRs are VAX (Trademark) architecture general-purpose registers (though the PC, R15, is not in this file 41) and can receive data from memory reads initiated by the execution unit 23, from the ALU 45, the shifter 46, or from the instruction unit 22. The state registers hold semipermanent architectural state, and can be written only by the execution unit 23.

The register file 41 has three read ports and three write ports. The read ports include three read-address inputs RA1, RA2 and RA3, and three read data outputs RD1, RD2 and RD3. The three write ports include write address inputs WA1, WA2 and WA3, and three write data inputs WD1, WD2 and WD3. Data input to the write ports of the register file 41 is from the memory data bus 54 to WD2, from the instruction unit 22 write bus 87 to WD3, or from the output of the ALU 45 on the write bus 210 to WD1. Data output from the register file 41 is to the selector 211 for the ALU Abus 212 from RD1 (in S3), to the selector 213 for the ALU Bbus 214 from RD2 (also in S3), and to the bus 93 going to the instruction unit 22 from RD3. The read addresses at RA1 and RA2 for the RD1 and RD2 outputs from register file 41 are received from selectors 215 and 216, each of which receives inputs from the source queue 37 or from the A and B fields of the microinstruction via bus 185; in a cycle, two entries in the source queue 37 can be the address inputs at RA1 and RA2 to provide the ALU A and B inputs (or floating point unit 27 inputs), or the microinstruction can define a specific register address as well as specify source queue addressing. The write address input WA1 (controlling the register to which the ALU output or write bus 210 is written) is defined by a selector 217 receiving an input from the destination queue 38 or from the DST field of the microinstruction via bus 185; the selector 217 is controlled by the retire queue 72 as well as the microinstruction. The WA2 input is from the memory management unit 25 via bus 218, defining which register the MD bus 54 at WD2 is written; this MD port is used by the memory management unit 25 to write memory or IPR read data into W registers or GPRs to complete execution unit 23 initiated reads, with the register file address being supplied to WA2 from the memory management unit 25 (the Mbox received the register file address when the memory operation was initiated). The complex specifier unit 40 (seen in FIG. 13) accesses the register file 41 by WA3/WD3 and RA3/RD3 for general address calculation and autoincrement and autodecrement operand specifier processing.

A bypass path 219 is provided from the MD bus 54 to the inputs of the selectors 211 and 213 allows the memory read data to be applied directly to the A or B ALU inputs without being written to the a register in the register file 41 then read from this register in the same cycle. The data appears on MD bus 54 too late to be read in the same cycle. When the bypass path is enabled by microcode, the data is not written to the register.

The are two constant generators. A constant generator 220 for the A input of the ALU via selector 221, specified in the A field of the microinstruction, produces constants which are mainly used for generating the addresses of IPRs, and these are implementation dependent; generally an 8-bit value is produced to define an IPR address internally. A constant generator 222 for the B input of the ALU via selector 223 builds a longword constant by placing a byte value in one of four byte positions in the longword; the position and constant fields Pos and Constant in the microinstruction specify this value. Also, the constant source 222 can produce a low-order 10-bit constant specified by the microinstruction when a Const.10 field is present.

The ALU 45 is a 32-bit function unit capable of arithmetic and logical functions defined by the ALU field of the microword. The A and B inputs are defined by the selectors 211 and 212 which are under control of the A and B fields of the microword. The ALU output 223 can be multiplexed onto the write bus 210 via Rmux 50 and is directly connected to the virtual address register 224. The ALU also produces condition codes (overflow, carry, zero, negative) based on the results of an operation, and these can be used to update the state registers. The operations which may be performed in the ALU include add, subtract, pass A or B, AND, OR, exclusive-OR, etc.

The shifter 46 receives 64-bits of input from the A and B inputs and produces a 32-bit right shifted output to the Rmux 50. Shift operation is defined by the SHF field of the microinstruction, and the amount (0-to-32 bits) is defined by the VAL field or by a shift-counter register 225. The output 226 of the shifter 46 is multiplexed onto the write bus 210 via Rmux 50 and directly connected to the quotient or Q register 227.

The Rmux 50 coordinates execution unit 23 and floating point unit 27 result storage and retiring of macroinstructions, selecting the source of execution unit 23 memory requests and the source of the next write bus 210 data and associated information. The Rmux selection takes place in S4, as does the driving of the memory request to the memory management unit 25. The new data on write bus 210 is not used until the beginning of S5, however. The Rmux 50 is controlled by the retire queue 72, which produces an output on lines 228 indicating whether the next macroinstruction to retire is being executed by the execution unit 23 or floating point unit 27, and the Rmux selects one of these to drive the write bus 210 and to drive the memory request signals. The one not selected (execution unit 23 or floating point unit 27) will stall if it has need to drive the write bus 210 or memory request. The read pointer in the retire queue 72 is not advanced, and therefore the Rmux selection cannot change, until the currently selected source (execution unit 23 or floating point unit 27) indicates that its macroinstruction is to be retired. The source (execution unit 23 or floating point unit 27) indicated by the retire queue 72 is always selected to drive the Rmux 50; if the execution unit 23 is selected the W field of the microinstruction in S4 selects either the ALU 45 or the shifter 46 as the source for the Rmux 50.

The 32-bit VA or virtual address register 224 is the source for the address for all execution unit 23 memory requests on VA bus 52, except destination queue 38 based stores which use the current PA queue 56 entry for an address. Unlike the entry in the PA queue 56, the VA register 224 address is not yet translated—it is a virtual address except when the memory operation doesn't require translation (as in IPR references or explicit physical memory references)) or when memory management is off. The VA register 224 can be loaded only from the output 223 of the ALU 45, and is loaded at the end of S4 when the V field of the microword specifies to load it. If a given microword specifies a memory operation in the MRQ field and loads the VA register 224, the new VA value will be received by the memory management unit 25 with the memory command.

The population counter 230 functions to calculate the number of ones (times four) in the low-order fourteen bits of the A bus 212, every cycle, producing a result on lines 231 to selector 221 so the result is a source available on the A input of the ALU 45 for the next microword. The population count function saves microcode steps in CALL, POP and PUSH macroinstructions as set forth in U.S. Ser. No. 07/221,925 filed Jul. 20, 1988, assigned to Digital Equipment Corporation, and continued in U.S. Ser. No. 07/542,636 filed Jun. 21, 1990. The population counter 230 calculates a result in the range (1-to-14)*4, equal to four times the number of ones on the A input early in S4. If microword N steers data to the A input, microword N+1 can access the population counter result for that data by specifying this source in the A field. The population counter result on lines 231 is used to calculate the extent of the stack frame which will be written by the macroinstruction. The two ends of the stack frame are checked for memory management purposes before any writes are done.

The mask processing unit 232 holds and processes a 14-bit value loaded from bits <29:16> of the B input of the ALU 45, during S4 when the microword tells it to do so by the MISC field. The unit 232 outputs a set of bits with which the microinstruction sequencer 42 can carry out an eight-way branch. Each of these microbranches is to a store-register-to-stack sequence, with the value of the set of bits defining which register of the register file 43 to store. This set of 3-bits is applied to a microtest input to the microaddress latch 182 of FIG. 14 to implement the eight-way microbranch. The purpose of this is to allow microcode to quickly process bit masks in macroinstruction execution flows for CALL, Return, POP and PUSH. The mask processing unit 232 loads the fourteen bits during S4, evaluates the input producing the values shown in the following Table, for bits <6:0> and also separately for bits <13:7> of the B bus:

| Mask | | | | | | | Output | | |
|---|---|---|---|---|---|---|---|---|---|
| X | X | X | X | X | X | 1 | 0 | 0 | 0 |
| X | X | X | X | X | 1 | 0 | 0 | 0 | 1 |
| X | X | X | X | 1 | 0 | 0 | 0 | 1 | 0 |
| X | X | X | 1 | 0 | 0 | 0 | 0 | 1 | 1 |
| X | X | 1 | 0 | 0 | 0 | 0 | 1 | 0 | 0 |
| X | 1 | 0 | 0 | 0 | 0 | 0 | 1 | 0 | 1 |
| 1 | 0 | 0 | 0 | 0 | 0 | 0 | 1 | 1 | 0 |
| 0 | 0 | 0 | 0 | 0 | 0 | 0 | 1 | 1 | 1 | where X means "don't care". When the microcode does branch on one of these output values after they are loaded via lines to the microtest input to the microsequencer 42, the least significant bit which is a one in the current mask value in the mask processing unit 232 is reset to zero automatically, this reset occurring in S3, so that the next microword can branch on the new value of the mask. The microsequencer 42 signals that it did take a branch by input 234 to the mask processing unit 232. The advantage of the mask processing unit 232 is that a minimum number of microcode cycles is needed to find out which registers are to be saved to stack when a CALL or other such macroinstruction is executing. The mask loaded to the B bus contains a one for each of the fourteen GPRs that is to be saved to stack, and usually these are in the low-order numbers of bits <6:0>; say bit-1 and bit-2 are ones, and the rest zeros, then these will be found in two cycles (producing 000 and 001 outputs on lines 233), and the remainder of zeros can be determined in two cycles, one producing "111" on the output 233 for bits <6:2> of the first group and the next producing "111" on the output 233 for bits <13:7> collectively (all zeros) for the second group. Thus, ten microcycles are saved.

The mask processing unit 232 may be implemented, in one embodiment, by a decoder to evaluate the mask pattern according to the Table above and to produce the three-bit output indicated according to the position of the leading "1". In response to a branch-taken indication on the line 234 from the microsequencer, the decoder zeros the trailing "1" in the mask then in the unit, and performs another evaluation to produce the three-bit output value on lines 233.

The branch condition evaluator 235 uses the macroinstruction opcode, the ALU condition code bits and the shifter 46 result to evaluate the branch condition for all macroinstruction branches. This evaluation is done every cycle, but is used only if the microword specifies it in the MRQ field. The result of the evaluation is compared to the instruction unit 22 prediction made in the branch prediction unit 39. The instruction unit 22 prediction is indicated in the entry in the branch queue 70. If the instruction unit 22 prediction was not correct, the execution unit 23 signals the instruction unit 22 on one of the lines 173 and sends a branch-mispredict trap request to the microsequencer 42 as one of the inputs 193. A retire signal is asserted on one of the lines 173 to tell the instruction unit 22 that a branch queue entry for a conditional branch was removed from the branch queue 70. If the retire signal is asserted and the miss-predict signal is not, the instruction unit 22 releases the resource which is holding the alternate PC (the address which the branch should have gone to if the prediction had not been correct). If retire and miss-predict are both asserted, the instruction unit 22 begins fetching instructions from the alternate PC, and the microtrap in the microsequencer 42 will cause the execution unit 23 and floating point unit 27 pipelines to be purged and various instruction unit 22 and execution unit 23 queues to be flushed. Also, a signal to the memory management unit 25 flushes Mbox processing of execution unit 23 operand accesses (other than writes). The branch macroinstruction has entered S5 and is therefore retired even in the event of a misprediction; it is the macroinstructions following the branch in the pipeline which must be prevented from completing in the event of a mispredict microtrap via input 193.

Further details about the P-cache 14, the B-cache 15, the interface/arbiter 21, the M-box 25, the C-box 26, and the F-box 27 are included Ser. No. 07/547,597, filed Jun. 29, 1990, entitled ERROR TRANSITION MODE FOR MULTIPROCESSOR SYSTEM, by Rebecca L. Stamm, et al., which issued on Oct. 13, 1992 as U.S. Pat. No. 5,155,843, herein incorporated by reference.

The Scoreboard Unit (SBU) Control Logic

Figure 17C:
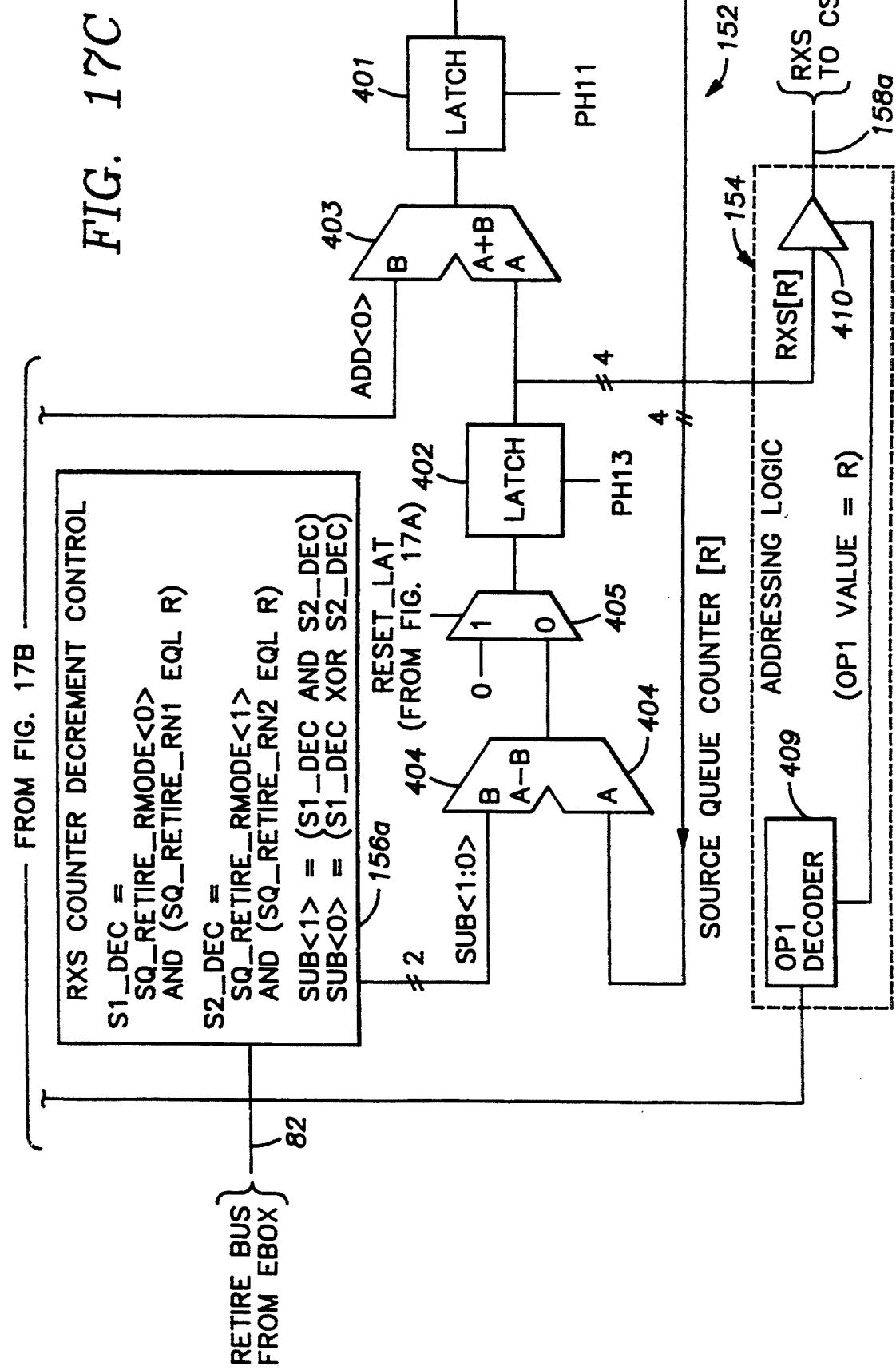
FIG. 17A is an electrical schematic diagram of logic that generates a reset signal used by circuitry in FIGS. 17C and 18B FIGS. 17B and 17C together comprise an electrical diagram in block form of the increment and decrement control logic for a source queue counter in the register scoreboard of FIG. 12.

Turning now to FIG. 17B and 17C, there is shown a schematic diagram of the increment control logic 155a and decrement control logic 156a associated with one of the source queue counters 152 in the register scoreboard unit 81 shown in FIG. 12. As shown in FIG. 17B, the source queue counters 152 includes a latch 401 clocked by the phase one clock PHI1, and a latch 402 clocked by the phase three clock PHI3. The output of the latch 402 is fed to one input of an adder 403, and the sum provided by the adder is latched in the latch 401. In a similar fashion, the output of the latch 401 is fed to an input of a subtractor 404, and the output of the subtractor is latched in a latch 402. A multiplexer 405 is disposed between the output of the subtractor 404 and the input of the latch 402 in order to reset the source queue counter 152 by loading a value of zero in the latch 402.

As shown in FIG. 17A, a reset control signal for the multiplexer 405 is generated by a latch 406, an OR gate 407 and a latch 408 when the Ebox asserts a stop signal due to back-pressure in the pipeline or when the Ebox detects that a branch has been mispredicted. The latch 406 is clocked by the phase three clock PHI3, and the latch 408 is clocked by the phase one clock PHI1.

As shown in FIG. 17B, the RSX counter increment control 155a receives enable signals from enable logic 409, and specifier information from the spec bus 78 to determine a number ADD<0>.

As shown in FIG. 17C, the number ADD<0>, fed to the adder 403. This number ADD<0> has a value of either zero or one depending on whether the spec bus (78 in FIG. 17A) specifies zero or one register mode source specifier that specifies a source including the register corresponding to the source queue counter 152. The RXS counter decrement control 156a receives retire signals from the retire bus 82 to determine a number SUB<1:0> fed to the subtractor 404. This number SUB<1:0> has a value of either zero, one or two depending on whether the retire signals indicate the retirement of zero, one or two register mode source specifiers that specify a source including the register corresponding to the source queue counter 152. The addressing logic 154 for the counter 152 includes an operand decoder 409 and a tri-state gate 410 for driving a line 158a to the CSU (40 in FIG. 8). The tri-state gate 428 is enabled by the decoder 409 when the operand value OP1 is equal to the register number R associated with the source queue counter 152.

Figure 18A:
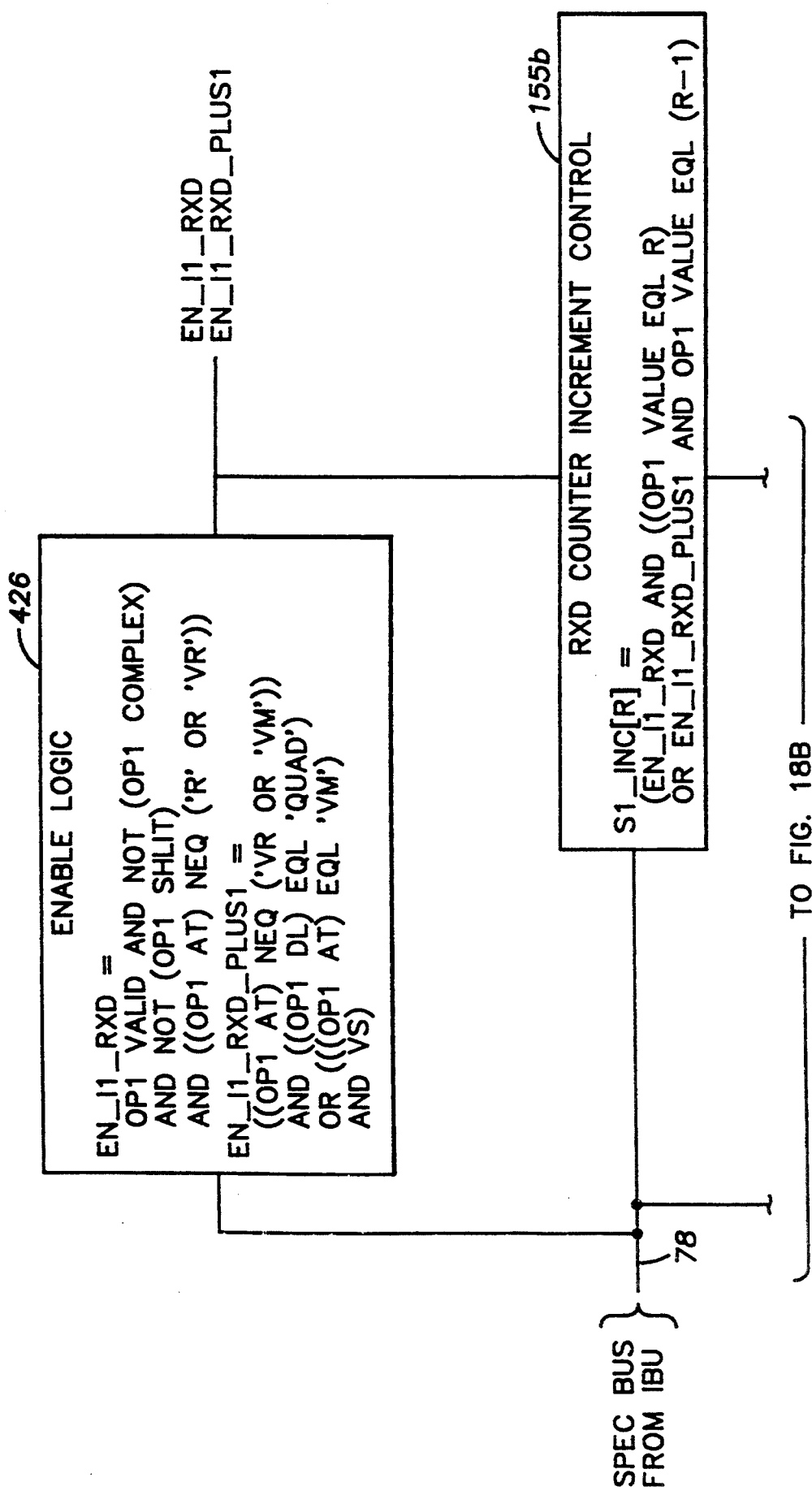
FIGS. 18A and 18B together comprise an electrical diagram in block form of increment and decrement control logic for a destination queue counter in the register scoreboard of FIG. 12.
Figure 18B:
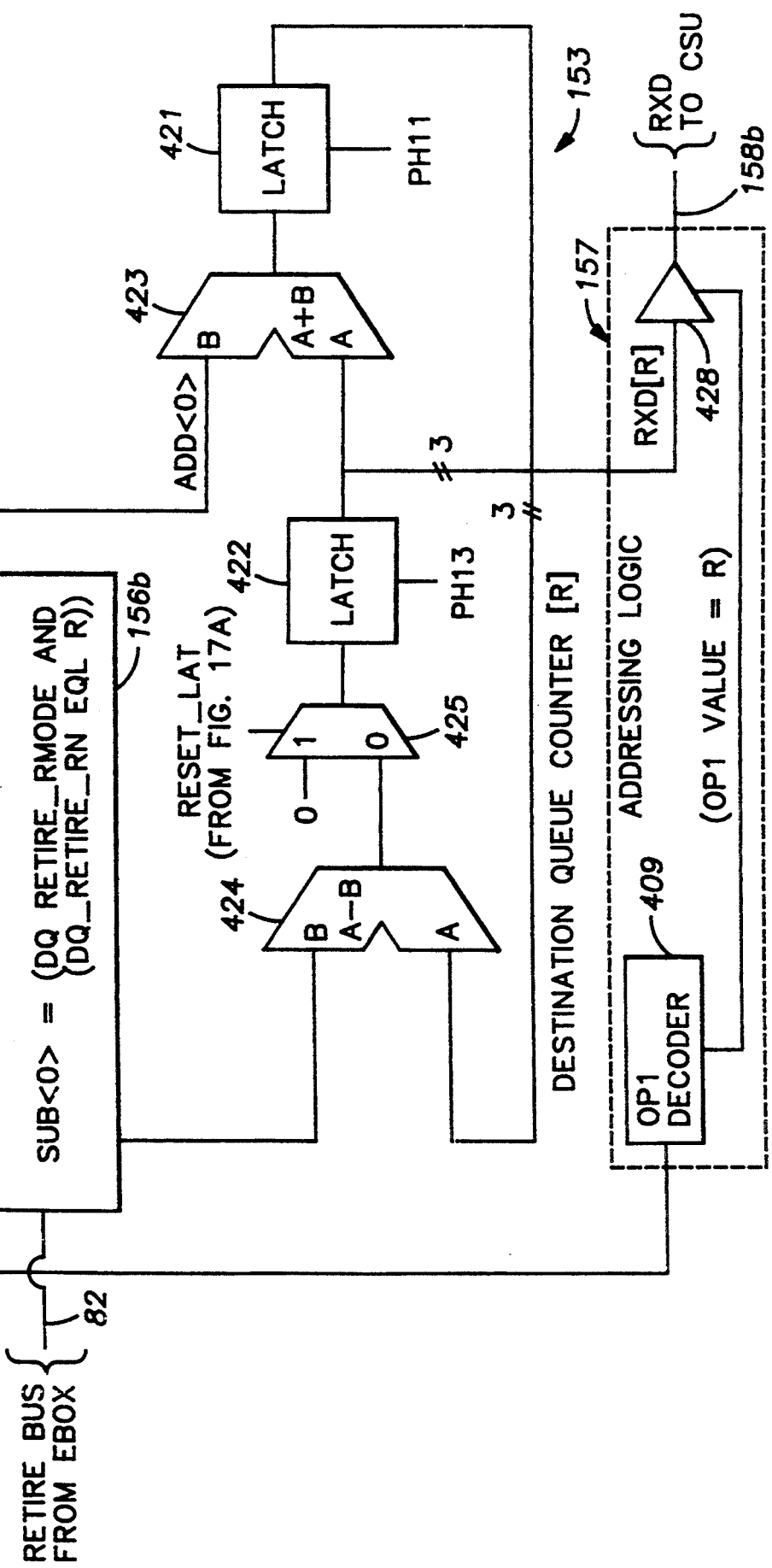

Turning now to FIGS. 18A and 18B, there is shown a block diagram of the increment and decrement control logic for one of the destination queue counters 153 for the register scoreboard unit 81 shown in FIG. 12. In FIG. 18B, the destination queue counter 151 includes a latch 421 clocked by the phase one clock PHI1, and a latch 422 clocked by the phase three clock PHI3. An adder 423 receives the output of the latch 422, and the sum from the adder is latched in the latch 421. In a similar fashion, a subtractor 424 receives the output of the latch 421, and the difference from the subtractor is latched by the latch 422. In order to reset the counter 153, a multiplexer 425 is inserted between the subtractor 425 and the latch 422. The multiplexer 425 selects a value of zero to reset the counter, when the reset signal RESET_LAT is asserted by the latch 406, OR gate 407, and latch 408 shown in FIG. 17.

As shown in FIG. 18A, the RDX counter increment control 155b receives enable signals from enable logic 426, and specifier information from the spec bus 78 to determine a number ADD<0> fed to the adder 423. This number ADD<0> has a value of zero or one depending on whether the spec bus 78 specifies zero or one register mode destination specifier which specifies a destination including the register corresponding to the destination queue counter 153. As shown in FIG. 18B, the RDX counter decrement control 156b receives retire signals from the retire bus to determine a number SUB<0> fed to the subtractor 424. This number SUB<0> has a value of either zero or one depending on whether the retire signals indicate the retirement of zero or one register mode destination specifier which specifies a destination including the register corresponding to the destination queue counter 153. The addressing logic 157 for the counter 153 includes the operand decoder 409 and a tri-state gate 428 for driving a line 158b to the CSU (40 in FIG. 8). The tri-state gate 428 is enabled by the decoder 409 when the operand value OP1 is equal to the register number R associated with the destination queue counter 153.

Figure 19A:
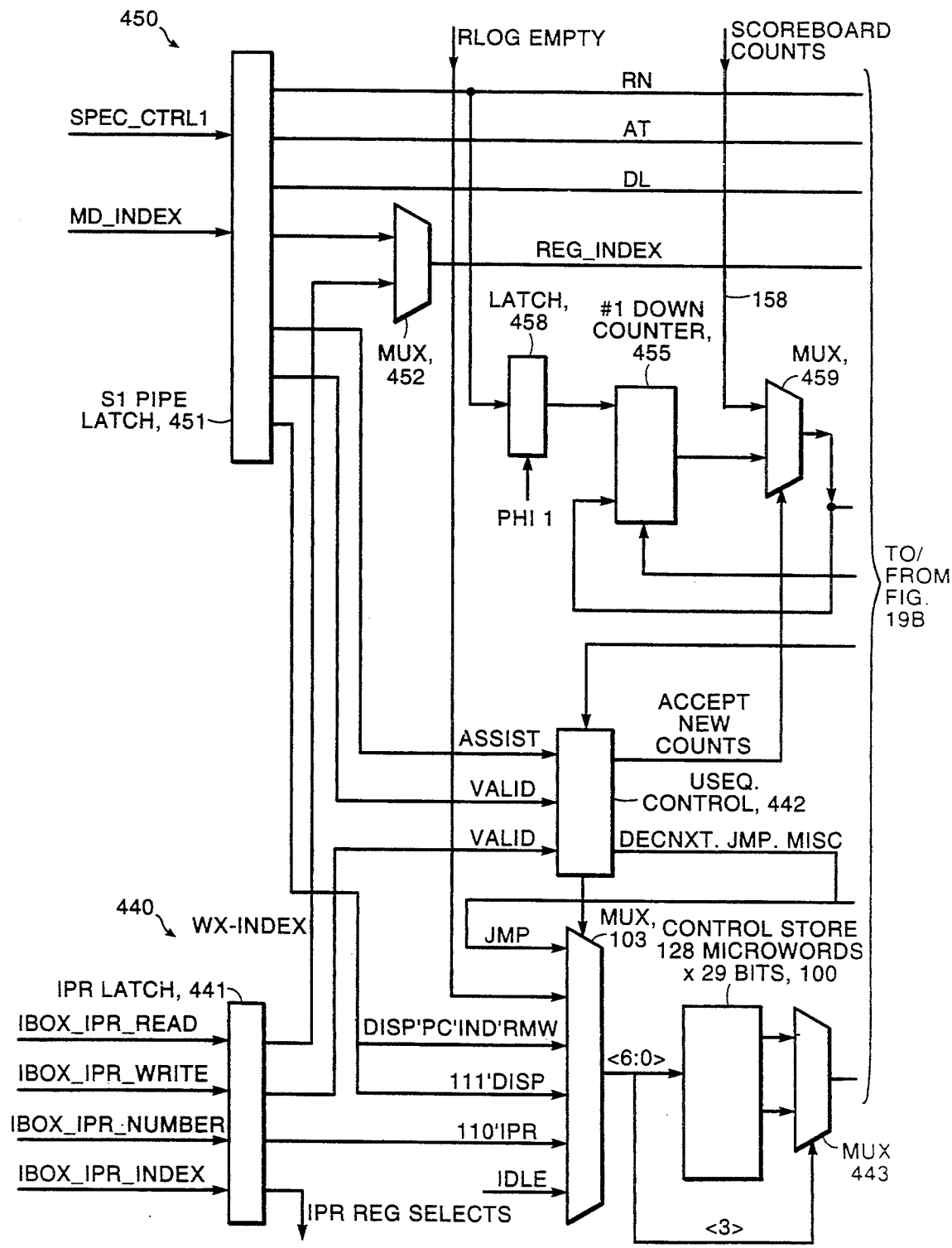
FIGS. 19A and 19B together comprise an electrical diagram in block form of the control logic and control pipeline for the complex specifier unit (CSU) shown in FIGS. 8 and 9.
Figure 19B:
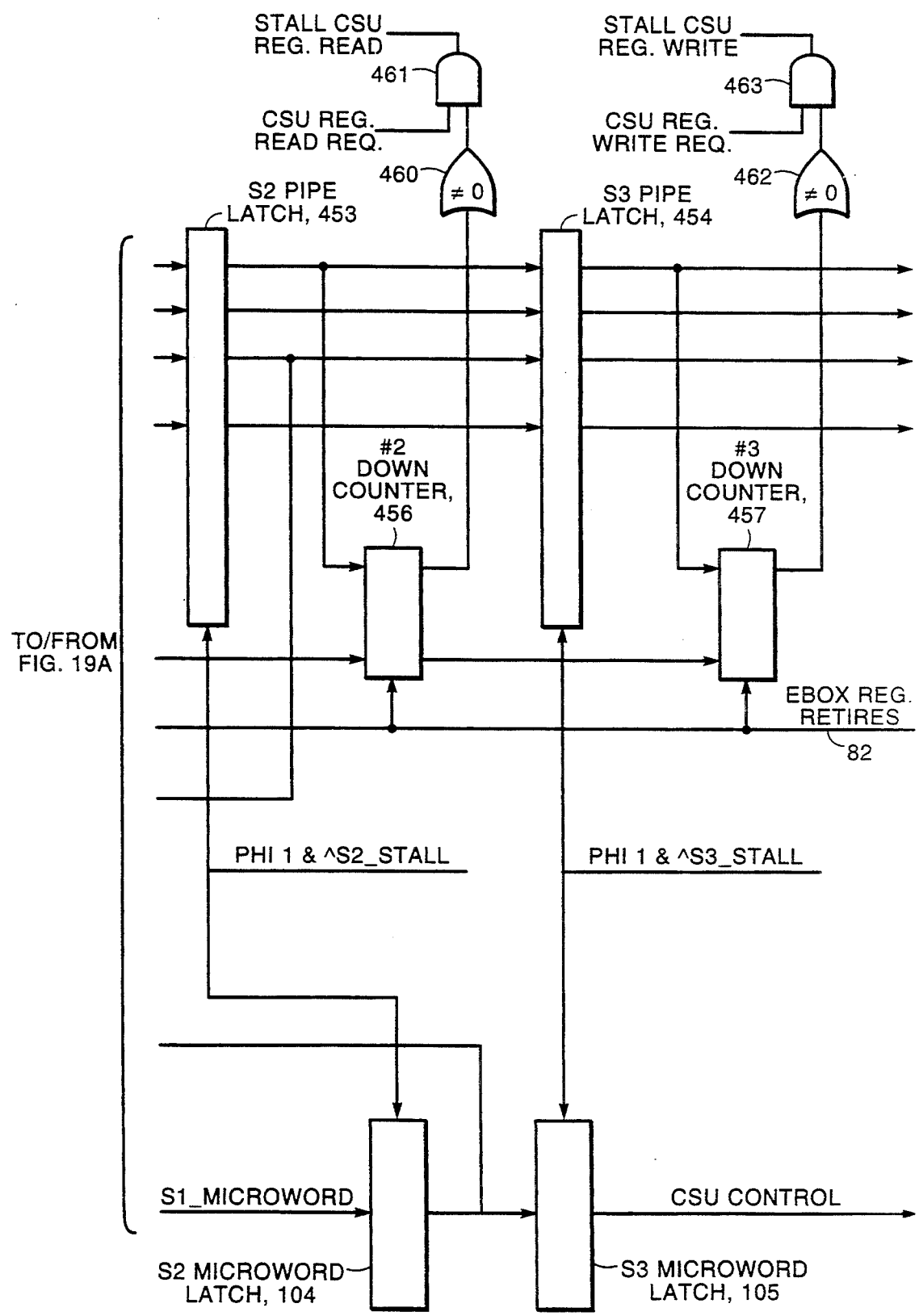

FIGS. 19A and 19B shows in greater detail the control logic in the complex specifier unit (CSU 40 of FIG. 8). Shown in FIG. 19A are the multiplexer 103 and, control store 100. Shown in FIG. 19B are the S2 microword latch 104, and the S3 microword latch 105 introduced in FIG. 9. The CSU control pipeline 440 of FIG. 19 further includes an IPR latch 441, microsequencer control logic 442, and a multiplexer 443 for selecting an S1_MICROWORD from the control store 100.

The CSU microsequencer provides microcoded control for the 3-stage pipelined datapath of FIG. 9. Under typical operation, a control store address is generated for the 128-entry × 29-bit control store array and a new microword is referenced every cycle. The microword depicted in the following table is issued and forwarded to the subsequent pipeline stages in consecutive cycles in order to control the datapath logic in those stages.

| CSU MICROWORD FIELDS | | |
|---|---|---|
| Bit Field | Field Name | Description |
| <28:26> | ALU.FNC | controls the ALU function |
| <25> | ML | selects mem req data length = long or DL |
| <24:22> | A | IA_bus source |
| <21:19> | B | IB_bus source |
| <18:16> | DST | IW_bus destination |
| <15:13> | MISC | miscellaneous functions |
| <12:9> | MREQ.FNC | controls memory request function |
| <8:7> | DEC.NEXT | conditional control of decoder next |
| <6:0> | NXT.ADDR | full next microaddress field |

The 128-entry control store array is arranged as 8 pages of 16 microwords per page. Bits <6:4> of the control store address designate the microcode page, bits <3:0> designate the microword address within a page. The page organization places the microcode corresponding to a unique complex specifier flow within a particular page, as shown in the following table.

| CSU MICROCODE PAGE ALLOCATION | |
|---|---|
| Page | Description |
| 000 | displacement flows, modes = A,C,E |
| 001 | displacement deferred flows, modes = B,D,F |
| 010 | auto increment flow, mode = 8 |
| 011 | auto increment deferred flow, mode = 9 |
| 100 | register deferred flow, mode = 6 |
| 101 | auto decrement flow, mode = 7 |
| 110 | IPR and utility routines, index flow, mode =4 |
| 111 | Ebox assists, idle address |

The CSU specifier microcode processes VAX (Trademark) defined specifiers 4 and 6-F. These are the operand specifiers that the Ibox defines as complex. Displacement data is sign extended by the IBU so the CSU can process byte, word and longword displacement specifiers in a longword microcode flow. Displacement deferred specifiers merge together in a similar fashion. Ebox assists are "implicit" operands in some of the VAX (Trademark) opcodes. In order to simplify Ebox microcode to handle instruction execution only, the implicit specifiers are processed up front by the Ibox. These assists appear to the Ebox as typical complex operands.

The control logic for the CSU also includes a specifier pipeline 450 that runs in parallel with the CSU control pipeline 440. The specifier pipeline 450 includes an S1 pipe latch 451, and a multiplexer 452, shown in FIG. 19A, and an S2 pipe latch 453, and an S3 pipe latch 454 shown in FIG. 19B. The S2 pipe latch 453, the S2 microword latch 104 of FIG. 9B are clocked by the phase one clock PHI1 ANDed with an S2 stall signal asserted low. The S3 pipe latch 454, the S3 microword latch 105, of FIG. 9B are clocked by the phase one clock PHI1 ANDed with a S3 stall signal asserted low. The specifier control pipeline 450 further includes a series of three down counter stages 455 in FIG. 19A, and 456 and 457 in FIG. 19B which receive scoreboard counts from the register scoreboard unit SBU of FIG. 12, and which selectively decrement the counts in response to register retires by the Ebox from the retire bus 82. The first down counter 455 is clocked in synchronism with the S1 latch 451. The second down counter 456 is clocked in synchronism with the S2 pipe latch 453, although it continues to function during a S2 stall. In a similar fashion, the third down counter 457 is clocked in synchronism with the S3 pipe latch, but it also continues to count during a S3 stall. The first down counter 455 may accept a new scoreboard count even when the second down counter 456 cannot accept a new count because of a S2 stall. The first down counter 455 receives a delayed version of the S1 stage register number RN held in a latch 458. A multiplexer 459 in FIG. 19A selects either the scoreboard counts from the bus 158 or the counts from the first down counter 455, and passes the selected counts to the second down counter 456 and also feeds the selected counts back to the first down counter 455. The multiplexer 459 is controlled by the microsequencer control 442 in FIG. 19A so that new scoreboard counts are accepted from the bus 158 when a complex specifier is received by the CSU from the burst unit (33 in FIG. 8). As noted above, the CSU is busy and cannot accept a new complex specifier so long as the valid signal in the S1 latch is still valid from a previous request for service (either due to a multi-cycle flow or a CSU stall).

The S1 pipe latch 451 and the first down counter 455 in FIG. 19A are loaded from the parsed instruction stream data and parameters shown in the following table.

| S1 PIPE LATCH AND FIRST DOWN COUNTER | | |
|---|---|---|
| Bit Field | Field Name | Description |
| <3:0> | S1_RN | GPR number from the specifier |
| <6:4> | S1_AT | Access Type of the operand associated with the specifier |
| <8:7> | S1_DL | Data length of the operand associated with the specifier |
| <12:9> | S1_RXS_SCORE | Value of scoreboard source |

S1 PIPE LATCH AND FIRST DOWN COUNTER

| Bit Field | Field Name | Description |
|---|---|---|
| | | queue counter indexed by GPR number |
| <15:13> | S1_RXD_SCORE | Value of scoreboard dest queue counter indexed by GPR number |
| <18:16> | S1_DISPATCH | Control store dispatch address |
| <19> | S1_AT_RMW | Access Type of operand is R, M or W |
| <20> | S1_INDEXED | The base specifier has an index specifier |
| <21> | S1_ASSIST | Ebox assist specifier |
| <22> | S1_PC_MODE | The specifier uses program counter addressing |
| <25:23> | S1_REG_INDEX | Value of OQU MD allocation pointer |
| <57:26> | S1_IB_DATA | Data for Immediate and displacement mode specifiers |
| <89:58> | S1_IBOX_PC | The PC of the next Istream byte following this specifier |
| <90> | S1_VALID | S1 pipe latch valid bit |
| <91> | S1_JMP_OR_JSB | Indicates whether the instruction was JMP or JSB |

S1_RN, S1_AT, S1_DL, S1_DISPATCH, S1_AT_RMW, S1_INDEXED, S1_ASSIST, and S1_PC_MODE load directly from the specifier control field and the specifier complex control field as driven by the IBU. The S1_REG_INDEX loads from the MD_INDEX lines coming from the OQU. The 32-bit S1_IB_DATA and S1_IBOX_PC are loaded from SPEC_DATA<31:0> and IBU_PC<31:0>, respectively.

S1_RXS_SCORE and S1_RXD_SCORE load from the entry in the SBU scoreboard array pointed to by the GPR number of the specifier. S1_RXS_SCORE and S1_RXD_SCORE represent "snapshot" values of the scoreboard, taken when a specifier dispatch enters the S1 pipe latch 451. The SBU updates the value of these entries based on the Ebox retiring source and destination queue entries. The snapshot values are decremented by the down counters 455, 456, 457 in parallel with the SBU values.

The S1_VALID bit indicates that the S1 pipe latch contains valid dispatch arguments waiting to be serviced. The CSU recognizes the availability of the valid complex dispatch, and performs the control store access. The microword is issued in S1 and loaded into the S2 microword latch 104. The CSU sets S1_VALID when a complex specifier is parsed by the IBU and doesn't advance to stage S2 the following cycle. This results in an S1_STALL. The S1 logic clears S1_VALID upon successful transition of the S1 microword into the S2 microword latch 104. The clear S1_VALID bit indicates the availability of the S1 pipe stage for a new complex specifier dispatch next cycle.

The S1_STALL condition occurs when the context of the S1 pipe latch 451 cannot be loaded immediately into the S2 pipe latch 453. This condition may occur during an S2_STALL or a multiple microword flow. S2_STALL indicates the S2 pipe latch 453 cannot currently advance. Naturally, this stall ripples back to become an S1_STALL as well because the S1 microword cannot advance into the S2 microword latch 104. During multiple microword flows, the next control store address is generated from the microword in the S2 microword latch 104. Consequently, the S1 pipe latch 451 may accept one dispatch from the IBU which sets S1_VALID. The dispatch in the S1 pipe latch 451 is then in the S1_STALL condition waiting for service.

The IBU uses S1_VALID as part of the parser enable equation. If S1_VALID is clear, then the IBU may parse a complex specifier and retire the instruction stream from the PFQ. If S1_VALID is set, then, if the IBU parses a complex specifier, it cannot retire the instruction stream because the S1 pipe latch cannot accept the dispatch. The IBU stalls the parser such that the same specifier is parsed in subsequent cycles.

Typical microcode flows begin at a microcode address determined by a complex specifier dispatch. A DECODER_NEXT directive in the S2 microword latch 104 tells the microsequencer that the next microcode address is not related to the current flow. If S1_VALID indicates a valid dispatch waiting in the S1 pipe latch and the S2 pipe latch contains a DECODER_NEXT, then the microsequencer selects the S1 pipe latch 451 as the source of the next microaddress. This begins a new microcode flow for the specifier being dispatched. The microcode sequences through a flow using microaddress jumps. A jump selects the NXT_ADDR<6:0> field of the microword in the S2 microword latch 104 directly for the next microword address. The final microword of each flow contains a DECODER_NEXT (DECNXT) which once again requests a new dispatch address.

Requests for IPR references must guarantee that the CSU is idle. Thus, whenever the S1 logic detects an IPR read strobe from the Ebox, then the next microaddress is selected by the IPR number. The request immediately dispatches to the utility microcode page.

The unwind_mispredict routine is selected when the Ebox signals a branch mispredicted. The RLOG unit (94 in FIG. 8) unwinds, restoring the GPRs until the RLOG is empty, then the Ibox is restarted.

The CSU dispatches to the common entry point for the single microword index routine when the dispatch number of a specifier indicates that it is an index. The index register is read from the Ebox and shifted by length=DL.

The microaddress control selects the IDLE address when no valid dispatch or utility dispatch awaits processing. The IDLE microword simply jumps to its own address and executes the DECODER_NEXT directive, awaiting a valid dispatch.

In addition to the standard DECODER_NEXT directive, the microcode and next address logic supports a conditional DECODER_NEXT. The DECODER_NEXT_IF_BWL performs a standard DECODER_NEXT if the data length associated with the specifier is byte, word, or longword. For quadword data length, the next address logic performs a microaddress jump.

The microcode and next address logic supports one conditional jump. The BRANCH_IF_RLOG_EMPTY directive causes the next microaddress logic to perform a standard jump, but, in addition, the logic OR function of a 1 and the next microaddress bit <0> is performed if the RLOG is empty. The RLOG unwind microcode uses this conditional jump feature. A single microword jumps to itself as long as the RLOG still has valid entries. When the RLOG empties, the microword conditionally jumps out of the loop.

The S1 logic uses the five-input multiplexer 103 in FIG. 19A to select the source of the next control store address. Both the complex specifier input to the multiplexer 103 and Ebox assist input to the multiplexer 103 use data from the S1 pipe latch 451 to form the next address. The IPR input to the multiplexer 103 uses the latched IPR number from the IPR latch 441, to select which IPR type field will be used to form the next address. The next address field from the S2 microword enters another input of the multiplexer 103 in order to perform the microaddress jump. The final input of the multiplexer 103 is the idle address. Next address generation is summarized by the following table.

| | NEXT ADDRESS GENERATION FIELDS | |
|---|---|---|
| Bit Field | Field Name | |
| | | Specifier Dispatch Description |
| <0> | | forced to 0 |
| <1> | S1_INDEXED | index specifier |
| <2> | S1_PC_MODE | base register is the PC |
| <3> | S1_AT_RMW | access type = read, modify, or write |
| <6:4> | S1_DISPATCH | S1_DISPATCH<2:0> field from the IBU |
| | | Assist Dispatch Description |
| <0> | | forced to 0 |
| <3:1> | S1_DISPATCH-<2:0> | assist type |
| <6:4> | | forced to 111, assist page number |
| | | IPR and Utility Dispatch Description |
| <0> | | forced to 0 |
| <3:1> | 000 | index routine |
| <3:1> | 001 | IPR unwind RLOG read backup PC |
| <3:1> | 010 | E%BRANCH_MISPREDICT |
| <3:1> | 011 | IPR read |
| <6:4> | | forced to 110, IPR/utility page number |
| | | Idle Dispatch Description |
| <6:0> | | forced to 1111111, idle address |
| | | Next Address Description |
| <0> | NXT_ADDR | next address field from the S2_MICROWORD. For conditional jump OR in 1 if RLOG is empty |
| <6:1> | NXT_ADDR | next address field from the S2_MICROWORD |

Turning now to FIG. 19B, the microword in the S2 microword latch 104, the operand context in the S2 pipe latch 453, and the scoreboard counts in the second down counter 456 control the S2 pipeline datapath. The contents of these S2 latches are shown in the following table.

| | S2 CONTROL FIELDS | |
|---|---|---|
| Bit Field | Field Name | Description |
| <3:0> | S2_RN | GPR number from the specifier |
| <6:4> | S2_AT | Access Type of the operand associated with the specifier |
| <8:7> | S2_DL | Data length of the operand associated with the specifier |
| <11:9> | S2_REG_INDEX | Current value of S2 MD allocation pointer or WX index |
| <15:12> | S2_RXS_SCORE | Value of scoreboard source queue counter indexed by GPR number |
| <18:16> | S2_RXD_SCORE | Value of scoreboard dest queue counter indexed by GPR number |
| <47:19> | S2_MICROWORD | The microword issued in S1 |
| <48> | S2_NEW_FLOW | Indicates the first microword of a flow |
| <49> | S2_JSB_OR_JMP | Indicates whether the instruction was JMP or JSB |

S2_RN, S2_AT, S2_DL, S2_JSB_OR_JMP, S2_RXS_SCORE, and S2_RXD_SCORE load from the S1 latches. S2_REG_INDEX is loaded through a multiplexer 452 which typically selects loading from S1_REG_INDEX; however, if the dispatch is for an IPR, it loads a copy of WX_INDEX from the IPR latch 441.

The S2_MICROWORD field in the S2 microword latch 104 updates from the microword issued by the S1 pipe stage. During an initial specifier dispatch, all of the S2 control fields update. Bits <48:19> update every cycle, assuming no stalls. However, bits <49,18:0> remain constant throughout the context of one specifier flow, except for local scoreboard decrements of S2_RXS_SCORE and S2_RXD_SCORE. These S2 control fields do not reload until another dispatch occurs. This allows for multiple microword flows within the context of a given specifier.

S2_NEW_FLOW indicates that contents of the S2 microword latch represents the first microword of a new dispatch. In other words, the microword address for the microword in S2 was generated in any manner other than a microaddress jump. This pipe bit aids the S3 stage in loading the specifier context.

The S2 datapath, as shown in FIG. 9, contains the CSU register set and constant generator. The CSU ALU source busses, the IA_bus 86 and IB_bus 85, are controlled by the microcode in the S2 pipeline stage. The CSU microcode may also request an Ebox GPR to source the IA_bus 86 by providing the I%IBOX-_IA_ADDR<3:0> from the S2_RN field of the S2 pipe latch. The Ebox register read is strobed with I%I-BOX_IA_READ. The Ebox returns GPR data later that cycle on the E%IBOX_IA<31:0> lines 93. This provides a path for the CSU to obtain the base specifier register of the operand currently being processed. When the S2_microword is sourcing a GPR which is identical to the S3-microword destination register, the IW_BUS will be driven onto the source bus, bypassing the GPR read. The registers accessed by the CSU data path of FIG. 9 are summarized in the following table:

| CSU REGISTERS | | | |
|---|---|---|---|
| Register Name | Available On | Written From | Description |
| T0 | IA,IB | IW | temporary register |
| S_DATA | IA,IB | SPEC_DATA | immediate and displacement data |
| RX | IA | IW | base specifier register |
| IMD | IA | MD | Ibox memory data |
| MD | — | IW | Ebox memory data register |
| WX | — | IW | Ebox working register |
| KDL | IB | — | 1 for DL=Byte, 2 for Word, 4 for LONG, 8 for QUAD |
| IDL | IB | — | 1 for DL=Byte, 2 for Word, 4 For LONG, 4 for QUAD |
| K4 | IB | — | Constant 4 |
| K12 | IB | — | Constant 12 |
| RLOG_RX | IA | IW_BUS | Register pointed to by top of RLOG |

| CSU REGISTERS | | | |
|---|---|---|---|
| Register Name | Available On | Written From | Description |
| RLOG_KDL | IB | — | Same as KDL except using DL from top of RLOG stack |
| IBOX_PC | IA | IBU_PC | PC of instruction byte following last byte in specifier |

TO is a temporary register for microcode use. IB_DATA and IBOX_PC are the S2 pipeline copies of S1_IB_DATA and S1_IBOX_PC, respectively. IB_DATA and IBOX_PC are loaded along with the S2_PIPE_LATCH<18:0> on the first microword of a dispatch. Then, the CSU microcode maintains control of these registers throughout the context of a given specifier flow.

RX refers to the Ebox GPR register indexed by S2_RN. RLOG_RX refers to the Ebox GPR register indexed by the RLOG_RN. MD addresses the Ebox MD register indexed by S2_REG_INDEX. WX points to the Ebox working register also indexed by S2_REG_INDEX. K4 and K12 are constants. KDL is a constant based on S2_DL. The value of the constant is 1 for DL=0 (byte), 2 for DL=1 (word), 4 for DL=2 (longword), and 8 for DL=3 (quadword). IDL is a constant based on S2_DL for immediate mode specifier with access type A or V. IDL differs from KDL in the fact that the constant value is 4 for DL=3 (quadword). RLOG_KDL is a constant similar to KDL, but based on RLOG_DL.

For all memory requests for deferred addresses started by the CSU microcode, the Ibox memory data returns to the IMD register. The Mbox drives M%IBOX_DATA when M%MD_BUS<31:0> contains valid data from a specifier memory request. The IMD has a signal IMD_VALID associated with it. Each time the CSU microcode initiates a memory request, IMD_VALID is set. Each time memory data returns to IMD, IMD_VALID is reset.

When M%MME_FAULT or M%HARD_ERROR is asserted by the Mbox along with M%IBOX_DATA, this indicates that Ibox data on M%MD_BUS is invalid and that the corresponding reference was associated with either a memory management exception or a hard error condition. In both cases, the CSU continues to process the specifier, but sets flags indicating the IMD contains invalid data. The flags are reset at the end of each specifier flow. They are forwarded to stage S3 whenever the IMD is selected to source the IA_bus. They are called I%FORCE_MME_EXCEPT and I%FORCE_HARD_ERROR. When set, they indicate to the Ebox and Mbox that the associated register write or Ibox reference should be forced to "look" like a memory management fault or a hardware fault from the Ibox point of view.

The S2 pipeline stage stalls for three reasons: GPR destination queue stall (RXD_STALL), Ibox memory data stall (IMD_STALL), and S3_STALL. RXD_STALL occurs when the CSU microcode attempts a read of a GPR for which there exist outstanding writes in the Ebox destination queue. The S2 pipeline logic detects RXD_STALL when S2_RXD_SCORE does not equal 0, and the S2_MICROWORD attempts to read the GPR from the Ebox indexed by S2_RN. An OR gate 460 determines when the destination count from the second down counter 456 is not zero. An AND gate 461 is enabled by the OR gate 460 to stall a register read by the CSU when the destination count is not zero. The stall breaks when the Ebox retires a destination queue entry that causes both the SBU counter and the snapshot S2_RXD_SCORE to decrement. Multiple source queue entries may have to be retired, causing multiple decrements, before S2_RXD_SCORE equals 0.

IMD_STALL occurs when the S2_MICROWORD attempts to read the IMD when IMD_VALID is set. This condition implies that a memory request was initiated by CSU microcode which set IMD_VALID, but memory data which resets the signal has not yet been returned. IMD_STALL can only happen in the context of one complex specifier flow when the Ibox requests then waits for memory data to be returned to IMD.

S2_STALLS block the S2 pipeline latch update, causing the S2 stage to execute the same stalled MICROWORD until the stall breaks. If an S2 stall occurs, not resulting from a S3 stall, the S3 pipeline latch continues to update; however, NOPs are fed into the S3 pipeline latch while the S2 stall is in progress. When the stall breaks, the pipeline latches resume normal operation.

The contents of the S3 microword latch 105, the S3 pipe latch 454, and the third down counter 457 in FIG. 19B control the S3 pipeline datapath. These S3 control fields are described in the following table:

| S3 CONTROL FIELDS | | |
|---|---|---|
| Bit Field | Field Name | Description |
| <3:0> | S3_RN | GPR number from the specifier |
| <6:4> | S3_AT | Access Type of the operand associated with the specifier |
| <8:7> | S3_DL | Data length of the operand associated with the specifier |
| <11:9> | S3_REG_INDEX | Current value of S3 MD allocation pointer or WX index |
| <15:12> | S3_RXS_SCORE | Value of scoreboard source queue counter indexed by GPR number |
| <46:16> | S3_MICROWORD | The microword issued in S1 |
| <47> | S3_JSB_OR_JMP | Indicates whether the instruction was JMP or JSB |

S3_RN, S3_AT, S3_DL, S3_REG_INDEX, S3_JSB_OR_JMP, and S3_RXS_SCORE load directly from the S2 pipe stage. S3_RXS_SCORE decrements in parallel with its corresponding SBU values. When S3 logic initiates a memory reference with an MD destination, S3_REG_INDEX specifies the index into the MD register array for the memory data write. Such memory requests cause MD_INDEX to increment modulo the size of the MD register file, so that the data for quadword operands, which require two memory requests, occupy successive MD registers.

The S3_MICROWORD field in the S3 microword latch 105 updates from the S2_MICROWORD. During the first instruction of a specifier dispatch flow, as indicated by the contents of S2_NEW_FLOW, all of the S3 pipe latches update. The microword field in bits <46:16> continues to update every cycle, loading the new microword from S2. However, bits <47,15:0> of the S3 latch stage remain constant throughout the context of one specifier flow, except for local scoreboard decrements of S2_RXS_SCORE, and local increments of S3_REG_INDEX. This part of the S3 latch stage does not reload until another dispatch occurs, allowing for multiple microword flows within the context of a given specifier.

The S3 datapath includes the CSU ALU (84 in FIG. 9) and register write logic. The ALU maintains 32-bit input latches which load the IA_BUS and IB_BUS during a S3 pipe latch update. Under control of the microcode /ALU.FNC field the ALU performs 32-bit add, subtract, pass, and left bit-shift equal to S2_DL. The destination bus, IW_bus, provides the path to write the ALU results to one of the CSU registers under control of the microcode /DST field. The IW_BUS_ bus can also be selected to write to the Ebox GPR, MD, and working (WX) registers. The I%IBOX-_IW_BUS<31:0>lines are driven from the ALU output, and the S3_RN field of the S3 pipe latch provide I%IBOX_IW_ADDR<4:0> as an index into the GPR array. MD and WX writes both use the S3_REG_INDEX field of the S3 pipe latch to provide I%IBOX_IW_ADDR<4:0> as an index into the Ebox register array. The Ebox register write is strobed with I%IBOX_IW_WRITE.

The S3 stage logic initiates CSU memory requests based on the S3_MICROWORD. Along with a memory request command, the full 32-bit address is sent to the Mbox on the I%IBOX_ADDR<31:0> lines. These lines may be sourced from either the IA_BUS or IW_BUS, under the S3_MICROWORD /MREQ field control. If microcode selects the IA_BUS for memory request address, the S3 pipe latch for the IA_BUS sources the address. The S3 logic also forwards VIC_REQ from VIC Istream requests to the Mbox when there are no specifier memory requests in the S3_MICROWORD. In this case, the I%IBOX-_ADDR is sourced by VIC_REQ_ADDR from the VIC.

The following control signals accompany I%IBOX-_ADDR<31:0>. I%IBOX_CMD<4:0> indicates reference type to the Mbox. I%IBOX_TAG<4:0> contains the Ebox register file destination of a memory request, a copy of S3_REG_INDEX. I%IBOX-_AT<1:0> and I%IBOX_DL<1:0> provide the Mbox with the access type and data length. I%IBOX AT<1:0> is either a copy of S3_AT or forced to read or write depending on control of the microcode /MREQ field. I%IBOX_DL<1:0> is either a copy of S3_DL or forced to longword depending on control if the microcode /ML field. I%IBOX_REF_DEST<1:0> specifies the destination for memory request data. I%IBOX REF DEST<1> indicates that the Ebox MD registers are the destination. I%IBOX-_REF_DEST<0> indicates that the Mbox IMD register is the destination. This field is decoded from the S3_MICROWORD memory field. The I%-SPEC_REQ strobe is asserted for CSU specifier memory requests. The I%IREF_REQ strobe is asserted for VIC Istream memory requests.

For JMP, JSB, and certain Ebox assists, the S3 logic sends requests to the BPU (39 in FIG. 8) to load a new PC. The PC value may be sourced from either the I%IBOX_IW_BUS<31:0> or M%MD_BUS<31:0> under S3_MICROWORD /MISC field control, as indicated by LD_PC_WBUS or LD_PC_MD, respectively.

The S3 pipeline stage stalls for three reasons: GPR source queue stall (RXS_STALL), memory request stall (MRQ_STALL), and (RLOG_STALL). RXS_STALL occurs when the CSU microcode attempts to write a GPR destination for which there exist outstanding read in the Ebox source queue. The S3 pipeline logic detects RXS_STALL when S3_RXS_SCORE does not equal 0, and the S3_MICROWORD attempts to write the GPR in the Ebox indexed by S3_RN. An OR gate 462 determines when the source count from the third down counter 457 is not zero. An AND gate 463 is enabled by the OR gate 462 to stall a CSU register write when the source count is not zero. The stall breaks when the Ebox retires a source queue entry that causes both the SBU counter and the snapshot S3_RXS_SCORE to decrement. Multiple source queue entries may have to be retired, causing multiple decrements, before S3_RXS_SCORE equals 0.

RLOG_STALL occurs when RLOG_FULL is asserted and the microword in the S3 pipe requests a GPR write. The stall effect is exactly the same as RXS_STALL. The stall breaks when the Ebox retires an instruction which in turn relinquishes RLOG resources.

MRQ_STALL occurs when the S3_MICROWORD attempts a memory request but the M%SPEC_Q_FULL signal from the Mbox indicates that the request cannot be accepted.

S3_STALLS block the S3 pipeline latch update, causing the S3 stage to execute the same stalled MICROWORD until the stall breaks. S3_STALLS also back-stall the S2 stage, in effect causing S2_STALL which blocks the S2 pipeline latch update. Both pipeline stages execute their respective stalled microwords until the stall condition breaks, allowing successful completion of the microword. The pipeline latches then continue to update as usual.

RXS_STALL does not block the initiation of a memory request by the S3_MICROWORD. In other words, if the S3_MICROWORD indicates a memory request operation and no MRQ_STALL or RLOG_STALL exists, the request is initiated regardless of RXS_STALL. This somewhat decoupled operation of the S3_STALLS breaks possible macroinstruction deadlocks due to the R0 (R0)+ case. While processing the specifier (R0)+, the CSU microcode performs a write to the GPR R0. A RXS_STALL will hold until the Ebox retires the first source, R0. The Ebox must retire two source operands at a time, and therefore cannot retire the R0 specifier until the MD for the second specifier is valid. The converse case, whether MRQ_STALL blocks a register write, is not an architectural or performance issue, although a specific implementation blocks register writes during an MRQ_STALL.

Figure 20A:
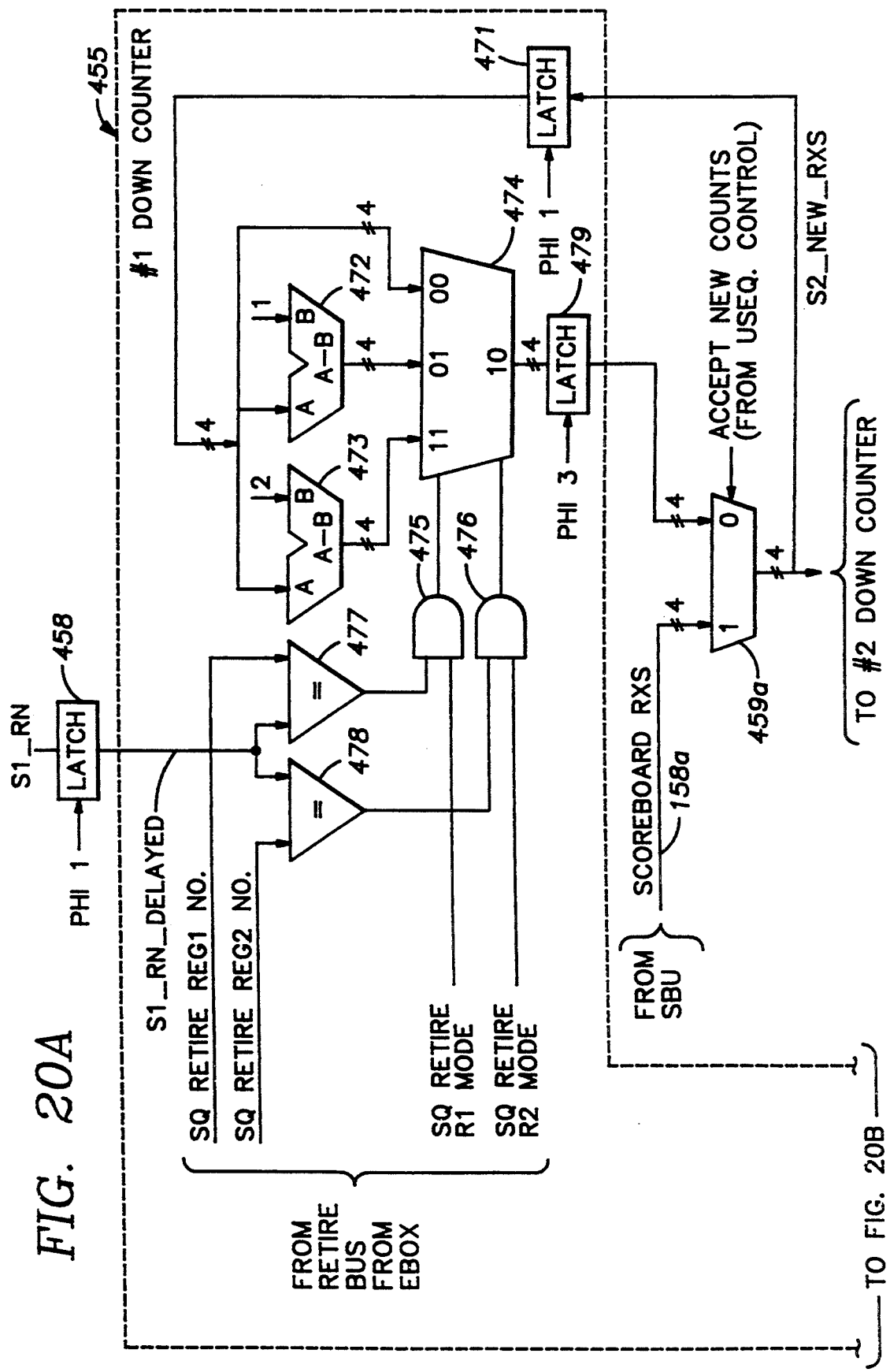
FIGS. 20A and 20B together comprise an electrical diagram in block form of a first-down counter stage shown in FIG. 19.
Figure 20B:
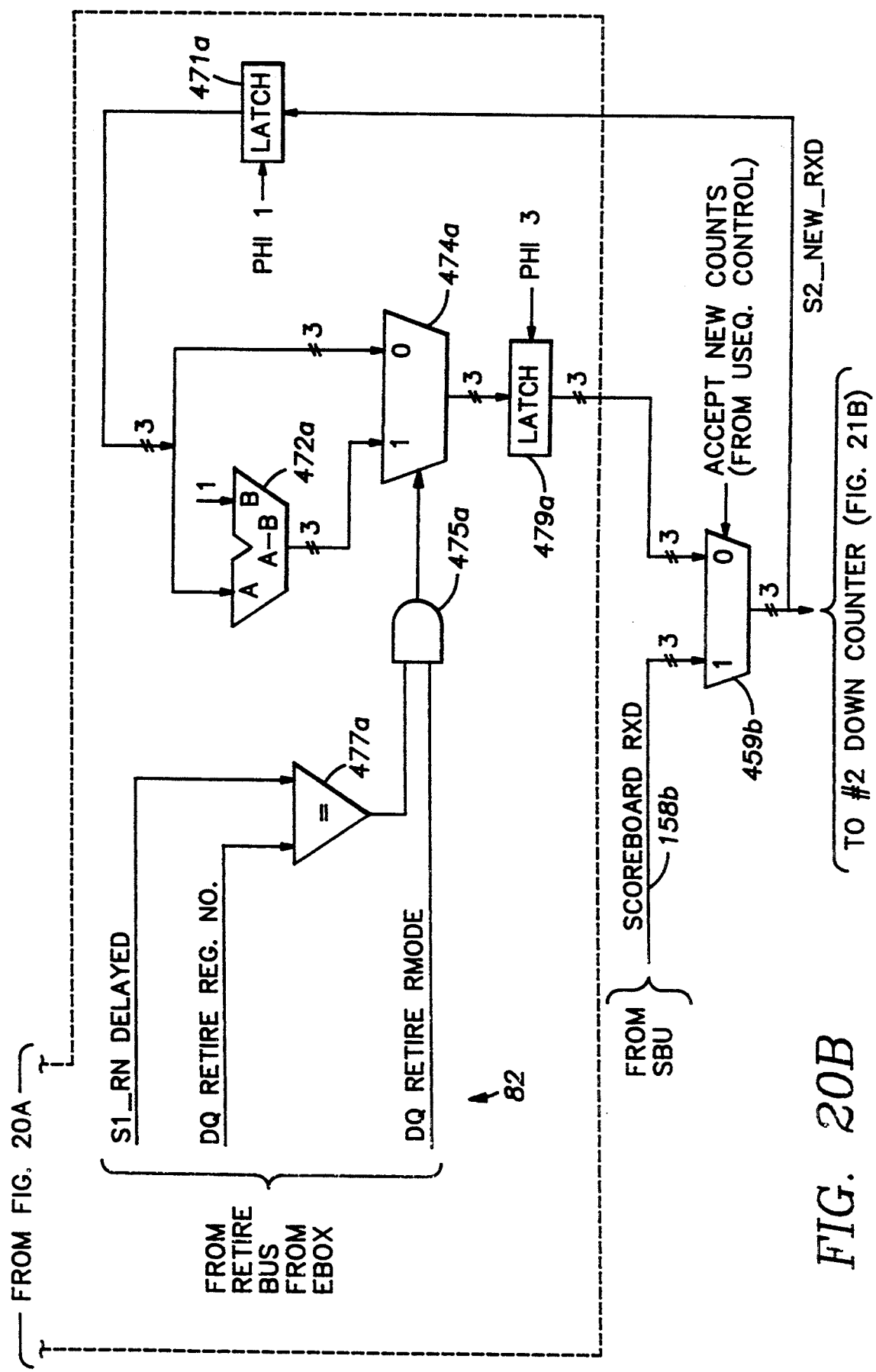

Turning now to FIGS. 20A and 20B, there is shown a schematic diagram of the logic circuits in the first down counter 455. As shown in FIG. 20A, the first down counter includes a latch 471 that receives the scoreboard source count RXS from a portion 459a of the multiplexer 459 shown in FIG. 19A. The first down counter 455 subtracts either zero, one or two from the source count in the latch 471, depending upon whether zero, one or two register source specifiers are retired which match the register number in the latch 458. To more quickly perform the subtraction, there are provided a first subtractor 472 that subtracts one, and a second subtractor 473 which subtracts two, and the subtractors 472 and 473 operate in parallel upon the source count in the latch 471. A multiplexer 474 selects either the count from the latch 471 or the difference from the first subtractor 472 or the difference from the second subtractor 473, depending upon whether zero, one or two register numbers of retired source registers match the register number in the latch 458. Select inputs to the multiplexer 474 are provided by AND gates 475, 476, and comparators 477, 478. The comparator 477 compares the register number of a first retired source specifier to the register number in the latch 458. The second comparator 478 compares the register number of the second retired source register with the register number in the latch 458. The AND gates 475, 476 qualify the outputs of the comparators 477, 478 with respective valid signals, SQ RETIRE R1 MODE and SQ RETIRE R2 MODE. The count or difference selected by the multiplexer 474 is received in a latch 479 clocked by the phase three clock PHI3.

As shown in FIG. 20B, the first down counter 455 includes similar components for processing destination counts, but, at most, one destination register is retired during each clock cycle. Therefore, for processing destination counts, the first down counter 455 includes a latch 471a clocked by the phase one clock PHI1, a subtractor 472a which subtracts one from the count in the latch 471a, a multiplexer 474a which selects either the difference from the subtractor 472 or the count from the latch 471a, a AND gate 475a and a comparator 477a which control the multiplexer 474a, and a latch 479a clocked by the phase three clock PHI3.

Figure 21A:
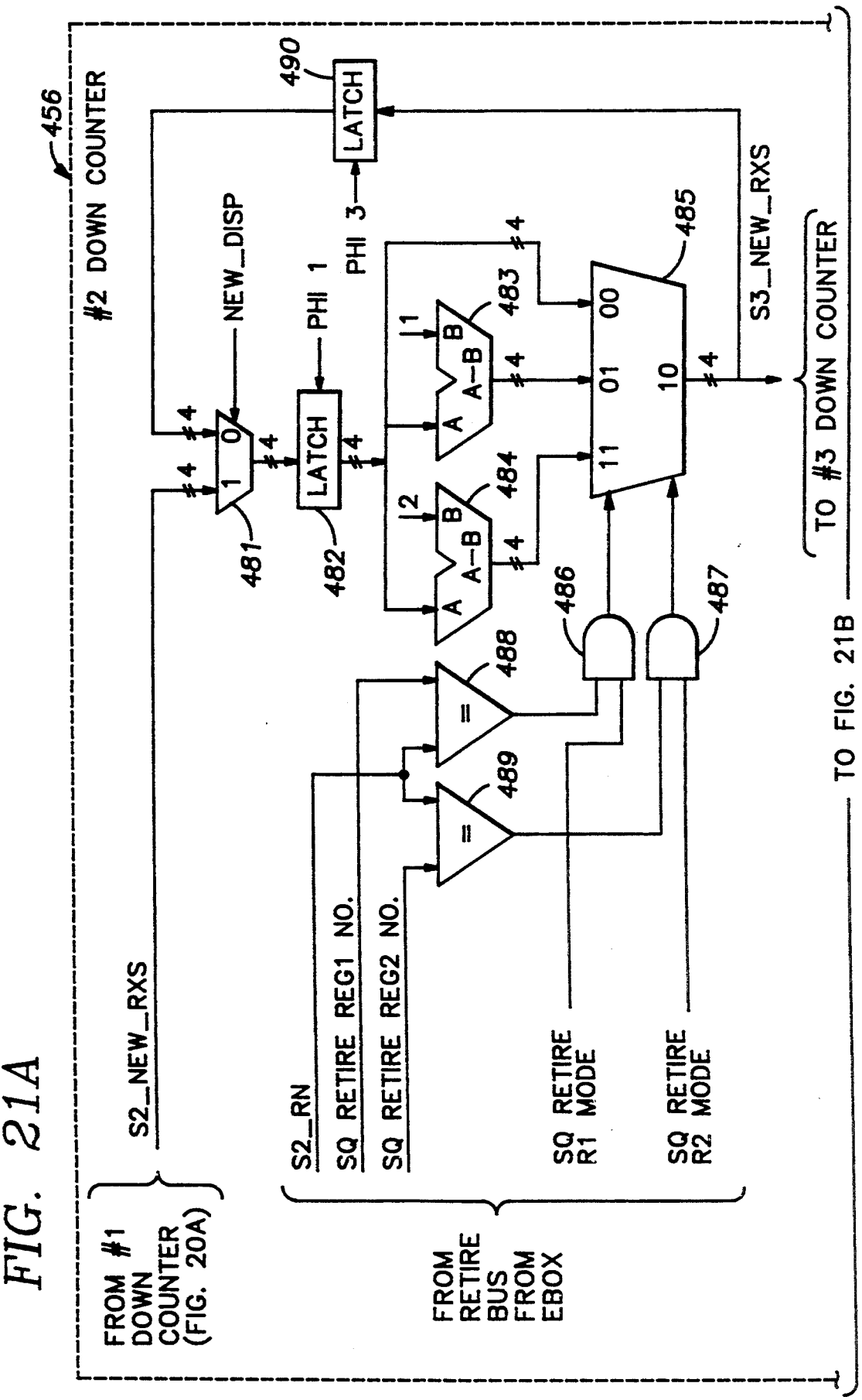
FIGS. 21A and 21B together comprise an electrical diagram in block form of a second-down counter stage shown in FIG. 20.
Figure 21B:
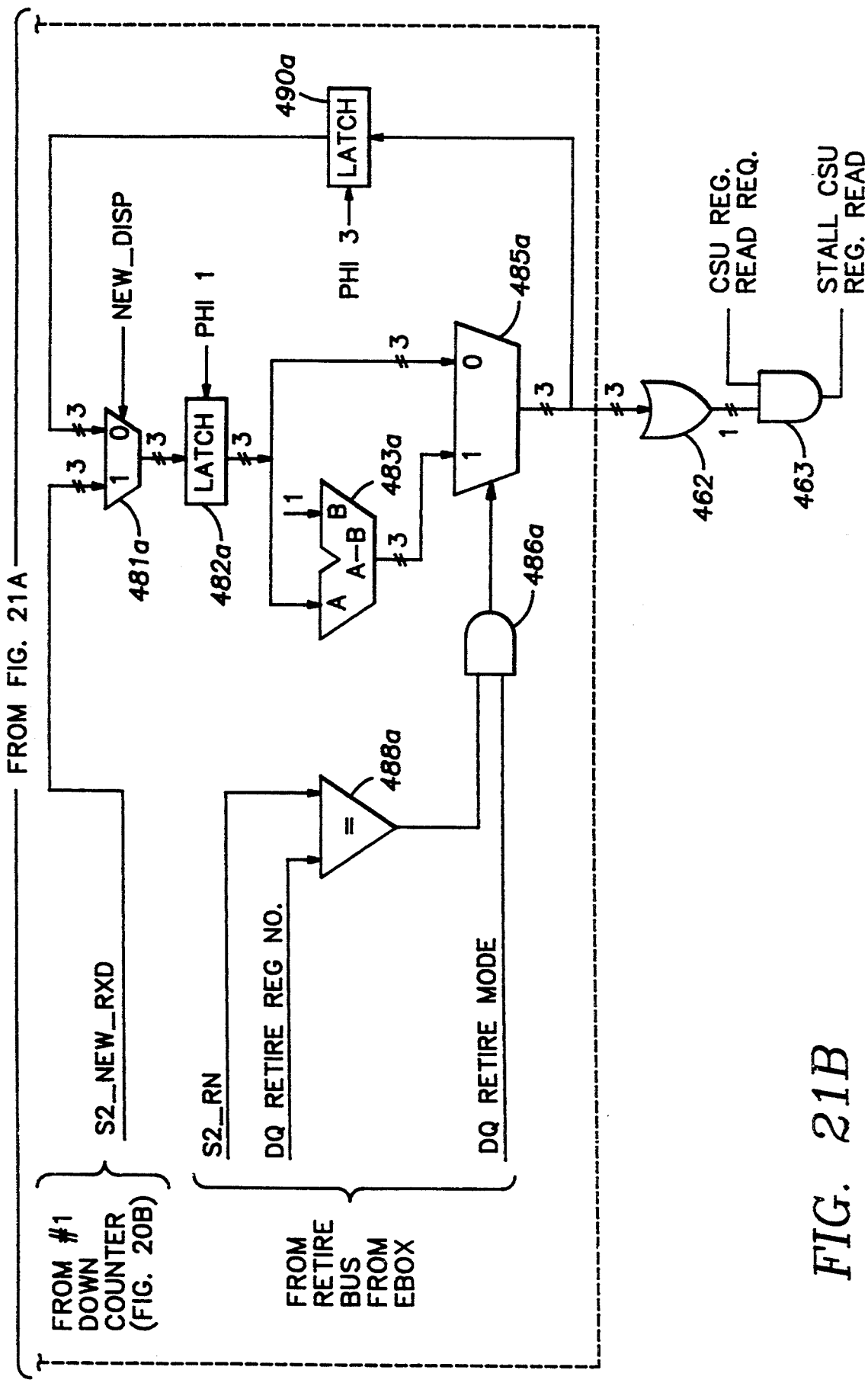

Turning now to FIGS. 21A and 21B, there is shown a schematic diagram of the second down counter 456. The second down counter 456 is loaded with the count from the multiplexer 459 in FIG. 19A (459a in FIG. 20A and 459b in FIG. 20B) when the S2 pipeline stage receives a new dispatch. In particular, as shown in FIG. 21A, the second down counter 456 has a multiplexer 481 receiving the source count from the multiplexer 459a in FIG. 20A when the NEW_DISP signal is asserted, and a multiplexer 481a which receives the destination count from the multiplexer 459b in FIG. 20B when the NEW_DISP signal is asserted. The output of the multiplexer 481 is received in a latch 482 clocked by the phase one clock PHI1, and the output of the multiplexer 481a is received in a latch 482a also clocked by the phase one clock.

The source count in the latch 482 is fed to a subtractor 483 which subtracts one, and a subtractor 484 which subtracts two. A multiplexer 485 selects either the source count from the latch 482, the difference from the subtractor 483, or the difference from the subtractor 484, depending on whether zero, one or two registers are retired having register numbers which match the register number S2_RN from the S2 pipe latch (453 in FIG. 19B). The multiplexer 455 is controlled by AND gates 486, 487 and comparators 488, 489 which operate in a fashion similar to the AND gates 475, 476 and comparators 477, 478 shown and described above in FIG. 20A. The output of the multiplexer 485 is received in a latch 490 clocked by the phase three clock, and the output of the latch 490 is fed back to the multiplexer 481.

As shown in FIG. 21B, the second down counter 456 processes the destination count in a similar fashion with components 482a, 483a, 485a, 486a, 488a.

Figure 22:
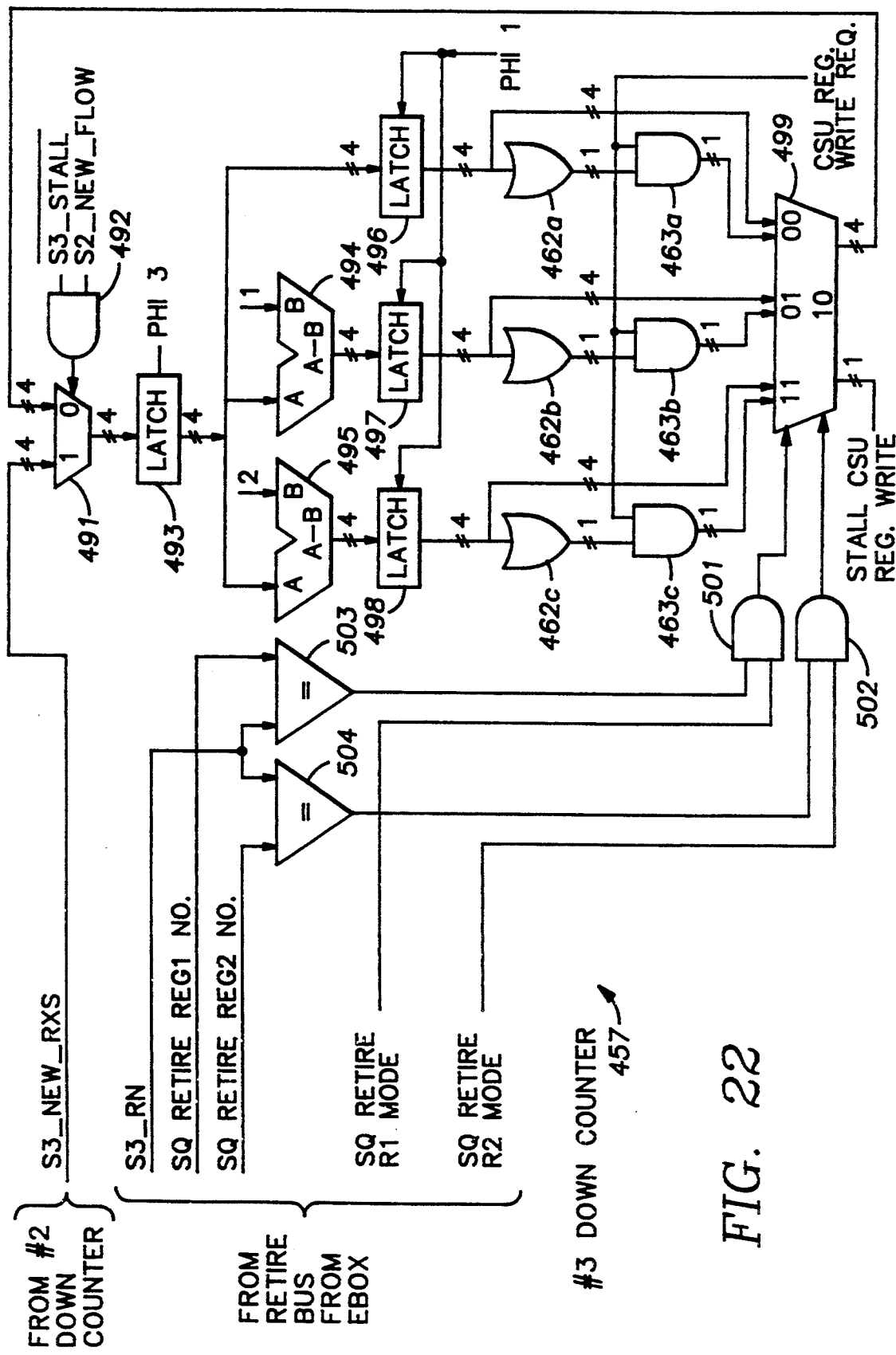
FIG. 22 is an electrical diagram in block form of a third-down counter stage shown in FIG. 19.

Turning now to FIG. 22, there is shown a schematic diagram of the third down counter 457, together with circuitry for the OR gate 462 and AND gate 463. The third down counter 457 processes only source counts. A multiplexer 491 receives the count S3_NEW_RXS from the multiplexer 485 in FIG. 21A, and this count is selected when a S2_NEW_FLOW is asserted and there is not a S3_STALL, as detected by an AND gate 492. The output of the multiplexer 491 is fed to a latch 493 clocked by the phase three clock PHI3. The third down counter 457 further includes a subtractor 494 which subtracts one from the count in the latch 493, and a subtractor 495 which subtracts two from the count in the latch 493.

In order to reduce propagation delay through the third down counter 457 and the OR gate 462 and the AND gate 463 of FIG. 19, the OR gate 462 and the AND gate 463 is replicated for each of three respective paths from the latch 493, the subtractor 494, and the subtractor 495. The output of the latch 493 is fed directly to a latch 496. The output of the subtractor 494 is fed to another latch 497, and the output of the subtractor 495 is fed to still another latch 498. The latches 496, 497, 498 are each clocked by the phase one clock PHI1. The outputs of the latches 496, 497, 498 are fed to respective inputs of a multiplexer 499. The OR gate 462a determines whether the count in the latch 496 is not zero, the OR gate 462b determines whether the count in the latch 497 is not zero, and the OR gate 462c determines whether the output of the latch 498 is not zero. The output of the gate 462a enables a gate 463a which generates a conditional stall CSU register write signal. In a similar fashion, the AND gate 463b receives the output of the OR gate 462b to generate a conditional stall signal, and the AND gate 463c receives the output of the OR gate 462c to also generate a conditional stall signal. The pertinent count and conditional stall signal is selected by the multiplexer 499, depending on whether zero, one or two of the register numbers of retired-source registers equal the S3_RN register number from the S3 pipe latch (454 in FIG. 19B). Select signals for the multiplexer 499 are generated by AND gates 501, 502 and comparators 503, 504 which operate in a similar fashion as described above with respect to AND gates 475, 476 and comparators 477, 478 of FIG. 20A. The count selected by the multiplexer 499 is fed back to the multiplexer 491, and the selected conditional stall signal is used to stall a register write by the CSU.

The RLOG unit

Figure 23:
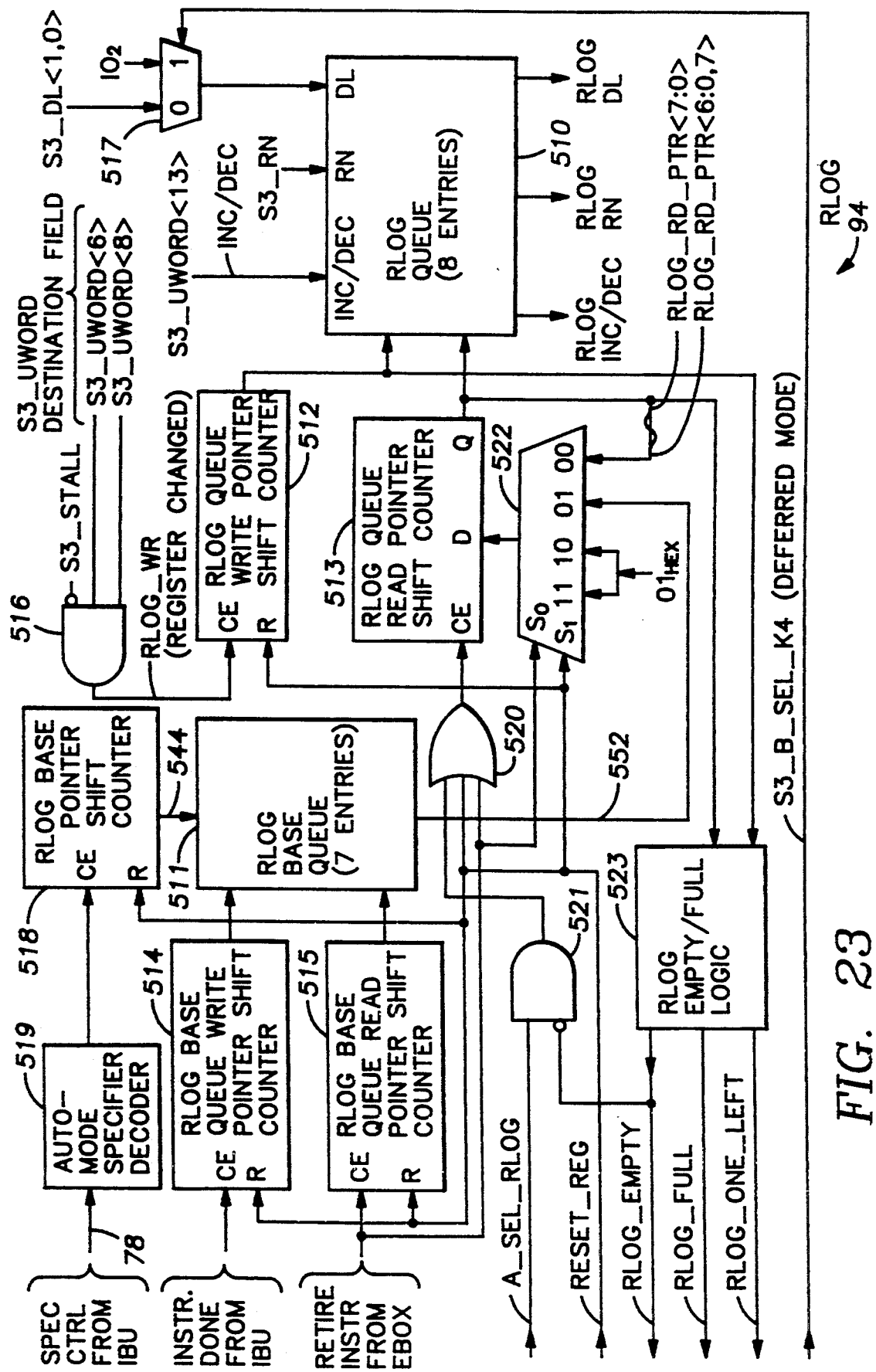
FIG. 23 is an electrical diagram in block form of a register log unit (RLOG) shown in FIG. 8.

Turning now to FIG. 23, there is shown a schematic diagram of the RLOG unit 94. The RLOG unit allows the Ibox to restore the state of the GPRs under certain exception conditions. Because of the pipeline organization, the Ibox works on macroinstructions ahead of the Ebox execution. Any or all of six possible operand specifiers for any distinct macroinstruction may be auto-increment or auto-decrement mode, which, by definition, modify the GPRs. Moreover, a macroinstruction may have an associated "implicit" auto-increment or auto-decrement specifier not explicitly appearing in the macroinstruction, and when such a macroinstruction is decoded, the associated auto-increment or auto-decrement specifier is generated in the Ibox. The Ibox must log all modifications to the GPRs for these operand specifiers and keep the log until the Ebox has retired the associated instruction. If the instruction stream gets redirected due to a branch or exception, then the Ibox uses the RLOG to restore the GPR registers to the condition expected at the time of the redirection.

The RLOG unit includes an RLOG queue 510, and an RLOG base queue 511. In general, for decoding VAX (Trademark) variable-length instructions, it is desirable for the RLOG queue 510 to have six or more entries, and the RLOG base queue 511 to have more than six entries, to avoid stalling. In a specific example, the RLOG queue 510 has eight entries, and the RLOG base queue 511 has seven entries, although only, at most, six of the RLOG base queue entries are filled with valid data at any given time. The use of one "spare" entry in the RLOG queue simplifies the "empty/full" logic which stalls the instruction decoding stages ahead of the RLOG unit 94 when the RLOG unit becomes full. The RLOG queue 510 has a write or put pointer counter 512, and a read or get pointer counter 513. These counters 512, 513 increment modulo-8. In a similar fashion, the RLOG base queue 511 has a write or put counter 514 and a read or get counter 515. These counters 514, 515 increment modulo-7. The counters 512, 513, 514, 515 are preferably implemented as shift counters which inherently provide a decoded output for each queue entry.

The RLOG queue is loaded when a general purpose register is actually modified by the complex specifier unit during preprocessing of an automode register specifier. This occurs when the S3 microword bit 6 is a logic one and the S3 microword bit 8 is a logic zero and the S3 stage of the CSU is not stalled, as detected by an AND gate 516. The RLOG queue entry pointed to by the write pointer 512 is loaded with bit 13 of the S3 microword, indicating whether the corresponding general purpose register was incremented or decremented, the four-bit S3 register number RN, and a two-bit displacement code DL indicating whether the corresponding general purpose register was changed by a value of one, two, four or eight. The displacement code DL is selected by a multiplexer 517 from the DL field of the S3 pipe latch (454 in FIG. 19), or a constant value of 10 binary representing four bytes for a deferred mode specifier indicated by a S3 pipe latch context signal B_SEL_K4. The RLOG queue write pointer counter 512 is then incremented modulo 8. If the RLOG write pointer reaches the state in which another increment would cause the write pointer to equal the read pointer, then the RLOG is full. The RLOG full condition causes the S3 pipeline stage to stall when the microword in the S3 pipe requests a GPR write. The stall breaks when the EBOX retires an instruction which in turn relinquishes RLOG resources.

The RLOG queue 510 only contains specifier state for macroinstructions which the Ebox has not executed. When the Ebox retires a macroinstruction, the RLOG unit discards RLOG queue entries associated with that macroinstruction, by advancing the RLOG read pointer 513.

For restoring general purpose register state during an "unwind" operation, a pointer value generated by a RLOG base pointer shift counter 518 is incremented modulo-8 slightly ahead of the RLOG write pointer counter 513 so that the RLOG base shift counter has a value pointing to an RLOG queue entry allocated to a next entry for an automode specifier that is just decoded. The RLOG base pointer counter 518 increments anytime a valid auto-increment address mode specifier, auto-decrement address mode specifier, auto-increment assist, or auto-decrement assist appears on the SPEC_CTRL bus 78 from the IBU, as detected by an automode specifier decoder 519. The RLOG queue write pointer 512 is not incremented to this same value until the register specified by the automode specifier is actually changed in value. In effect, the RLOG base pointer counter 518 allocates RLOG space for the CSU to make subsequent entries. The value of the RLOG base pointer counter is loaded into the RLOG base queue 511 each time a new instruction is issued by the IBU, and the RLOG base queue write pointer is incremented at this time.

The RLOG base queue read pointer shift counter 515 is incremented when an instruction is retired from the Ebox. All of the pointer shift counters are reset in response to a RESET_REG signal. In addition, the RLOG read pointer shift counter 513 is set to a value read from the RLOG base queue when an instruction is retired from the Ebox. Therefore, a plurality of RLOG queue entries may be removed from the RLOG queue when an instruction is retired. Moreover, the RLOG queue read pointer can be successively advanced until the RLOG queue is empty by an unwinding process initiated by the CSU control in response to a A_SEL_RLOG control signal fed to a gate 521. The gate 521 has an output fed to an input of an OR gate 520 which enables clocking of the RLOG queue read pointer shift counter 513. The gate 521 enables the OR gate 520 when the A_SEL_RLOG signal is asserted and the RLOG_EMPTY signal is not asserted. A multiplexer 522 controls the loading of the RLOG queue read pointer shift counter 513 so that the shift counter either shifts by one binary position in response to the A_SEL_RLOG signal, is set with the entry read from the RLOG base queue in response to retirement of an instruction by the Ebox, and, in any case, is set to a value of 01 hexadecimal in response to the RESET_REG signal. The output of the RLOG queue read shift counter 513 is shifted by one binary position by loading the shift counter with its output having the most significant bit 7 of the RLOG read pointer loaded into its least significant bit position. This shifting is nothing more than a transposition of the lines in the output bus from the shift counter. To determine whether the RLOG queue is empty or full, empty/full logic 523 compares the outputs of the RLOG queue write pointer shift counter 512 to the outputs of the RLOG queue read pointer shift counter 513 to generate a RLOG empty, a RLOG full, and a RLOG one left signal. The RLOG full signal is actually asserted when the RLOG queue 510 has one unused entry.

The CSU microcode controls the RLOG unwind procedure. The RLOG unwind is performed by repeatedly executing a microword that updates the GPR registers based on indirect references to RLOG_RN, RLOG_DL, and RLOG_INC/DEC. The RLOG supplies the values for the indirect references from the entry pointed to by the RLOG queue read pointer 513. This entry is retired by incrementing the RLOG queue read pointer 513. The RLOG retires successive entries until the RLOG queue read pointer 513 is equal to the RLOG queue write pointer 512, as indicated by the RLOG_EMPTY signal. At this point, the unwind procedure completes and the RLOG queue 510 is flushed by resetting the RLOG queue read and write pointer counters 512, 513, the RLOG base pointer counter 518, and the RLOG base queue read and write pointer counters 514, 515. If the RLOG queue is empty when the microcode initiates an unwind, a value of zero will be added to whatever general purpose register is pointed to by the read pointers.

When the Ebox asserts E%BRANCH_MISPREDICT, the NOP microword is forced into the S3 pipeline stage, the S1 pipe latch valid bit is cleared, and the next microaddress logic selects a MISPREDICT_UNWIND utility routine address. The microcode at this location unwinds the RLOG and then restarts the Ibox. If the RLOG queue is empty when the microcode initiates an unwind, a value of zero will be added to whatever GPR is pointed to by the read pointers. The RLOG is not flushed on the assertion of E%BRANCH_MISPREDICT, however, because it needs to remain intact to be unwound by CSU microcode. IMD_VALID is reset upon the assertion of E%BRANCH_MISPREDICT.

When the Ebox asserts E%STOP_IBOX, the microsequencer jams the CSU to the idle state, except in the case when the CSU is in the middle of IPR transaction unwind RLOG/read backup PC. In this situation, the RLOG will unwind until completion, and the read of the backup PC will be disabled. The CSU is put into the idle state by forcing NOP microwords into the S2 and S3 pipeline stages, clearing the S1 pipe latch valid bit, and selecting the IDLE microaddress.

When I%RSVD_ADDR_FAULT is asserted for a complex specifier, the S1 pipe latch valid bit is cleared. If there is not an S1 stall, the NOP microword is forced into the S2 pipeline stage. Complex specifiers already in the CSU pipeline when I%RSVD_ADDR_FAULT is asserted are allowed to finish processing.

Figure 24:
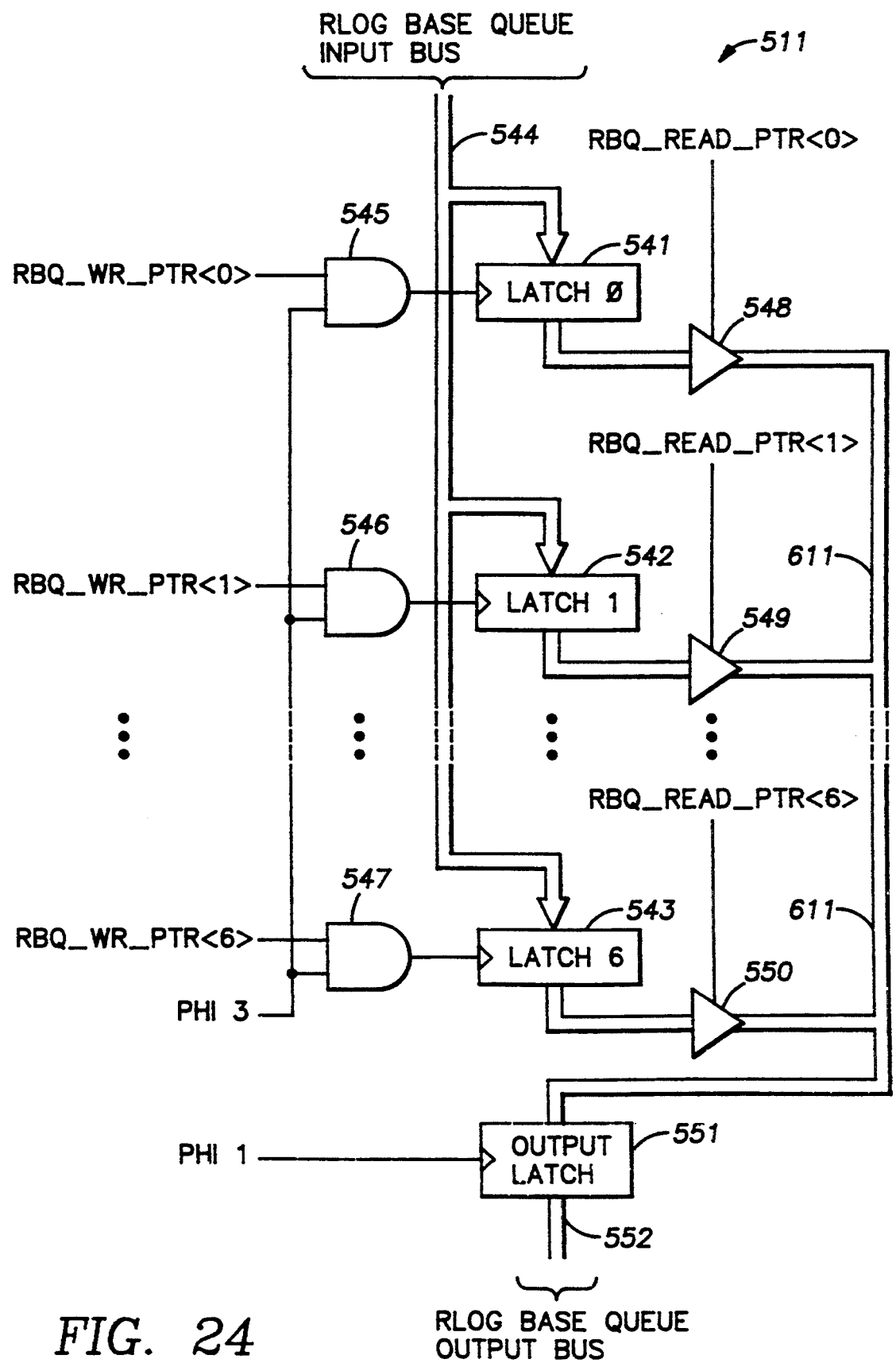
FIG. 24 is an electrical diagram in block form of an RLOG base queue shown in FIG. 23.

Turning now to FIG. 24, there is shown a schematic diagram of the RLOG base queue 511. The RLOG base queue 511 has seven latches, including latches 541, 542, 543 shown in FIG. 24. Each of the latches 541, 542, 543 holds eight bits and is enabled by a respective AND gate 545, 546, 547 which combines a respective bit of the RLOG base queue write pointer with the phase three clock PHI3. The outputs of the latches 541, 542, 543 are multiplexed by respective tristate gates 548, 549, 550 to an output latch 551 enabled by the phase one clock PHI1. The output latch 551 drives an output bus 552 of the RLOG base queue.

The RLOG queue 510 in FIG. 23 has a construction similar to the RLOG base queue as shown in FIG. 24, except that the RLOG queue has eight seven-bit latches instead of the seven eight-bit latches 541, 542, 543 of the RLOG base queue.

Figure 25:
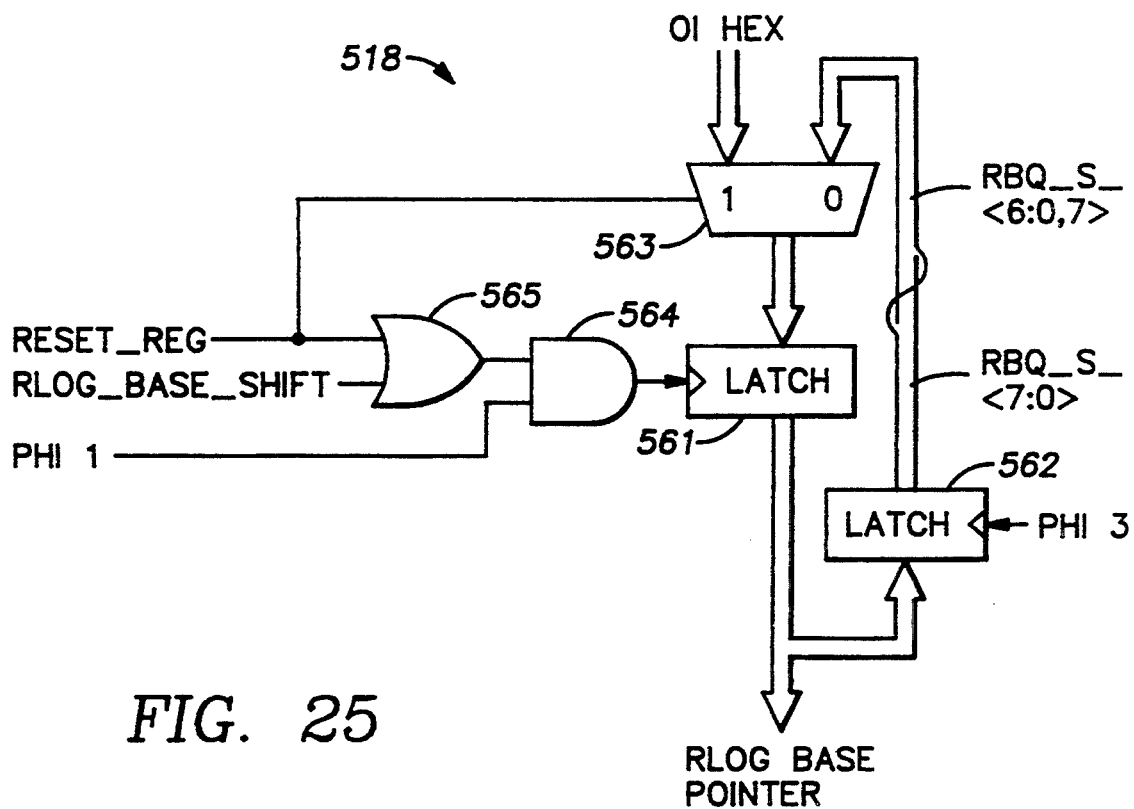
FIG. 25 is an electrical diagram in block form of an RLOG base pointer shift counter shown in FIG. 23.

Turning now to FIG. 25, there is shown a schematic diagram of the RLOG base pointer shift counter 518. This counter includes a first latch 561 and a second latch 562. The first latch 561 provides the RLOG base pointer to the RLOG base queue (511 in FIG. 23). The second latch 562 is loaded with the RLOG base pointer during clock phase three. The first latch 561 receives either the output of the second latch 562 shifted by one bit position or a constant value of 01 hexadecimal, as selected by a multiplexer 563 controlled by the RESET_REG signal. The output of the second latch 562 is shifted by one bit position by transposing the wiring such that bits <7:0> output from the second latch 562 are received in the order <6:0,7> on the input bus of the first latch 561. The latch 561 is enabled by an AND gate 564 and an OR gate 565. The OR gate 565 combines the RESET REG signal with a RLOG_BASE_SHIFT signal received from the automode specifier decoder (519 in FIG. 23). The AND gate 564 combines the output of the OR gate 565 with the phase one clock PHI1.

The other pointer shift counters 512, 513, 514, 515 have a similar construction to that shown in FIG. 25 for the RLOG base pointer shift counter 518. The RLOG queue read pointer shift counter, however, uses the three-input OR gate 520 of FIG. 23 instead of the two-input OR gate 565, and the RLOG queue read pointer shift counter uses the multiplexer 522 of FIG. 23 having two control bits instead of the multiplexer 561 having one control bit.

Figure 26:
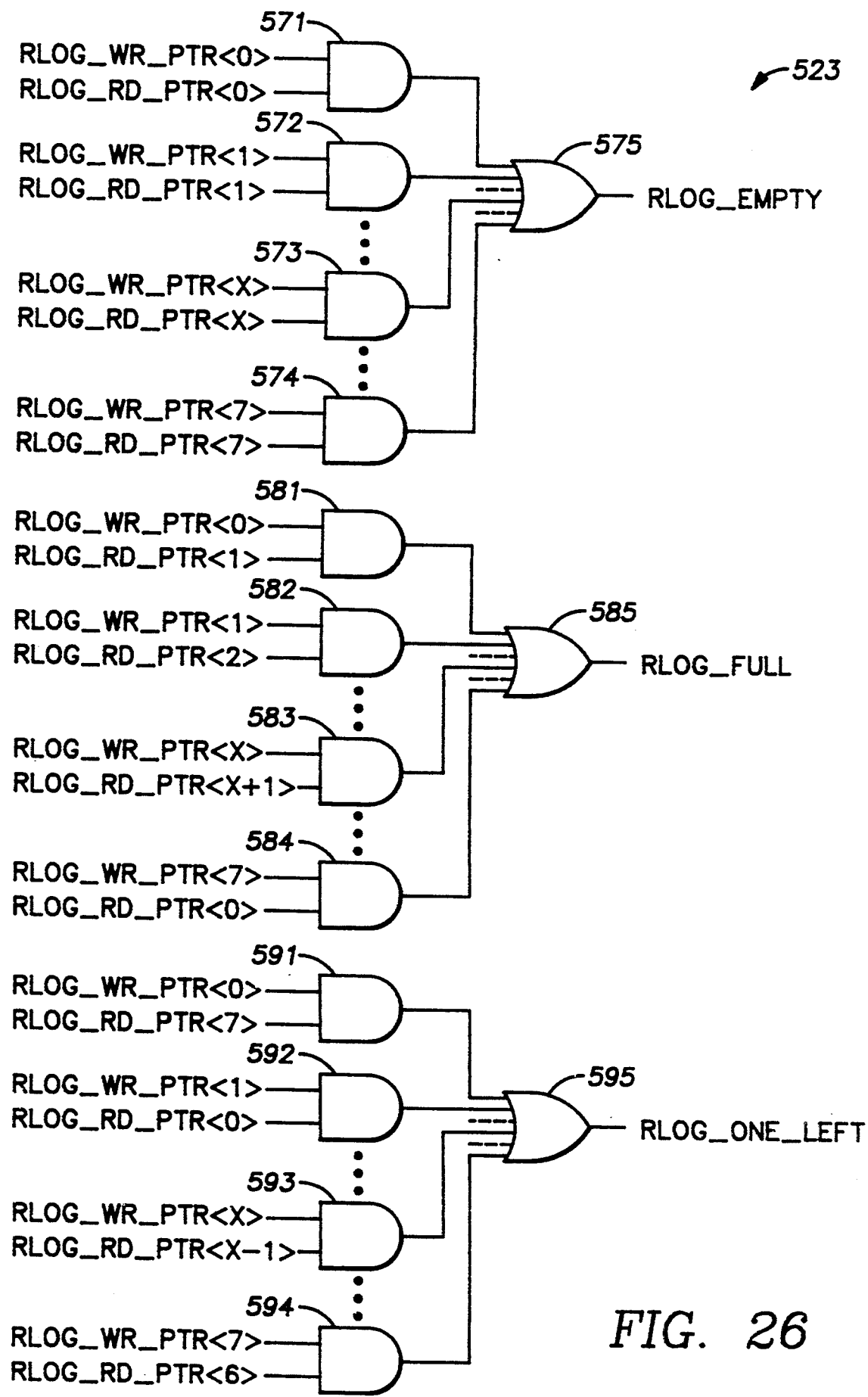
FIG. 26 is a logic diagram of RLOG empty/full logic shown in FIG. 23.

Turning now to FIG. 26, there is shown a logic diagram for the RLOG empty/full logic 523. It is seen that the RLOG empty, RLOG full, and RLOG one left signals are simple Boolean combinations of all of the bits of the RLOG read and write pointers, with each AND term in the Boolean expression being a combination of one bit of the RLOG write pointer with one bit of the RLOG read pointer. As shown in FIG. 26, AND gate 571 combines bit zero of the write pointer with bit zero of the read pointer, AND gate 572 combines bit one of the write pointer with bit one of the read pointer, AND gate 573 combines bit 3 of the write pointer with bit x of the read pointer, and AND gate 574 combines bit 7 of the write pointer with bit 7 of the read pointer. The outputs of all of the AND gates 571, 572, 573, 574 are combined in an OR gate 575 to generate the RLOG_EMPTY signal.

The RLOG_FULL signal is generated in a similar fashion, but there is a transposition or shifting of the bits of the read pointer with respect to bits of the write pointer. An AND gate 581 combines bit 0 of the write pointer with bit 1 of the read pointer, AND gate 582 combines bit 1 of the write pointer with bit 2 of the read pointer, AND gate 583 combines bit x of the write pointer with bit x+1 of the read pointer, and AND gate 584 combines bit 7 of the write pointer with bit 0 of the read pointer. The outputs of all of the gates 581, 582, 583, 584 are combined in an OR gate 585 to generate the RLOG_FULL signal.

The RLOG_ONE_LEFT signal is generated in a similar fashion, but with a shift in bit positions in a direction opposite to the shift for generating the RLOG_FULL signal. An AND gate 591 combines bit 0 of the write pointer with bit 7 of the read pointer, AND gate 592 combines bit 1 of the write pointer with bit 0 of the read pointer, AND gate 593 combines bit x of the write pointer with x−1 of the read pointer, and AND gate 594 combines bit 7 of the write pointer with bit 6 of the read pointer. The outputs of all of the AND gates 591, 592, 593, 594 are combined in an OR gate 595 to generate the RLOG_ONE_LEFT signal.

Figure 27:
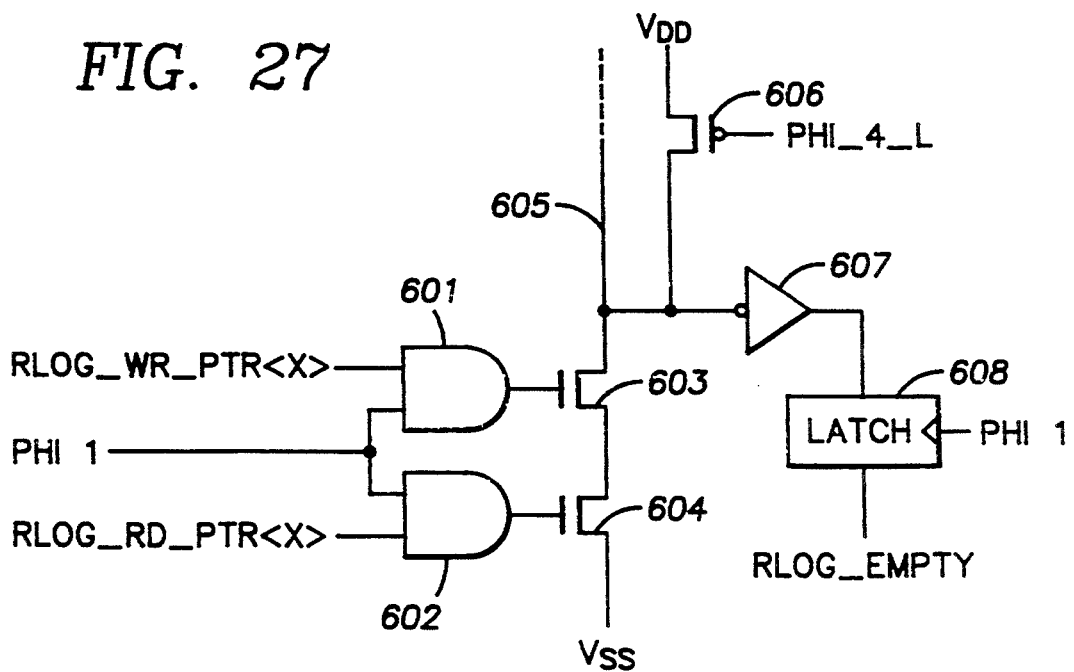
FIG. 27 is a schematic diagram showing a specific implementation of the logic shown in FIG. 26 for determining when the RLOG queue is empty.

Depending upon the process technology used for fabricating the logic gates shown in FIG. 26, it may be desirable to use wired-OR gates for the OR gates 575, 585, 595 shown in FIG. 26. In one particular CMOS technology that has been used, such wired-OR gates are implemented as precharged busses. This specific implementation is illustrated in FIG. 27 for the Boolean logic that generates the RLOG_EMPTY signal. In this case, for each bit position x, there is provided an AND gate 601 which combines the phase one clock PHI1 with bit x of the write pointer, and a AND gate 602 which combines the phase one clock PHI1 with bit x of the read pointer. The outputs of the gates 601, 602 drive two inputs of an "open-drain" AND gate comprised of two NMOS transistors 603, 604. The open-drain of the transistor 603 is fed to a precharged line 605 which is also connected to the open-drains of other AND gates for the other bit positions. The precharged line 605 is precharged by a PMOS transistor 606 enabled by the phase four clock PHI4. The signal on the precharged line 605 is sensed by an invertor 607. This technique of precharging busses is also advantageously used for the busses in the RLOG base queue 511 and the RLOG queue 510. With reference to FIG. 24, for example, the tri-state gates 548, 549, 550 are open-drain NAND gates enabled by the phase one clock PHI1, and the bus 611 combining the outputs of the tri-state gates is precharged by a PMOS transistor enabled by the phase four clock PHI4.

While the invention has been described with reference to a specific embodiment, the description is not meant to be construed in a limiting sense. Various modifications of the disclosed embodiment, as well as other embodiments of the invention, will be apparent to persons skilled in the art upon reference to this description. It is therefore contemplated that the appended claims will cover any such modifications or embodiments which fall within the true scope of the invention.

What is claimed is:

1. A method of operating a digital computer to decode and execute a plurality of instructions, said instructions each including a first operand and a plurality of subsequent operands, each of said first and subsequent operands capable of modifying the contents of one of a plurality of general purpose registers in said digital computer prior to execution of said instructions, said method comprising the steps of:
   a) providing a first queue having a plurality of entries, each entry for storing a register number of a general purpose register modified by one of said first or said subsequent operands, said first queue also storing a displacement value, said displacement value representing the amount by which the contents of the general purpose register corresponding to said register number were modified by said first or said subsequent operands, and with said first queue having a read pointer and a write pointer; and
   b) providing a second queue having a plurality of entries, each entry including an index value corresponding to a value of said write pointer of said first queue, said second queue having a read pointer and a write pointer.

2. The method as claimed in claim 1, further comprising the steps of:
   decoding said instructions prior to execution;
   storing in said first queue the register number and displacement value of each operand of said decoded instruction; and
   storing in said second queue the write pointer value corresponding to each first operand stored in said first queue for each of said decoded instructions.

3. The method as claimed in claim 1, further comprising the steps of:
   bypassing a number of decoded instructions before execution;
   incrementing said read pointer of said second queue by an amount related to said number of bypassed instructions; and
   incrementing, in response to a command from said digital computer, said read pointer of said first queue and allowing data at each of said entries of said first queue to change the contents of said general purpose register corresponding to said register number of said entry in accordance with said corresponding displacement until the values of said read pointer of said first queue and said read pointer of said second queue are equal.

4. The method as claimed in claim 1, wherein said operands include auto-increment specifiers and auto-decrement specifiers.

5. The method as claimed in claim 1, further comprising the steps of:
   incrementing said write pointer of said first queue to provide an entry in said first queue for each of said operands;
   incrementing said read pointer of said second queue when said instruction finishes execution; and
   setting said read pointer of said first queue equal to said index value stored at the entry of said second queue pointed to by said read pointer of said second queue when said instruction finishes execution.

6. The method as claimed in claim 1, further comprising the step of inhibiting the making of changes to said general purpose registers specified by said operands when said first queue becomes full.

7. A method of logging register information when operating a digital computer to decode and execute instructions, said instructions including operands which specify changes to be made to contents of general purpose registers in said digital computer prior to execution of said instructions, said method comprising the steps of:
   a) providing a first queue having a plurality of entries, said first queue having a first read pointer and a first write pointer;
   b) providing a second queue having a plurality of entries corresponding to said plurality of instructions, wherein each entry of said second queue stores a value of said first write pointer to said first queue, said second queue having a second read pointer and a second write pointer;
   c) when decoding is begun for each instruction, writing into said second queue said first write pointer value;
   d) when making a change to each of said general purpose registers specified by each of said operands in said each instruction, also writing the value of said change into said first queue, and advancing said first write pointer;
   e) when decoding has completed for each instruction, incrementing said second queue write pointer; and
   f) upon execution of said each instruction, advancing said second read pointer and setting said first read pointer equal to the value of the entry of said second queue pointed to by said second read pointer.

8. The method as claimed in claim 7, further comprising the steps of:
   incrementing said first read pointer and reading successive entries of said first queue indicated by said first read pointer;
   using said information in each of said entries to restore the contents of one of said general purpose registers with said information; and
   repeating said steps of incrementing and using until said first read pointer becomes equal to said first write pointer.

9. The method as claimed in claim 7, wherein said first read pointer is specified by a first counter advanced each time that a change specified by one of said operands is made to one of said general purpose registers, and said first write pointer value is specified by a second counter advanced each time that one of said operands is decoded.

10. A digital computer comprising:
    an instruction unit for decoding instructions;

an execution unit coupled to said instruction unit for executing the instructions decoded by said instruction unit;

a set of general purpose registers coupled to said instruction unit and said execution unit for providing source and destination operands during execution of the instructions decoded by said instruction unit;

means, coupled to said instruction unit and said general purpose registers, for receiving complex specifiers decoded from said instructions by said instruction unit, said complex specifiers specifying changes to be made to contents of said general purpose registers prior to execution of said instructions by said execution unit, and for making the specified changes to the contents of said general purpose registers prior to execution of said instructions by said execution unit;

a first queue having a first set of entries for storing information including a displacement value identifying changes made to the contents of said general purpose registers specified by said complex specifiers, a first write pointer pointing to an entry in said first queue next available for storing said information, and a first read pointer pointing to an entry in said first queue next available for being read from said first queue; said first queue including means coupled to said means for receiving complex specifiers for writing into the entry of said first queue pointed to by said first write pointer the information specified by each complex specifier when a change is made to a general purpose register specified by said each complex specifier;

a second queue having a second set of entries for storing pointers to entries in said first queue, a second write pointer for pointing to an entry in said second queue next available for storing a pointer to an entry in said first queue, and a second read pointer pointing to an entry in said second queue next available for being read from said second queue;

means coupling said second queue to said means for receiving complex specifiers and responsive to the decoding of a complex specifier for writing into said second queue a pointer value pointing to an entry in said first queue receiving said information specified by the decoded complex specifier; and means connected to said first queue, said second queue and said execution unit and responsive to execution of an instruction by said execution unit for reading a pointer value from the entry of said second queue pointed to by said second read pointer and setting said first read pointer to the pointer value read from the second queue.

11. The digital computer as claimed in claim 10, which includes a micro-control unit coupled to said general purpose registers and said first queue for reading said information from an entry of said first queue, using the information read from the entry in said first queue to restore the contents of a general purpose register, and advancing said first read pointer.

12. The digital computer as claimed in claim 11, wherein said micro-control unit is coupled to said execution unit for receiving an exception signal which initiates said reading of an entry of said first queue and using the information read from the entry in said first queue to restore the contents of a general purpose register.

13. The digital computer as claimed in claim 11, which includes means for detecting when said second queue is empty, and means for clearing said second queue when said first queue becomes empty as a result of said advancing of said first read pointer.

14. The digital computer as claimed in claim 13, wherein said means for detecting when said second queue is empty includes means for comparing said first read pointer to said first write pointer to detect when the first read pointer is equal to the first write pointer, and wherein said means for clearing said second queue includes means for setting said second read pointer and said second write pointer to the same value.

15. The digital computer as claimed in claim 10, wherein said first queue includes a first counter which generates first write pointer and is advanced when said means for receiving complex specifiers makes a change to the contents of one of said general purpose registers in response to a decoded one of said complex specifiers, and wherein said second queue is coupled to a second counter which generates the pointer value written into said second queue and is advanced when said one of said complex specifiers completes decoding.

* * * * *